US008392282B2

(12) United States Patent
Nagasaka et al.

(10) Patent No.: US 8,392,282 B2
(45) Date of Patent: Mar. 5, 2013

(54) INFORMATION PROCESSING APPARATUS AND INFORMATION PROCESSING METHOD FOR RECOMMENDING APPLICATION PROGRAMS

(75) Inventors: Hideo Nagasaka, Kanagawa (JP); Tadaaki Kimijima, Tokyo (JP)

(73) Assignee: Sony Corporation, Tokyo (JP)

( * ) Notice: Subject to any disclaimer, the term of this patent is extended or adjusted under 35 U.S.C. 154(b) by 501 days.

(21) Appl. No.: 12/631,106

(22) Filed: Dec. 4, 2009

(65) Prior Publication Data

US 2010/0146442 A1 Jun. 10, 2010

(30) Foreign Application Priority Data

Dec. 5, 2008 (JP) ................................ 2009-311489
Sep. 24, 2009 (JP) ................................ 2009-218736

(51) Int. Cl.
*G06Q 30/00* (2006.01)
(52) U.S. Cl. ...................................................... 705/26.7
(58) Field of Classification Search .................. 705/26.7
See application file for complete search history.

(56) References Cited

U.S. PATENT DOCUMENTS 6,912,505 B2 * 6/2005 Linden et al. .............. 705/14.53
7,685,022 B1 * 3/2010 Heyworth et al. ........... 705/26.8
2009/0093290 A1 * 4/2009 Lutnick et al. .................. 463/16
2009/0276332 A1 * 11/2009 Gharabally et al. ............ 705/27

FOREIGN PATENT DOCUMENTS

JP 2008-234596 10/2008

* cited by examiner

*Primary Examiner* — Amee A Shah
(74) *Attorney, Agent, or Firm* — Oblon, Spivak, McClelland, Maier & Neustadt, L.L.P.

(57) ABSTRACT

An information processing apparatus includes a communication section that acquires application programs from an external apparatus, a memory that stores an application program and information relevant to the application program, and an application execution section that executes the application program stored in the memory. The information processing apparatus also includes a control section that determines other application programs to be recommended, during execution of the application program by the application execution section. The other application programs to be recommended are determined based on the information relevant to the application program, which includes first relevant information and second relevant information.

18 Claims, 29 Drawing Sheets

FIG. 5

```
<application>
    <app type>   Slideshow                   (APPLICATION TYPE)
             <operation>Automatic            (OPERATION EASINESS)
    <app ID>      XXX                        (ID USED FOR UNIQUELY IDENTIFYING THE APPLICATION)
    <source app> ID XXXa                     (APPLICATION ASSUMED TO BE USED BY LINKING AT A CREATION TIME:
    <condition>                               AFFECTING THE ORDER OF RECOMMENDED APPLICATIONS ON A LIST)
             <file type>jpg:tiff             (TYPE OF A USABLE FILE)
             <hard condition>GPS             (REQUIRED FUNCTIONS)
    <context>
             <ref="1">      watch photo      (STATE TO BE RECOMMENDED)
             <ref="2">      online
    <Profile>
             <user type>Creative type
    <Method>
             <ref="1">                       (FUNCTION AIP OF THE APPLICATION)
                 <info>
             <ref="2">                       (HAVING A PLURALITY OF FUNCTION APIS OF THE APPLICATION)
                 <info>
    <price>  Free                            (PRICE: ONE OF GUIDES FOR THE USER IN SELECTING THE APPLICATION)
```

FIG.10

| | APPLICATION TYPE <app type> | APPLICATION DESCRIPTIONS |
|---|---|---|
| (a) | MEDIA EDITOR | APPLICATION PROGRAM FOR EDITING AND CREATING A CONTENT |
| (b) | MEDIA UPLOADER | APPLICATION PROGRAM FOR UPLOADING A CONTENT TO A SERVER SUCH AS A WEB SERVICE SERVER |
| (c) | MEDIA CONVERTER | APPLICATION PROGRAM FOR CARRYING OUT CONVERSION PROCESSING SUCH AS ROTATION, ENLARGEMENT AND CONTRACTION PROCESS ON A CONTENT |
| (d) | MEDIA MANAGER | APPLICATION PROGRAM FOR CARRYING OUT GENERAL MANAGEMENT PROCESSING TO MANAGE VARIOUS KINDS OF CONTENT PROCESSING SUCH AS CONTENT BROWSING AND SAVING PROCESSES (OR AN APPLICATION PROGRAM FOR CARRYING OUT COMBINED PROCESSING OF A MEDIA DATABASE AND A MEDIA) |
| (e) | MEDIA DATABASE | APPLICATION PROGRAM FOR CARRYING OUT DATABASE MANAGEMENT PROCESSING INCLUDING PROCESSES TO STORE AND DELETE A CONTENT |
| (f) | MEDIA BROWSER | APPLICATION PROGRAM FOR BROWSING A CONTENT |

FIG. 11

| | APPLICATION CONTEXT <context> | CONTEXT DESCRIPTIONS |
|---|---|---|
| (P) | SELECTED-CONTENT (MATERIAL) STATE | STATE IN WHICH A CONTENT HAS BEEN SELECTED |
| (Q) | ENTERABLE-CONTENT (MATERIAL) STATE | STATE IN WHICH A CONTENT CAN BE ENTERED |
| (R) | OUTPUTTABLE-CONTENT (RESULT) STATE | STATE IN WHICH A CONTENT CAN BE OUTPUT |

FIG.16

| | APPLICATION NAME <app ID> | ENTERABLE FILE <file type-in> | OUTPUTTABLE FILE <file type-out> | DESCRIPTION <app type> | EVALUATION VALUE OF OPERATION EASINESS <operation> |
|---|---|---|---|---|---|
| ○ | APPLICATION 1 (App 1) | Jpg | Mpeg | MOVIE CREATION | 1 |
| ○ | APPLICATION 2 (App 2) | Jpg | Mpeg | SCRAP-BOOK CREATION | 1 |
| | APPLICATION 3 (App 3) | Mpeg | Mpeg | PHOTO EDITING | 2 |
| ○ | APPLICATION 4 (App 4) | Jpg | Jpg | PHOTO EDITING | 4 |
| : | : | : | : | : | : |
| | APPLICATION 3 (App 3) | Mpeg | Mpeg | PHOTO EDITING | 2 |

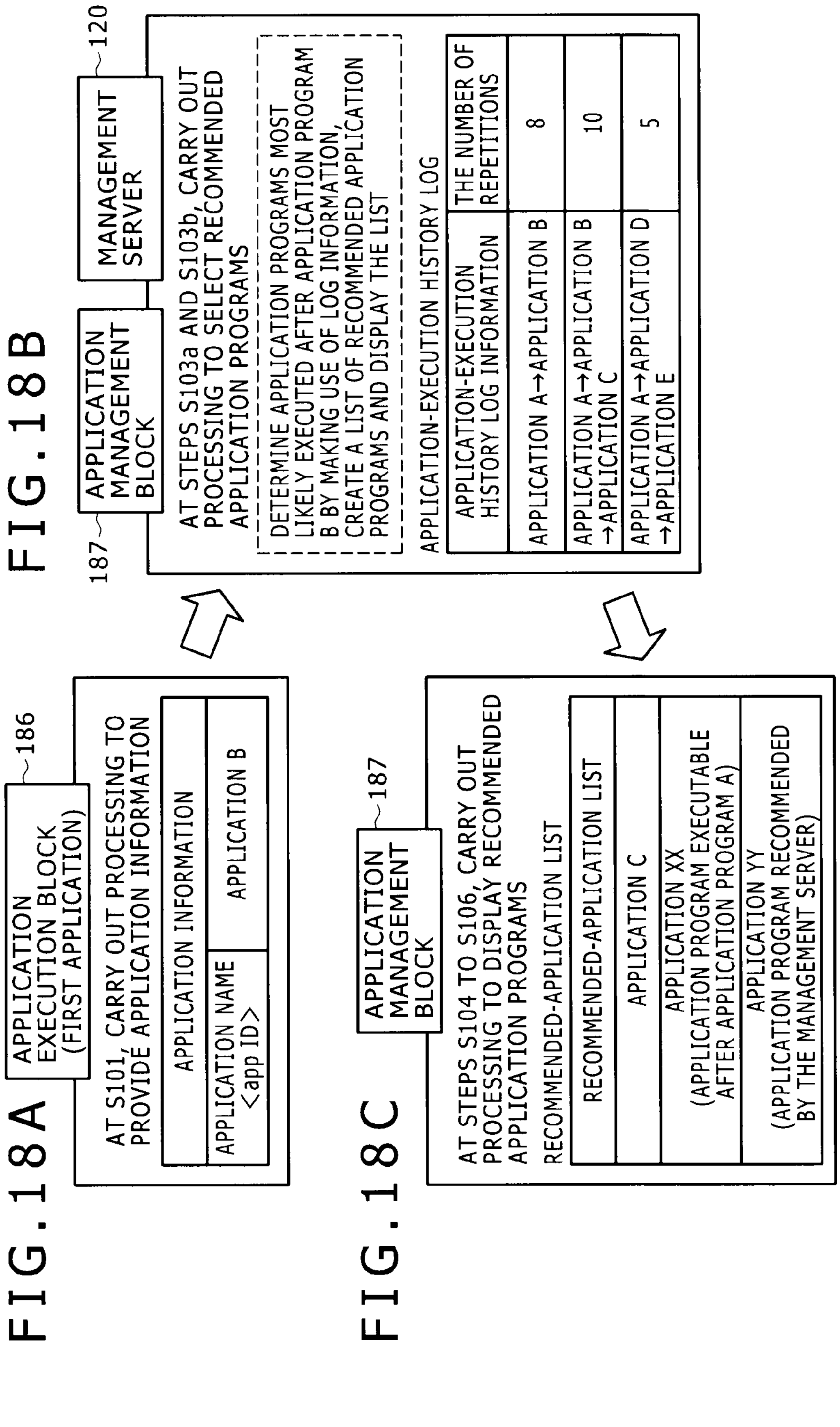
FIG.18A
APPLICATION EXECUTION BLOCK (FIRST APPLICATION)
186
AT S101, CARRY OUT PROCESSING TO PROVIDE APPLICATION INFORMATION
APPLICATION INFORMATION
APPLICATION NAME <app ID>
APPLICATION B
FIG.18B
APPLICATION MANAGEMENT BLOCK
187
MANAGEMENT SERVER
120
AT STEPS S103a AND S103b, CARRY OUT PROCESSING TO SELECT RECOMMENDED APPLICATION PROGRAMS
DETERMINE APPLICATION PROGRAMS MOST LIKELY EXECUTED AFTER APPLICATION PROGRAM B BY MAKING USE OF LOG INFORMATION, CREATE A LIST OF RECOMMENDED APPLICATION PROGRAMS AND DISPLAY THE LIST
APPLICATION-EXECUTION HISTORY LOG
APPLICATION-EXECUTION HISTORY LOG INFORMATION
THE NUMBER OF REPETITIONS
APPLICATION A→APPLICATION B
8
APPLICATION A→APPLICATION B →APPLICATION C
10
APPLICATION A→APPLICATION D →APPLICATION E
5
FIG.18C
APPLICATION MANAGEMENT BLOCK
187
AT STEPS S104 TO S106, CARRY OUT PROCESSING TO DISPLAY RECOMMENDED APPLICATION PROGRAMS
RECOMMENDED-APPLICATION LIST
RECOMMENDED-APPLICATION LIST
APPLICATION C
APPLICATION XX (APPLICATION PROGRAM EXECUTABLE AFTER APPLICATION PROGRAM A)
APPLICATION YY (APPLICATION PROGRAM RECOMMENDED BY THE MANAGEMENT SERVER)

FIG.19A

| APPLICATION | CATEGORIES |
|---|---|
| APPLICATION A | MEDIA MANAGER |
| APPLICATION B | MEDIA EDITOR |
| APPLICATION C | MEDIA UPLOADER |
| APPLICATION D | MEDIA EDITOR |
| APPLICATION E | MEDIA UPLOADER |

FIG.19B

| APPLICATION-EXECUTION HISTORY LOG INFORMATION |
|---|
| APPLICATION A→APPLICATION B →APPLICATION C |
| APPLICATION A→APPLICATION D →APPLICATION E |

FIG.19C

MEDIA MANAGER→MEDIA EDITOR→MEDIA UPLOADER

| PACKAGE ID (OBJECT IDENTIFIER) | APPLICATION-PACKAGE CONTENTS |
|---|---|
| OBJECT ref= 1 | APPLICATION A→APPLICATION B→APPLICATION C |
| OBJECT ref= 2 | APPLICATION S→APPLICATION X→APPLICATION Z |
| : | : |

FIG.25

| USE ID | IDS OF APPARATUS OWNED BY USERS | APPLICATION ID | | | |
|---|---|---|---|---|---|
| | | APPLICATION 1 | APPLICATION 2 | APPLICATION 3 | .. |
| U012345 | A | X | P | X | |
| | B | Y | Q | Y | |
| | M | Z | R | Z | |
| U987654 | C | K | | X | |
| | D | X | | Y | |
| | E | Z | | Z | |
| .. | .. | .. | .. | .. | |

INFORMATION PROCESSING APPARATUS AND INFORMATION PROCESSING METHOD FOR RECOMMENDING APPLICATION PROGRAMS

BACKGROUND OF THE INVENTION

1. Field of the Invention

In general, the present invention relates to an information processing apparatus and an information processing method. More particularly, the present invention relates to an information processing apparatus for carrying out a process of introducing a variety of application programs to be each executed to perform data processing to the user and carrying out a process of constructing an application execution environment and relates to an information processing method adopted by the information processing apparatus.

2. Description of the Related Art

An information processing apparatus such as a PC (Personal Computer) or a portable terminal makes use of a variety of application programs as programs to be each executed to carry out data processing. It is to be noted that the following description makes use of technological terms "application" and "application module" as terms having the same meaning as an application program.

In order to execute an application program by making use of a PC, for example, the user of the PC purchases a medium such as a disc used for storing the application program from a software outlet store and then installs the software recorded in advance in the disc medium into the PC to serve as the application program. As an alternative, the software to serve as the application program is downloaded from an application-software provider by way of the Internet and installed in the PC. After an environment for executing the application program has been set following the processing to install the program into the PC, data processing can be carried out by making use of the application program.

In recent years, in most cases, an application program is installed into a PC by downloading the program from an application-software provider by way of the Internet. In addition, the number of types of application programs that can be utilized by the user has also been increasing day by day. A number of application-software providers provide a variety of application programs so that it is difficult for individual users to accurately identify the functions of a large number of application programs.

When a user makes an attempt to obtain a new application program, in many cases, the user typically searches displays of application programs each offered as a commodity in a software outlet store for the desired one, or the user typically makes an access to an application introducing site in the Internet in order to get the desired application program. As an alternative, the user may carry out a process to search a source application to be described later by referring to FIG. 5 as a new application program. That is to say, the user carries out data search processing by making use of a keyword.

However, information on application programs that can be obtained by the user by searching displays of application programs and making an access to an application introducing site is limited information in many cases. For example, in order to examine compatibility (and/or other attributes) of the desired application program with other application programs utilized by the user, it takes much time and much labor. After searching displays of application programs each offered as a commodity in a software outlet store for the desired one, the user purchases the desired application program and install the program in a PC owned by the user. However, in some cases, the new application program installed in the PC cannot be executed in the environment existing in the PC.

On the other hand, there are already satisfactory systems provided for contents such as a musical content and a movie. For example, there is utilized a content introducing system for analyzing features of a content acquired by the user. Then, a content providing server employed in the content introducing system automatically searches for a content having features similar to the features of the content acquired by the user. Subsequently, a content obtained as a result of the search operation is recommended to the user.

In addition, Japanese Patent Laid-Open No. 2008-234596 discloses a search and distribution system for carrying out a process to edit a content obtained from a content providing server and uploading the edited content to the content providing server which then presents the uploaded content to other users. A variety of such search and distribution systems each used for searching for a content such as a musical content or a movie and for distributing the content obtained as a result of the search operation to users have been proposed.

Unlike a content such as a musical content, however, an application program executed to carry out data processing imposes a number of conditions that must be satisfied, making it difficult to carry out processes to recommend a proper application program to the user and present the recommended application program to the user. The conditions include a requirement that the application program shall be executable to carry out data processing desired by the user and a requirement that the application program shall be compatible with application programs already utilized by the user. In the case of a musical content, a content to be recommended to a user can be correctly selected on the basis of only information on favorites with the user. In the case of an application program, however, by merely selecting an application program, which is to be recommended to a user, on the basis of only information on favorites with the user, the selected program may not be satisfactory to the user in many cases.

SUMMARY OF THE INVENTION

Addressing the problems described above, inventors of the present invention have innovated an information processing apparatus capable of carrying out a process to introduce an application program to be executed to perform various kinds of data processing to a user owning the information processing apparatus and a process to construct an environment for executing the application program in the information processing apparatus. In addition, the inventors of the present invention have also innovated an information processing method to be adopted by the information processing apparatus.

In accordance with a first embodiment of the present invention, there is provided an information processing apparatus employing: a communication section configured to acquire application programs from external apparatus; a memory used for storing at least an application program and information relevant to the application program; an application execution section configured to execute the application program stored in the memory; and a control section configured to determine other application programs to be recommended in the course of execution of the application program in the application execution section.

In the information processing apparatus, information stored in the memory as the information relevant to the application program includes first relevant information and second relevant information which are used for determining the other application programs to be recommended in the course of execution of the application program in the application execution section whereas the control section: selects first recommended application programs from application programs already stored in the memory on the basis of the first relevant information related to the application program being executed by the application execution section; acquires information on second recommended application programs on the basis of the second relevant information related to the application program being executed by the application execution section from the external apparatus by way of the communication section; and carries out a process to output information on the first recommended application programs and the second recommended application programs as application-program recommending information.

In addition, in accordance with an embodiment of the present invention implementing the information processing apparatus, the first relevant information is application selection information on application programs already selected and executed by the application execution section.

In addition, in accordance with an embodiment of the present invention implementing the information processing apparatus, the application selection information mentioned above is an application selection count representing the number of times each of the application programs already selected and executed by the application execution section has been selected by the application execution section.

In addition, in accordance with an embodiment of the present invention implementing the information processing apparatus: application selection information on application programs already selected and executed by the application execution section is generalized into executed-application category information which is application selection information on application categories each representing the type of one of the application programs already selected and executed by the application execution section; and the executed-application category information is used as the second relevant information.

In addition, in accordance with an embodiment of the present invention implementing the information processing apparatus, the executed-application category information is application selection counts each provided for every application category and defined as the number of times the application category has been selected as the category of one of the application programs already selected and executed by the application execution section.

In addition, in accordance with an embodiment of the present invention implementing the information processing apparatus, the control section: displays the information on the first recommended application programs and the information on the second recommended application programs on a screen common to both the first recommended application programs and the information on the second recommended application programs; selects one of the first recommended application programs on the basis of an application specifying input entered for the information on the first recommended application programs and loads the selected first recommended application program from the memory; selects one of the information on the second recommended application programs on the basis of an application specifying input entered for the information on the second recommended application programs and downloads the selected second recommended application program from one of the external apparatus by way of the communication apparatus; and supplies the first recommended application program and/or the second recommended application program to the application execution section as an application program to be executed by the application execution section.

In addition, in accordance with an embodiment of the present invention implementing the information processing apparatus, the control section displays the information on the first recommended application programs and the information on the second recommended application programs in such a way that a storage location used for storing the first recommended application programs and a storage location used for storing the second recommended application programs can be distinguished from each other.

In addition, in accordance with an embodiment of the present invention implementing the information processing apparatus, if the number of the first recommended application programs and/or the number of the second recommended application programs are greater than one, the control section displays the information on the first recommended application programs and the information on the second recommended application programs in a way indicating that all the first recommended application programs have been stored in a storage location common to all the first recommended application programs and/or the second recommended application programs have been stored in another storage location common to all the second recommended application programs.

In addition, in accordance with an embodiment of the present invention implementing the information processing apparatus, information used by the control section to determine a recommended application program includes at least one of an apparatus profile serving as information on the information processing apparatus and a user profile serving as information on a user making use of the information processing apparatus.

In addition, in accordance with an embodiment of the present invention implementing the information processing apparatus, information used by the control section to determine a recommended application program includes a context which is information on the state of execution of an application program being executed by the application execution section.

In addition, in accordance with an embodiment of the present invention implementing the information processing apparatus, information used by the control section to determine a recommended application program includes application-type information indicating the type of an application program being executed by the application execution section.

In accordance with a second embodiment of the present invention, there is provided an information processing method to be adopted by an information processing apparatus employing: a communication section configured to acquire application programs from external apparatus; a memory used for storing at least an application program and information relevant to the application program; an application execution section configured to execute the application program stored in the memory; and a control section configured to determine other application programs to be recommended in the course of execution of the application program in the application execution section.

In the information processing apparatus, information stored in the memory as the information relevant to the application program includes first relevant information and second relevant information which are used for determining the other application programs to be recommended in the course of execution of the application program in the application execution section whereas the information processing method carried out to drive. The control section includes the steps of: selecting first recommended application programs from application programs already stored in the memory on the basis of the first relevant information related to the application program being executed by the application execution section; acquiring information on second recommended application programs on the basis of the second relevant information related to the application program being executed by the application execution section from the external apparatus by way of the communication section; and carrying out a process to output information on the first recommended application programs and the second recommended application programs as application recommending information.

In addition, in accordance with an embodiment of the present invention implementing the information processing method, the first relevant information is application selection information on first or second recommended application programs already selected and executed by the application execution section.

In addition, in accordance with an embodiment of the present invention implementing the information processing method, the application selection information is an application selection count representing the number of times the first or second recommended application programs already selected and executed by the application execution section has been selected by the application execution section.

In addition, in accordance with an embodiment of the present invention implementing the information processing method: application selection information on first or second recommended application programs already selected and executed by the application execution section is generalized into executed-application category information which is application selection information on application categories each representing the type of one of the first and second recommended application programs already selected and executed by the application execution section; and the executed-application category information is used as the second relevant information.

Other characteristics and merits of the invention will probably become more obvious from the following detailed descriptions of embodiments given with reference to accompanying diagrams as embodiments of the present invention. It is also to be noted that the technical term "system" used in this invention specification implies the configuration of a logical confluence including a plurality of apparatus. That is to say, the system is by no means limited to apparatus which are configured to form a case.

In accordance with the configurations of the embodiments provided by the present invention, the application management section employed in the information processing apparatus owned by the user generates a recommended-application list showing application programs relevant to the first application program which is being executed by the information processing apparatus and displays the recommended-application list. The application management section analyzes information on application programs relevant to the first application program and information on other application programs and, in addition, selects recommended application programs optimal for an information processing apparatus and/or a user by making use of at least one of an apparatus profile serving as information on the information processing apparatus and a user profile serving as information on a user making use of the information processing apparatus. By virtue of this configuration, to the user can easily acquire an optimal application program without carrying out processing such as a process to search for the optimal application program.

BRIEF DESCRIPTION OF THE DRAWINGS

These and other innovations as well as features of the present invention will become clear from the following description of preferred embodiments given with reference to the accompanying diagrams, in which:

FIG. 5 is an explanatory diagram showing typical application information provided by a management server to an application providing server;

FIG. 10 is an explanatory table showing typical application programs each executed by the application execution block;

FIG. 11 is an explanatory diagram showing typical contexts each generated at a time of execution of an application program by the application execution block;

FIG. 16 is an explanatory diagram showing pieces of application information, which are used in the processing to recommend application programs, in a table format;

FIGS. 17A to 18C are a plurality of explanatory diagrams showing a still further typical concrete example of the processing to recommend application programs;

FIGS. 19A to 19C are a plurality of explanatory diagrams showing pairs each associating the title of an application program with the type (or the category) of the application program and showing a typical concrete example of the application recommendation processing including a process to create a sequence of application categories;

FIG. 25 is an explanatory diagram showing a typical structure of management data used in the processing carried out to provide each of information processing apparatus owned by the user with an application program proper for the apparatus;

DETAILED DESCRIPTION OF THE PREFERRED EMBODIMENTS

The following description explains details of the information processing apparatus and the information processing method, which are provided by embodiments of the present invention, by referring to accompanying diagrams. It is to be noted that the information processing apparatus and the information processing method are described in chapters which are arranged as follows:

(1): Outlines of the Information Processing System and the Information Processing Apparatus (2): Processing to Recommend Applications (3): Typical Concrete Embodiments of the Processing to Recommend Application Programs (4): Processing to Share Applications by Users and Application Recommendation Processing (5): Processing to Construct an Environment to be Used for Executing Contents Common to a Plurality of Different Apparatus (6): Typical Processing Carried out by a Plurality of Collaborative Application Management Sections Connected to a Network (7): Typical Hardware Configuration of a Variety of Apparatus (1): Outlines of the Information Processing System and the Information Processing Apparatus First of all, by referring to a block diagram of FIG. 1, the following description explains outlines of the information processing apparatus and the information processing system.

Figure 1:
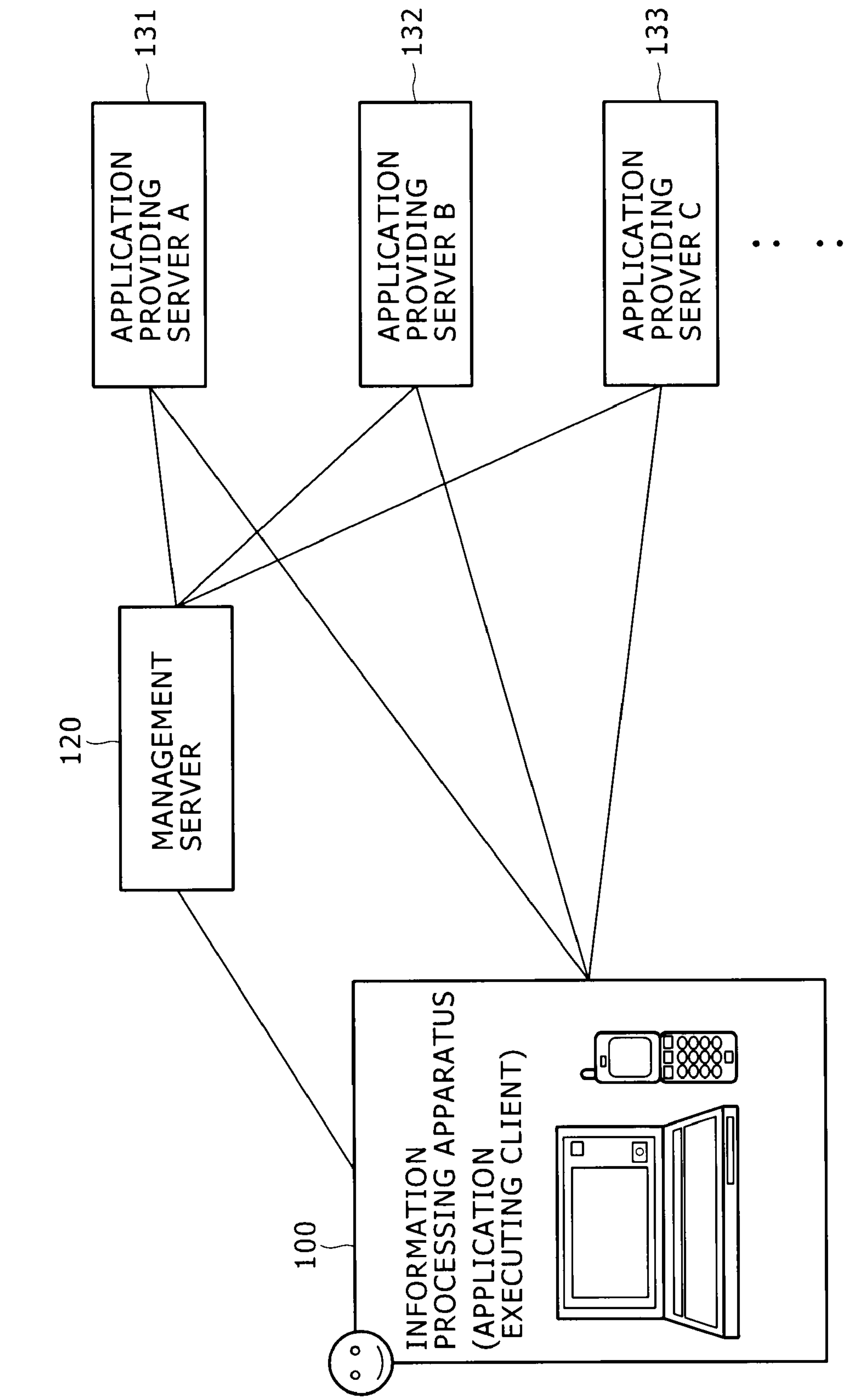
FIG. 1 is an explanatory block diagram showing a typical configuration of an information processing system employing embodiments of the present invention.

FIG. 1 is an explanatory block diagram showing a typical configuration of the information processing system according to an embodiment of the present invention. As shown in the figure, the information processing system includes an information processing apparatus 100 which has a function to execute an application program. Utilized by the user, the information processing apparatus 100 is typically a PC or a portable terminal. By making use of the information processing apparatus 100, the user is capable of carrying out various kinds of data processing through execution of a variety of application programs. Typical application programs include an image viewing application program, an image editing application program, a music reproduction application program, a music editing application program, a text creation application program, a game application program, a map-route search application program, an accounting process application program and a mail creation application program.

The information processing apparatus 100 employs a CPU (central processing unit) having a function to execute a program and a memory which serves as a local storage section used for storing application programs and data. The memory is typically a hard disc, a RAM (random access memory) and/or a ROM (read only memory). Programs executed by the CPU employed in the information processing apparatus 100 include an OS (office system) and application programs. The application programs executed by the information processing apparatus 100 have been stored in the memory. The application programs stored in the memory are programs installed from a recording medium such as a CD (compact disc) or downloaded from a program providing server by way of a network. The user can properly select one of the application programs as a program to be executed by the information processing apparatus 100.

The information processing system shown in FIG. 1 includes application providing servers A, B and C which are denoted by reference numerals 131, 132 and 133 respectively. Application providing servers A, B and C denoted by reference numerals 131, 132 and 133 respectively are each a server which provides a variety of application programs to the information processing apparatus 100. Some application programs obtained from any one of the application providing servers 131, 132 and 133, are charged application programs. However, some application programs can be obtained by the user for free.

The information processing apparatus 100 is capable of downloading an application program from any one of application providing servers A, B and C denoted by reference numerals 131, 132 and 133 respectively and storing the downloaded application program in the memory employed in the information processing apparatus 100.

A management server 120 employed in the information processing system shown in FIG. 1 obtains information on application programs, which are provided by application providing servers A, B and C denoted by reference numerals 131, 132 and 133 respectively, from application providing servers A, B and C, managing the information. The management server 120 supplies the information to the information processing apparatus 100 which is utilized by the user.

On the basis of the application information received from the management server 120, the information processing apparatus 100 utilized by the user carries out processing such as a process to display a screen introducing application programs which can be executed in the information processing apparatus 100. For example, the information processing apparatus 100 carries out a process to generate information on other recommended application programs relevant to an application program which is currently being executed by the information processing apparatus 100 and display the information on the screen.

To put it more concretely, for example, when the information processing apparatus 100 is executing an image viewing application program, the information processing apparatus 100 also displays information on an application program relevant to the image viewing application program. Typical examples of the application program relevant to the image viewing application program are an image editing application program and an image upload service application program. The image editing application program and the image upload service application program are application programs to be executed to carry out processing such as an image editing process and an image management process.

As shown in FIG. 1, the management server 120 is a server separated from application providing servers A, B and C denoted by reference numerals 131, 132 and 133 respectively. It is to be noted, however, that the management server 120 itself can also be configured to have functions of an application providing server.

(2): Processing to Recommend Applications

Figure 2:
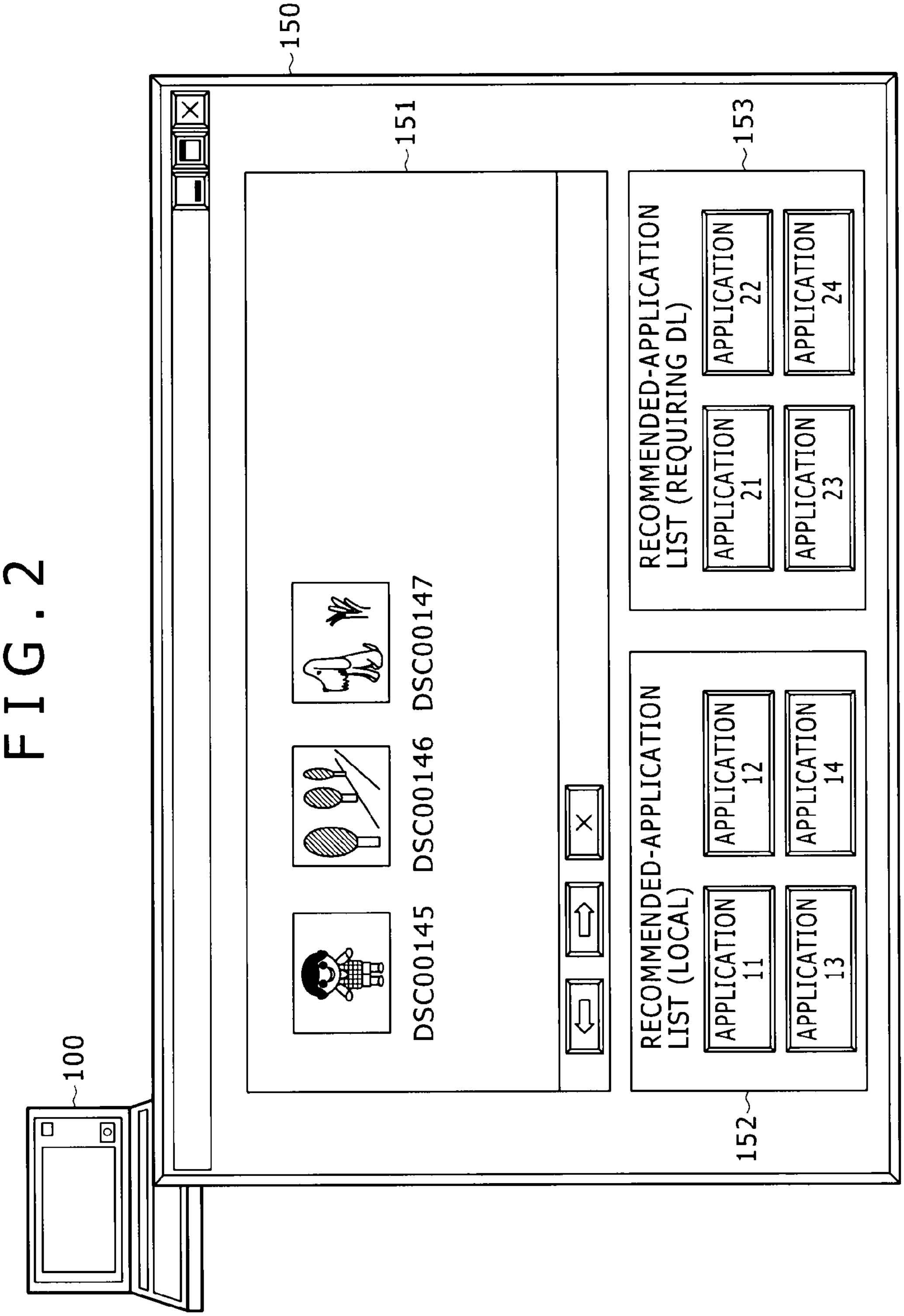
FIG. 2 is an explanatory diagram showing a typical data screen appearing on the display section of an information processing apparatus owned by the user.

As described above, on the basis of the application information received from the management server 120, the information processing apparatus 100 utilized by the user carries out processing such as a process to display a screen introducing application programs relevant to an application program which is currently being executed in the information processing apparatus 100. FIG. 2 is an explanatory diagram showing a typical data display screen appearing on the information processing apparatus 100.

That is to say, FIG. 2 shows typical data shown on the display screen 150 of the information processing apparatus 100. The upper portion of the display screen 150 is an area used by an application program which is currently being executed in the information processing apparatus 100. The area used by an application program which is currently being executed in the information processing apparatus 100 is referred to as an application execution area 151. The application execution area 151 on the typical display shown in FIG. 2 is allocated to an image viewing application program. The image viewing application program has been stored in advance in the local storage section of the information processing apparatus 100.

The lower portion of the display screen 150 includes a left recommended-application list display area 152 and a right recommended-application list display area 153. Each of the recommended-application list display areas 152 and 153 shows information on application programs relevant to an application program which is shown in the application execution area 151 as an application program currently being executed in the information processing apparatus 100. That is to say, each of the recommended-application list display areas 152 and 153 shows a list of other application programs recommended to the user who has requested the execution of a specific application program, the execution state of which is shown in the application execution area 151. It is to be noted that every recommended other application program is shown in each of the recommended-application list display areas 152 and 153 as display data such as an icon. The display data includes embedded link information for carrying out a process to invoke the recommended application program represented by the display data. To put it more concretely, the user is allowed to invoke a recommended application program by clicking display data representing the recommended program.

Application lists shown in the recommended-application list display areas 152 and 153 have been generated by the information processing apparatus 100 on the basis of application information received from the management server 120.

In the case of the typical display shown in FIG. 2, the application execution area 151 shows execution results of an image viewing application program which is currently being executed by the information processing apparatus 100. On the other hand, each of the recommended-application list display areas 152 and 153 shows a list of other application programs each recommended to the user as a program relevant to the image viewing application program, execution results of which are shown in the application execution area 151. The list is a list of information on other recommended application programs such as an image editing application program, an image scrap book application program and an image upload service application program. Each of the recommended-application list display areas 152 and 153 shows icons each associated with one of the recommended application programs relevant to the image viewing application program, execution results of which are shown in the application execution area 151, and information explaining each of the recommended application programs.

The left recommended-application list display area 152 on the left lower side of the display screen shows information on application programs which have each been executed in the past as an application program exhibiting actual performance. Thus, the displayed information is information on application programs which have already been stored in a local storage section of the information processing apparatus 100. That is to say, the displayed information is information on application programs which can each be executed immediately. In the case of the typical display shown in FIG. 2, the displayed information is information on application programs 11 to 14 which have each already stored in the local storage section.

On the other hand, the right recommended-application list display area 153 on the right lower side of the display screen shows information on application programs which have not been stored in the local storage section of the information processing apparatus 100. However, these application programs not stored yet in the local storage section of the information processing apparatus 100 can be downloaded from the application providing servers 131 to 133. In the case of the typical display shown in FIG. 2, the displayed information is information on application programs 21 to 24 which can each be downloaded from the application providing servers 131 to 133.

Figure 3:
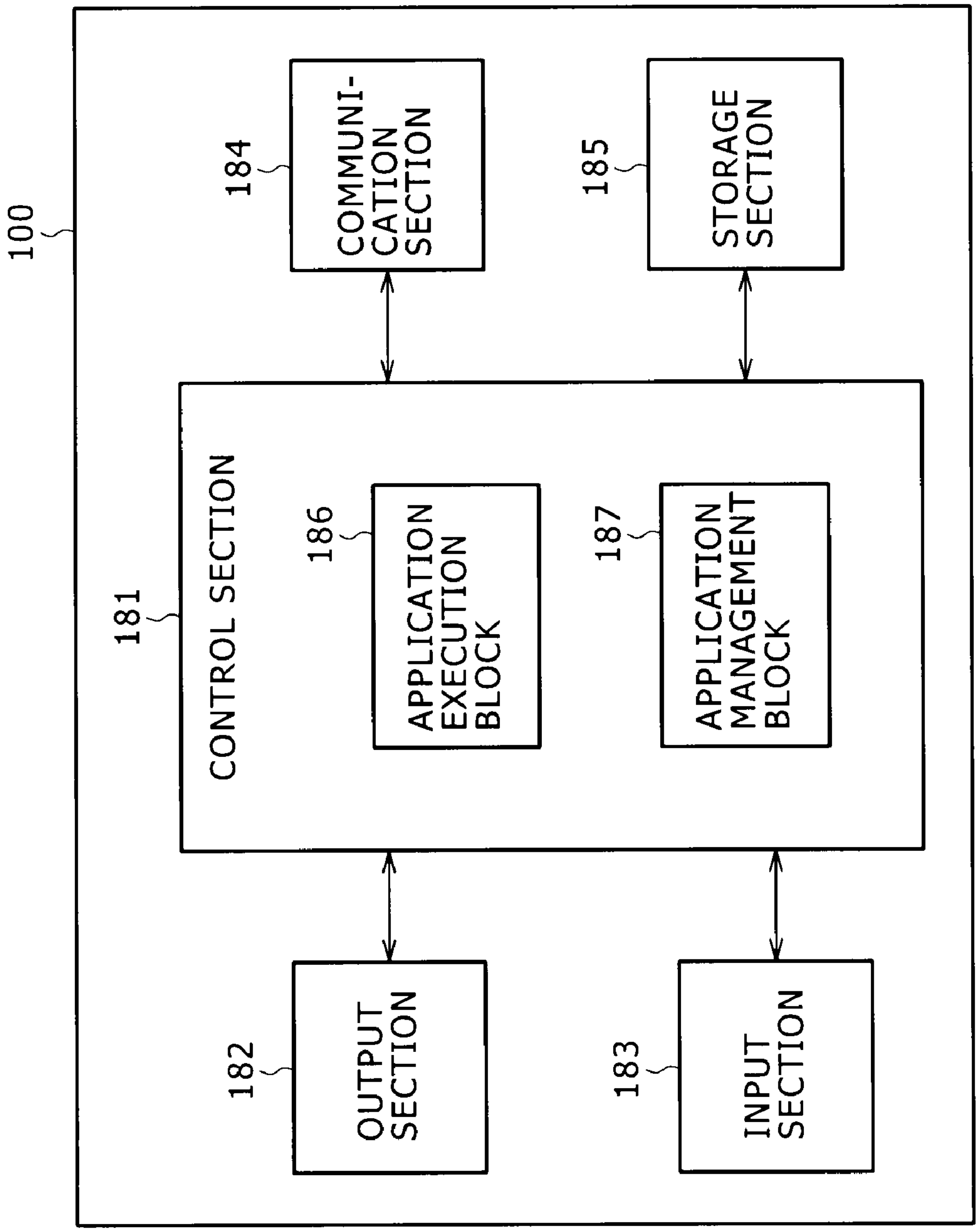
FIG. 3 is an explanatory block diagram showing a typical internal configuration of the information processing apparatus owned by the user.

FIG. 3 is an explanatory block diagram showing a typical internal configuration of the information processing apparatus 100. As shown in FIG. 3, the information processing apparatus 100 employs a control section 181, an output section 182, an input section 183, a communication section 184 and a storage section 185. The control section 181 is typically configured to include a CPU which functions as a program execution section. The output section 182 is typically configured to include display lamps such as LCDs (liquid crystal displays) and a speaker. The input section 183 is typically configured to include a keyboard and a variety of input operation units. It is to be noted that a touch panel serving as both of the output section 182 and the input section 183 can typically be utilized.

The communication section 184 carries out communications with external apparatus through a network such as the Internet. In the case of the information processing system shown in FIG. 1, the external apparatus are the management server 120 and the application providing servers 131 to 133. The storage section 185 typically includes various kinds of storage means such as a hard disc, a flash memory, a RAM and/or a ROM.

The control section 181 employs an application execution block 186 and an application management block 187. The application execution block 186 is employed for executing an application program. An application program executed by the application execution block 186 has been stored in advance in the storage section 185. The storage section 185 is also used as a storage area for storing parameters and data which are used in the execution of an application program in the application execution block 186.

In addition, the storage section 185 is also used for storing an application management program and application management information. The application management information includes information generated by the application management block 187 employed in the control section 181 and information received from the management server 120. As has been described before, the management server 120 employed in the information processing system shown in FIG. 1 provides the information processing apparatus 100 with information on application programs provided by the application providing servers 131 to 133.

The application management block 187 executes the application management program in order to carry out processing including the process to display information on application programs relevant to an application program which is currently being executed. As described earlier by referring to FIG. 2, the process to display information on application programs relevant to an application program currently being executed is carried out typically on the basis of information received from the management server 120.

The application management block 187 generates application management information including information on relationships among a plurality of application programs on the basis of information received from the management server 120 and stores the application management information in the storage section 185. In addition, the application management block 187 also updates the application management information already stored in the storage section 185 after the information processing apparatus 100 has executed an application program or has carried out a process to acquire an application program from any one of the application providing servers 131 to 133.

In addition to the process to generate application management information, the process to store the application management information in the storage section 185 and the process to update the application management information already stored in the storage section 185, the application management block 187 also carries out a process to acquire information on application programs from the management server 120.

It is to be noted that the application management block 187 also carries out a necessary process to convert data common to different application programs when the data is transferred from one of the application programs to another. In addition, the application management block 187 also stores management information for data such as parameters to be exchanged among application programs in the storage section 185 and manages the management information stored in the storage section 185. When the application execution block 186 switches execution from a specific application program to another, the management information is used in order to allow processing such as a process to pass on data from the specific application program to the other to be carried out smoothly.

Figure 4:
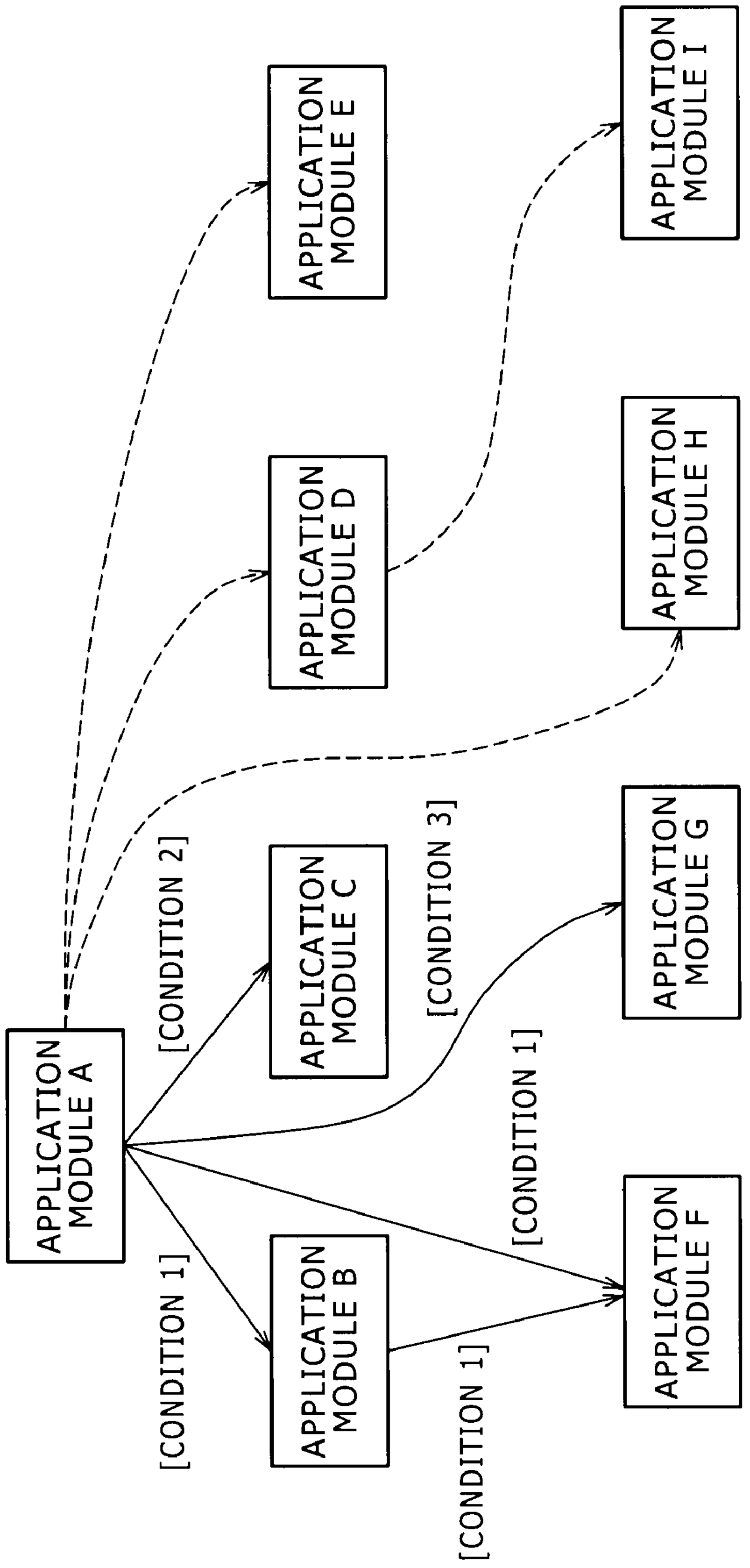
FIG. 4 is an explanatory diagram showing an outline of application management information generated by an application management block.

An outline of application management information generated by the application management block 187 is explained by referring to FIG. 4. Application management information shown in FIG. 4 is typical application management information representing relationships among application programs. It is to be noted that application management information is configured to include various kinds of information. The application management information representing relationships among application programs as shown in FIG. 4 is only a portion of complete application management information.

Each of application modules A to I shown in FIG. 4 is an application program. Any two application modules connected to each other by a solid-line arrow are each an application module already stored in a local storage section of the information processing apparatus 100. As described earlier, the local storage section of the information processing apparatus 100 is the storage section 185 shown in FIG. 3. In the typical application management information shown in FIG. 4, applications modules A, B, C, F and G are each an application program which has been stored in the storage section 185.

The application programs (that is, applications modules A, B, C, F and G) are each an application program which has a history indicating past execution in the information processing apparatus 100. An application module located at the start point of a solid-line arrow is referred to as a first application program. In the typical application management information shown in FIG. 4, application module A is the first application program. A second application program to be executed after the first application program is an application module located at the end point of the solid-line arrow connecting the first application program to the second application program. In the typical application management information shown in FIG. 4, applications modules B, C, F and G are each a second application program.

Such the plurality of application modules are connected by the solid arrows to generated pairs such as [A-B], [A-C], [A-F], and [A-G]. Each pair of application programs is registered in the application management information as pipe-connected application programs.

These pipe-connected application programs are each a candidate for an application program to be displayed in the left recommended-application list display area 152 on the lower left portion of the display screen 150 which has been explained earlier by referring to FIG. 2. For example, if a first application program (that is, application module A shown in FIG. 4) is executed with its execution state shown in the application execution area 151, each of application programs corresponding application modules connected to application module A by a solid-line arrow is a candidate for an application program to be displayed in the left recommended-application list display area 152. As described above, application modules connected to application module A are application modules B, C, F and G which are displayed in the left recommended-application list display area 152 shown in FIG. 2 and are each an application program registered in the application management information as a pipe-connected application program.

A dashed-line arrow also referred to as a virtual-line arrow shown in FIG. 4 indicates that application modules located at the start and end points of the arrow are relevant to each other even though execution has not been switched in the past to the second application program (that is, the application module located at the end point of the arrow).

In the typical application management information shown in FIG. 4, dashed-line arrows [A-D], [A-E], [A-H] and [D-I] represent the relationship described above. Information representing relationships among application programs is registered as application management information. However, even though the first application program (that is, application module A) has been stored in the local storage section of the information processing apparatus 100, second application programs (that is, application modules D, E, H and I) may have not been stored yet in the local storage section.

It is to be noted that, for example, if an application program (that is, application module D) is selected while the first application program (that is, application module A) is being executed, application modules A and D get connected to each other by a solid-line arrow. That is to say, application programs (that is, application modules A and D) are each registered in the application management information as a pipe-connected application program.

In addition, conditions 1 to 3 shown in FIG. 4 are each a condition including information indicating a case in which it is quite within the bounds of possibility that execution is switched from one application program to another. That is to say that, if a specific application program (that is, an application module located at the start point of a solid-line arrow) is being executed, the condition includes information indicating a case in which it is quite within the bounds of possibility that execution is switched from the specific application program to another application program (that is, an application module located at the end point of the same solid-line arrow).

The condition mentioned above includes the following pieces of information:

(1): Context Information

Context information typically includes the state of execution of an application program running prior to an execution switching time. To put it more concretely, typical examples of the context information are information on a state of execution going on at an image viewing time, information on a state of execution going on at an online processing time, time information at other utilizations and positional information at the other utilizations. The time information is typically obtained from a timer employed in the information processing apparatus 100 whereas the positional time is acquired from a GPS (Global Positioning System) or the like.

(2): Apparatus Information

Apparatus information is information on functions of the information processing apparatus 100. Typical examples of the apparatus information are information on the availability of the GPS, information on an image processing function and information on a sound processing function.

(3): User Profile

A typical example of a user profile is information on favorites with a user. The information on favorites with a user is automatically obtained from the category of an application program, the execution of which has been requested by the user, and stored in a storage section.

(4): Condition Information

Condition information includes a necessary function and a file type which are usable as the execution environment of an application program.

As explained before, for example, when an application program (that is, application module A shown in FIG. 4) is being executed as evidenced from the application execution area 151 of the display screen 150 shown in FIG. 2, candidates shown in the left recommended-application list display area 152 of the display screen 150 are application programs which are shown as application modules B, C, F and G respectively in FIG. 4). The order of showing the application programs (that is, application modules B, C, F and G) is determined by the application management block 187 in accordance with a condition in which the application program (that is, application module A) is being executed. By the same token, candidates shown in the right recommended-application list display area 153 are application programs which are shown as application modules D, E, H and I respectively in FIG. 4. The order of showing the application programs (that is, application modules D, E, H and I) in the right recommended-application list display area 153 is determined by the application management block 187 in accordance with a condition in which the application program (that is, application module A) is being executed. It is to be noted that, if the condition of an application program being executed has not been set yet, the setting based on the condition of the application program being executed is not applied to the order in which application programs are shown in the recommended-application list display area 152 or 153.

Conditions 1 to 3 shown in FIG. 4 are each a condition under which it is likely to switch execution from one application program to another. For example, when an application program such as application module A is being executed, a condition in which it is likely to occur execution of an application program (that is, application module B) is recorded as condition information referred to as condition 1.

The application management block 187 acquires information prevailing at the time of application switching requested by the user and uses the acquired information to update the recorded condition information from time to time, recording the updated condition information. To put it in detail, at the application switching time, the application management block 187 acquires the following pieces of information:

(1): Context information (2): Apparatus information (3): User profile, and (4): Condition information Then, the application management block 187 acquire and update the recorded condition information.

In addition, application information provided by the application providing servers 131 to 133 to the management server 120 shown in FIG. 1 also includes the condition information. On the basis of the condition information, the application management block 187 employed in the information processing apparatus 100 is capable of registering initial condition information.

FIG. 5 shows typical application information provided by the application providing servers 131 to 133 to the management server 120 as shown in FIG. 1. As shown in FIG. 5, the typical application information provided by the application providing servers 131 to 133 to the management server 120 generally includes information described as follows as information on an application program.

a: Application Type <Application>

An application type is the type of the application program. The application type includes information on the category of the application program and information explaining processing carried out by the application program. Typical examples of the category of the application program are a slide show (Slideshow), a browser and an editor.

To put it more concretely, the information on the category of the application program and the information explaining processing can be one of the following pieces of information:

(a): Media Editor

A media editor is an application program to be executed to carry out processing to edit and create a content.

(b): Media Uploader

A media uploader is an application program to be executed to carry out processing to upload a content to a server such as a Web Service Server.

(c): Media Converter

A media converter is an application program to be executed to carry out media conversion processing such as a process to rotate, enlarge or contract an image which serves as a content.

(d): Media Manager

A media manager is an application program to be executed to carry out processing to execute comprehensive management of content processes such as a process to browse a content and a process to save a content. The media manager has functions of a media database and a media browser.

(e): Media Database

A media database is an application program to be executed to carry out processing to execute database management such as a process to add a content to a database and a process to delete a content from a database.

(f): Media Browser

A media browser is an application program to be executed to carry out processing to browse a content.

The application information also includes the following pieces of information which are shown in FIG. 5.

b: Operation <Operation>

An operation is information indicating the easiness of the operation of the application program. A typical example of the operation is information indicating an automatic operation (Automatic). The operation information can also be configured to show an evaluation value representing the easiness of the operation of the application program. For example, the evaluation value is a value set by the application-program developers themselves. In addition, the following processing can also be carried out. Each user sets an evaluation value after actually making use of the application program and transmits the evaluation value to the management server 120. Then, the management server 120 updates a stored representative evaluation value on the basis of evaluation values received from users.

The application information also includes the following pieces of information which are shown in FIG. 5.

c: Application Identifier <app ID>

An application identifier is used for uniquely identifying the application program. A typical example of the application identifier is XXX.

d: Source Application <Source app>

A source application is information on other application programs relevant to the application program.

e: Condition <Condition>

A condition includes a necessary function and a file type which are usable as the execution environment of the application program. A typical example of the file type is jpg:tiff whereas a typical example of the necessary function is the function of the GPS. In addition, this piece of information may include <file type-in > and <file type-out>. <file type-in > is the type of an input file that can be processed by the application program whereas <file type-out> is the type of an output file that is output by the application program as a result of a process carried out by the application program.

f: Context <Context>

A context is typically an application execution state which prevails when switching of the application execution is recommended. To put it more concretely, typical examples of the application execution state are information on a context prevailing when an image is being viewed and information on a context prevailing when online processing is being carried out in addition to time information and positional information.

Concrete examples of the context include the following pieces of information.

(f1): Selected-Content (Material) State

For example, let a plurality of image contents be displayed on the display screen of the output section 182 employed in the information processing apparatus 100. In this case, a selected-content (material) state is a context indicating establishment of a state in which a specific image content has been selected from the image contents displayed on the display screen of the output section 182.

(f2): Enterable-Content (Material) State

For example, a state allowing a specific application program to be executed in the application execution block 186 has been established. In this case, an enterable-content (material) state is a context indicating establishment of a state which allows an input such as an image content as a subject of a process to be carried out by execution of the specific application program.

(f3): Outputtable Content (Result) State

For example, the application execution block 186 has executed a specific application program in order to carry out data processing such as an editing process and has produced a data-processing result such as an image content to be output to an external apparatus or an external server or to be used as a processing subject of another application program scheduled for later execution in the information processing apparatus 100. In this case, an outputtable content (result) state is a context indicating establishment of a state in which the application execution block 186 has completed the data processing and is ready to output the result of the data processing.

The application information also includes the following pieces of information which are shown in FIG. 5.

g: Profile <Profile>

A profile includes information on favorites with a user making a request for execution of the application program. A typical example of the profile is a creative type (Creative type).

h: Method <Method>

A method is information such as the function API of the application program.

i: Price <Price>

A price is the price of the application program. This information serves as a guide which is used by the user when the user selects the application program.

As is obvious from the above description, the application information provided by the application providing servers 131 to 133 to the management server 120 includes the following pieces of information:

a: Application type <application> e: Condition <condition> f: Context <context> g: Profile <Profile> i: Price <price>

The above pieces of information can be used as information which is initially registered in the application management information shown in FIG. 4 as conditions.

It is to be noted that, when the information processing apparatus 100 is executing a specific application program, the application management block 187 employed in the information processing apparatus 100 shows recommended application programs in the recommended-application list display areas 152 and 153 of the display screen 150 shown in FIG. 2. The list orders in which the recommended application programs are shown in the recommended-application list display areas 152 and 153 are determined by the degree of condition matching for the recommended application programs.

As described above, the left recommended-application list display area 152 typically shows pipe-connected application programs which have already been downloaded and stored in the local storage section 185 employed in the information processing apparatus 100. As described above, the order in which the pipe-connected application programs are shown in the recommended-application list display area 152 is determined by the degree of condition matching for the pipe-connected application programs. In the typical display shown in FIG. 2, the pipe-connected application programs are listed in the left recommended-application list display area 152 in the following order: the application programs 11 to 14.

On the other hand, the right recommended-application list display area 153 typically shows relevant application programs which have not been downloaded from any of the application providing servers 131 to 133 to the information processing apparatus 100 and have not been stored in the local storage section 185 employed in the information processing apparatus 100. As described above, the order in which the relevant application programs are shown in the recommended-application list display area 153 is determined by the degree of condition matching for the relevant application programs. In the typical display shown in FIG. 2, the relevant application programs are listed in the right recommended-application list display area 153 in the following order: the application programs 21 to 24.

The application management block 187 employed in the information processing apparatus 100 makes use of information on the current state and the degree of condition matching for every recommended application program as information for determining the order in which the recommended application programs are shown in the recommended-application list display areas 152 and 153.

The application management block 187 updates the conditions from time to time by taking various kinds of data into consideration in a comprehensive manner. The data includes application information created by any one of the application providing servers 131 to 133, information on the information processing apparatus 100 serving as an apparatus utilized by the user and the utilization state of an application program, the execution of which has been requested by the user.

The information or an apparatus profile on the information processing apparatus 100 is explained below.

Typically, an application program desired by a user having a single-lens reflex camera is different from an application program which is desired by a user having a compact digital camera. Let an image editing application program be used as an example. In general, the user having a single-lens reflex camera has a tendency to prefer an application program, which can be executed to carry out a complicated process, even if it is difficult to operate the application program. On the other hand, the user having a compact digital camera has a tendency to prefer an application program that can be executed by carrying out easy operations in order to perform a process even if the process is limited to simple ones.

On the basis of the function of the information processing apparatus 100 serving as an apparatus utilized by the user, the application management block 187 creates an apparatus profile. Then, the application management block 187 compares the apparatus profile with application information generated by one of the application providing servers 131 to 133 in order to verify degrees of condition matching described above. Subsequently, the application management block 187 makes use of the degrees of condition matching as information for determining the order of recommended application programs.

In addition, the application management block 187 also analyzes the state of utilization of application programs, the execution of each of which is requested by the user. For example, on the basis of an application purchasing history of the user, the application management block 187 is capable of obtaining the following information on user types. That is to say, the application management block 187 is capable of determining whether or not the user is a user of a type of liking to purchase an application program even by paying money for the application program or a user of a type of disliking to purchase a charged application program. Then, on the basis of such information on user types, the application management block 187 creates user information which is also referred to as a user profile in this invention specification.

Subsequently, the application management block 187 compares the user information also referred to as a user profile with application information generated by one of the application providing servers 131 to 133 in order to verify degrees of condition matching. Then, the application management block 187 makes use of the degrees of condition matching as information for determining the order of recommended application programs. If the user is a user of a type of disliking to purchase a charged application program, the application management block 187 regards an application program with price information set at a "free" value as an application program having a high degree of condition matching. The price information is included in the application information shown in FIG. 5. Thus, the application management block 187 places the application program with the price information set at the "free" value at a leading location.

As an alternative, the application management block 187 conducts an analysis on the category of an application program being executed. Then, on the basis of the results of the analysis, the application management block 187 determines recommended application programs to be displayed on the recommended-application lists and the order of the recommended application programs. For example, a user making use of music editing tools desires application programs for the tools, but a user having no such music editing hobbies hardly desires the application programs for the music editing tools. Thus, the application management block 187 displays recommended application programs relevant to the music editing tools only to a user having such a music editing hobby.

As described above, the application management block 187 analyzes an apparatus profile serving as information on the information processing apparatus 100 utilized by the user and a user profile used as information on favorites with the user and other user information, putting other application programs matching the characteristic of the apparatus and/or the type of the user at leading locations on the recommended-application lists.

Upon showing the recommended-application lists in the recommended-application list display areas 152 and 153, the application management block 187 typically classifies the recommended application programs by genre. For example, each of the recommended-application lists is segmented into portions each allocated to one of genres such as the image, music and accounting genres. Subsequently, the application management block 187 conducts an analysis on the apparatus and user profiles with regard to their relations with an application program being executed. Then, on the basis of the results of the analysis, the application management block 187 determines recommended application programs to be displayed on the recommended-application lists and the order of the recommended application programs.

Figure 6:
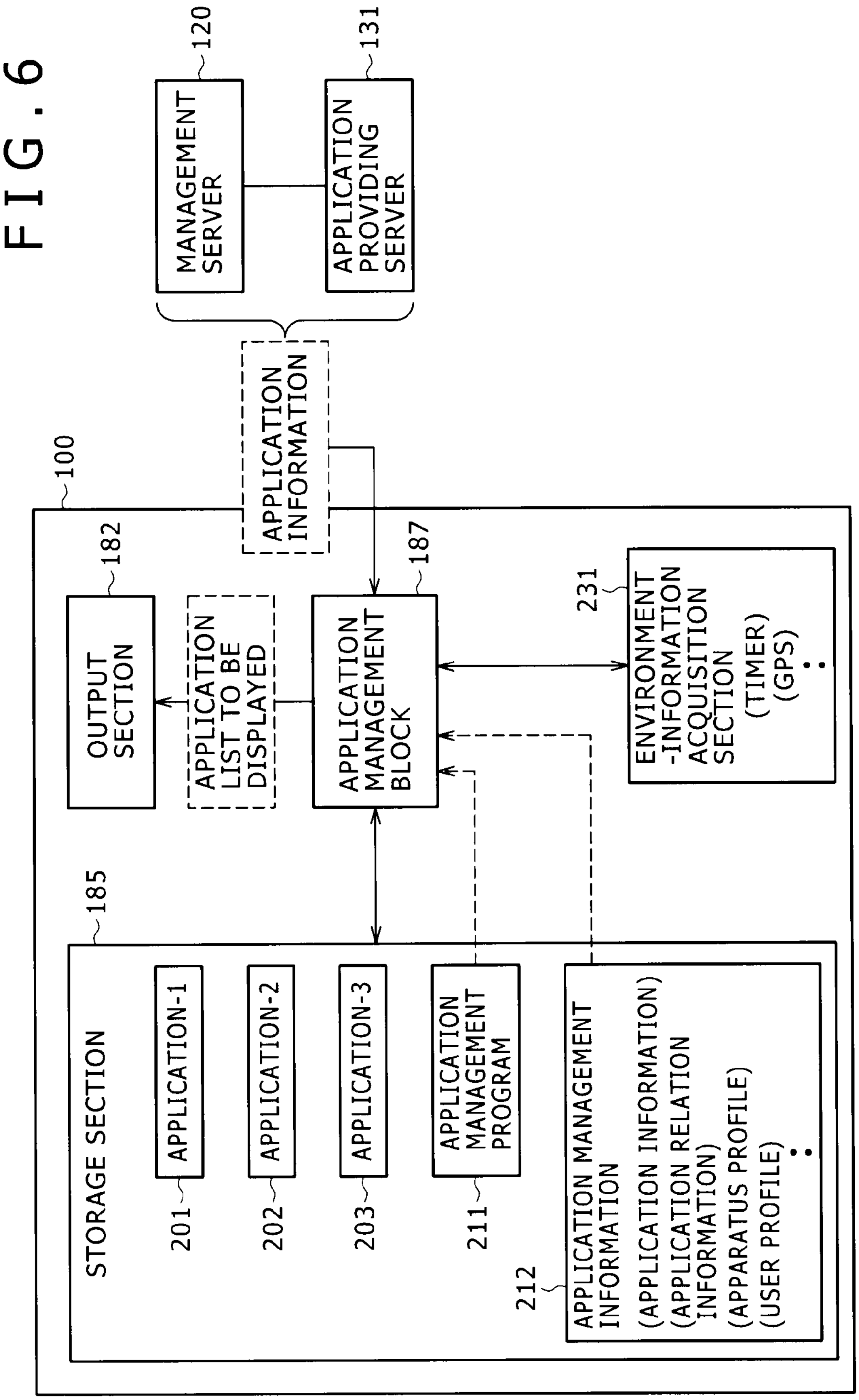
FIG. 6 is an explanatory block diagram illustrating processing carried out by the application management block included in the information processing apparatus.

Next, typical processing carried out by the application management block 187 is explained by referring to a block diagram of FIG. 6. FIG. 6 is an explanatory block diagram showing configuration components employed in the information processing system to serve as main components relevant to the processing carried out by the application management block 187 included in the information processing apparatus 100. As shown in FIG. 6, the storage section 185 employed in the information processing apparatus 100 is used for storing application programs 201 to 203 executable by the application execution block 186 which is not shown in FIG. 6 but shown in FIG. 3. In addition, the storage section 185 is also used for storing an application management program 211 and application management information 212. The application management program 211 is executed by the application management block 187 whereas the application management information 212 is acquired, generated and updated by the application management block 187.

The application management information 212 includes application information acquired from the management server 120. It is to be noted that, as explained earlier by referring to FIG. 5, the application information is information provided for each individual application program. The application information is information generated by any of the application providing servers 131 to 133 and managed by the management server 120. The application management block 187 employed in the information processing apparatus 100 receives the application information shown in FIG. 5 from the management server 120 for every application program. It is to be noted that the application management block 187 employed in the information processing apparatus 100 is also capable of receiving the application information directly from any of the application providing servers 131 to 133 for every application program without the need for the application providing server 131 to 133 to transmit the application information to the information processing apparatus 100 by way of the management server 120.

The application management block 187 stores the application information in the storage section 185 as a configuration element of the application management information 212.

When the application execution block 186 not shown in FIG. 6 but shown in FIG. 3 is executing a specific application program, the application management block 187 supplies two lists of recommended application programs relevant to the specific application program to the output section 182. Then, the output section 182 shows the two lists of recommended application programs respectively as explained earlier by referring to FIG. 2.

The left recommended-application list display area 152 shown in FIG. 2 displays a list of recommended application programs which have been stored in the storage section 185. To put it more concretely, for example, if the application execution block 186 is executing an application program such as application module A, the recommended-application list display area 152 shows a list of recommended application programs which are four pipe-connected application programs (that is, application modules B, C, F and G respectively) each linked to application module A by a solid-line arrow in FIG. 4.

On the other hand, the right recommended-application list display area 153 shown in FIG. 2 displays shows a list of recommended application programs which have not been stored in the storage section 185. To put it more concretely, for example, if the application execution block 186 is executing an application program such as application module A, the recommended-application list display area 153 shows a list of four recommended application programs (that is, application modules D, E, H and I respectively) each linked to application module A by a dashed-line arrow in FIG. 4.

The application management block 187 determines the order of showing recommended application programs in each of the recommended-application list display areas 152 and 153 on the basis of the application management information 212 stored in the storage section 185 and information obtained from an environment-information acquisition section 231 which is composed to typically include a timer and a GPS.

The application management information 212 stored in the storage section 185 includes application information created for every application program, application relation information linking application modules as explained earlier by referring to FIG. 4, apparatus information describing the profile of the information processing apparatus 100 and user information describing the profile of a user making use of the information processing apparatus 100. The application management block 187 determines the structure of each of the two recommended-application lists to be shown in the recommended-application list display areas 152 and 153 respectively, and determines the order of showing recommended application programs on the basis of the application management information 212 stored in the storage section 185 and information obtained from an environment-information acquisition section 231. Then, the application management block 187 outputs the structures and the orders to the output section 182.

It is to be noted that, as explained before by referring to FIG. 4, the application management block 187 also carries out processing such as processes to generate and update application relation information which is information showing relationships among application programs. Initially, the application management block 187 constructs the application relation information on the basis of application information which has been received from the management server 120 or another source of information. Thereafter, the application management block 187 carries out the process to update the application relation information. The process to update the application relation information includes a pipe-connecting process to set pipes between application modules as shown by solid-line arrows in FIG. 4 in accordance with the state of execution of an application program, the execution of which has been requested by the user.

For example, when a new application program is downloaded from one of the application providing servers 131 to 133 to the information processing apparatus 100 and stored in the storage section 185 the application management block 187 carries out a process to update the application relation information. The process carried out by the application management block 187 to update the application relation information is explained by referring to a diagram of FIG. 7 as follows.

Figure 7:
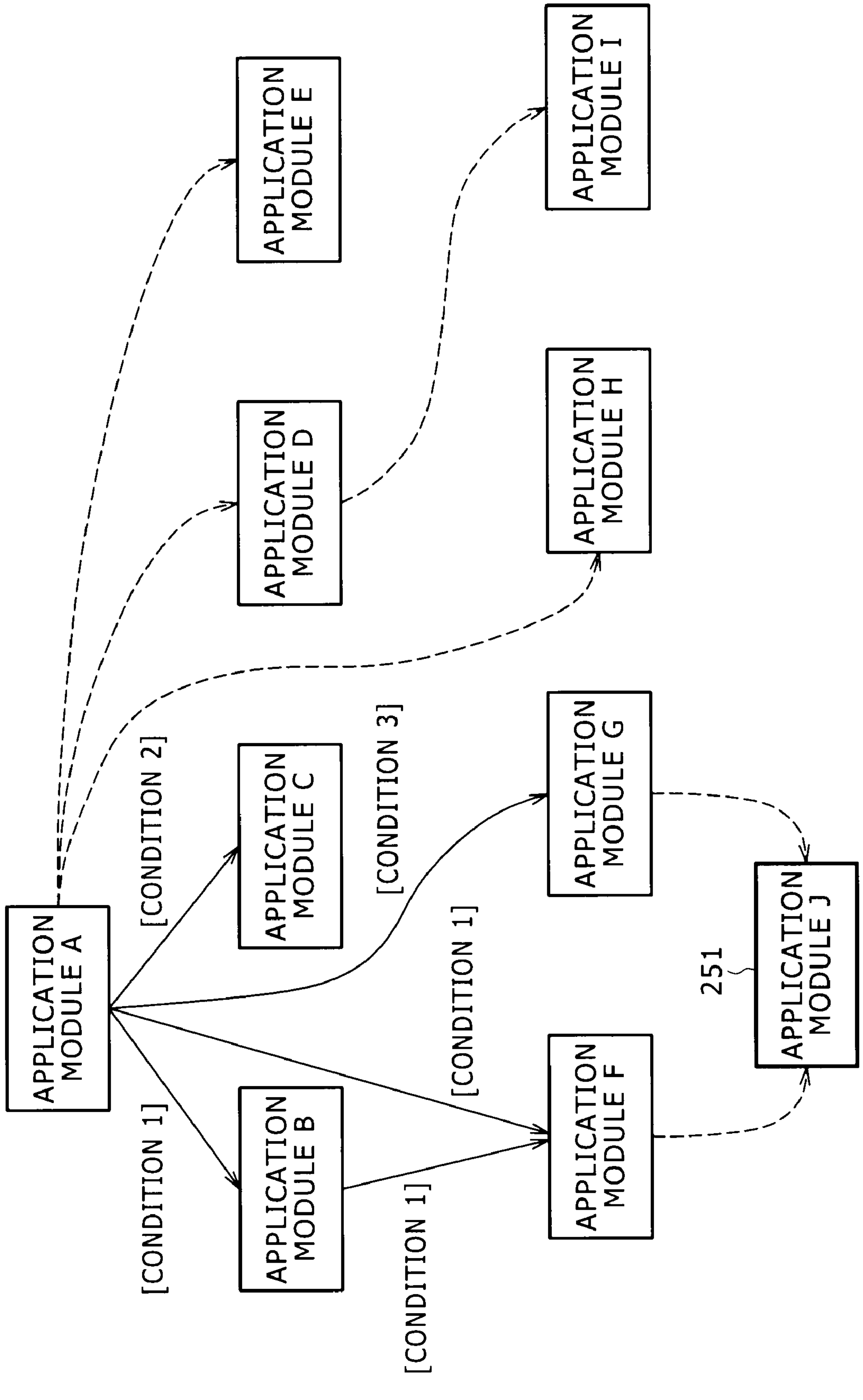
FIG. 7 is an explanatory diagram showing application relation information created by the application management block.

In FIG. 7, application module J denoted by reference numeral 251 is a new application program which has been downloaded. In this case, a linking relation is determined by referring to the application information shown in FIG. 5 for application module J denoted by reference numeral 251 and on the basis of pieces of application information already set in the application relation information for other application modules. It is to be noted that each of initial links connecting application modules F and G to application module J is expressed by a dashed-line arrow which is also referred to as a virtual arrow as described above.

Later, when the new application program (that is, application module J) is executed, the dashed-line arrow connecting application module F or G provided at the start point of the arrow to application module J provided at the end point of the arrow is updated to a solid-line arrow. Application module F or G is an application program executed right before the execution of the application program (that is, application module J). As a result of this updating process, the application program (that is, application module J) and the application program (that is, application module F or G) executed right before the execution of the application program (that is, application module J) are registered as pipe-connected application programs which are application programs connected to each other by a solid-line arrow. When the application program (that is, application module F or G) registered along with the application program (that is, application module J) as pipe-connected application programs is executed again, the application program (that is, application module J) is shown on the recommended-application list for application module F or G at a high priority level.

It is to be noted that, as described above, in a process to select an application program to be shown on a recommended-application list, the application management block 187 conducts analyses on an apparatus profile and a user profile, and sets a recommended-application list by positioning an application program determined to be an application program matching the apparatus and user profiles at a leading location on the recommended-application list. As also explained previously, the apparatus profile is information on the information processing apparatus utilized by the user whereas the user profile is information on favorites with the user and information on other things relevant to the user.

Figure 8:
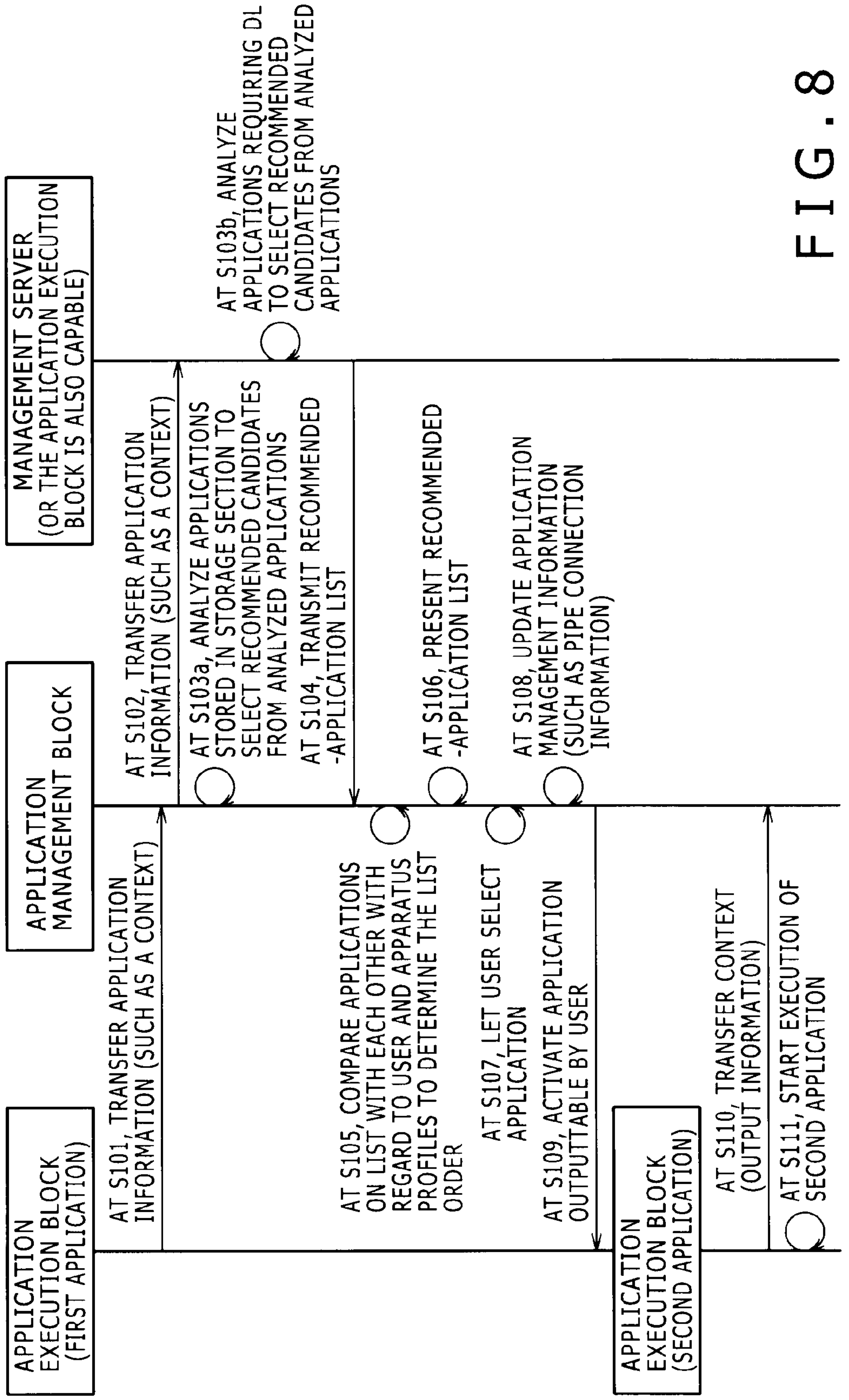
FIG. 8 is an explanatory diagram showing a sequence of processes carried out by the information processing apparatus when the application execution of an application execution block is switched from an application program to another one.

Next, by referring to a diagram of FIG. 8, the following description explains a sequence of processes carried out by the application execution block 186 when the application execution of the application execution block 186 is switched from an application program to another one.

The top of FIG. 8 shows the application execution block 186, the application management block 187 and the management server 120 which are arranged from the left side to the right side. When the application execution block 186 switches execution from a first application program being executed to a second application program to be executed next, in some cases, parameters and data which have been used so far by the first application program may be utilized thereafter by the second application program. In such cases, a process to pass on context information of the first application program to the second application program is carried out. The context information of the first application program includes information on the execution of the first application program. The application management block 187 controls the process to pass on the context information of the first application program to the second application program.

It is to be noted that, in the process sequence shown in FIG. 8, the application management block 187 shown in the top middle of the diagram as a section employed in the information processing apparatus 100 carries out processes while communicating with the management server 120 shown at the top edge on the right side. As described above, the management server 120 provides the information processing apparatus 100 with application information which is information on a variety of application programs. In the process sequence shown in FIG. 8, the management server 120 carries out processing on the application information held in the management server 120 and supplies results of the processing to the application management block 187 employed in the information processing apparatus 100.

As described previously, however, the application management block 187 employed in the information processing apparatus 100 is also capable of acquiring the application information from the management server 120, storing the application information in the storage section 185 also employed in the information processing apparatus 100 and making use of the information. In this case, the processing of the management server 120 shown at the top edge on the right side of the diagram of FIG. 8 is carried out by the application management block 187 employed in the information processing apparatus 100. In this configuration, the application management block 187 is also capable of carrying out the processing of the management server 120 without communicating with the management server 120.

The following description explains processes which are carried out sequentially in accordance with the sequence shown in FIG. 8. It is to be noted that the following description is given by assuming that the processes are carried out by three sections, i.e., the application execution block 186, the application management block 187 and the management server 120.

The sequence of processes begins with a step S101 at which the application execution block 186 executing the first application program transfers context information to the application management block 187. The context information is information on the state of execution of the first application program. The context information includes information on a data format and information on parameters used in the execution of the first application program.

Then, at the next step S102, the application management block 187 passes on the context information received from the application execution block 186 to the management server 120. Subsequently, at a step S103*b*, on the basis of the context information received from the application management block 187, the management server 120 searches each piece of application information received from the application providing servers 131 to 133 for usable application programs each relevant to the first application program. As described earlier, each piece of application information is the information shown in FIG. 5. Obtained as a result of the search operation, the usable application programs each relevant to the first application program are referred to as application programs recommended for the first application program. Then, at the next step S104, the management server 120 supplies a list of such recommended application programs to the application management block 187. The list of recommended application programs includes application information shown in FIG. 5 as information associated with each of the recommended application programs.

In the mean time, at a step S103*a*, on the basis of the context information received from the application execution block 186, the application management block 187 conducts an analysis on application programs already stored in the storage section 185 as the application execution block 186 and searches the application programs already stored in the storage section 185 for candidates for recommended application programs relevant to the first application program. Then, the application management block 187 generates a list of recommended application programs obtained as a result of the search operation. The recommended-application list created by the application management block 187 at the step S103*a* also includes application information shown in FIG. 5 as information associated with each of the recommended application programs.

That is to say, the application management block 187 creates a list of self-recommended application programs already stored in the storage section 185 and receives a list of recommended application programs not stored yet in the storage section 185 from the management server 120. It is to be noted that, as described earlier, if the application management block 187 has already received the application information for each of the recommended application programs not stored yet in the storage section 185 and has already stored the application information in the storage section 185, the application management block 187 is capable of creating the list of recommended application programs not stored yet in the storage section 185 without communicating with the management server 120.

Then, at the next step S105, the application management block 187 retrieves application management information such as a user profile and an apparatus profile from the storage section 185. Subsequently, on the basis of the application management information, the application management block 187 compares application programs included in the recommended-application program list received from the management server 120 with each other with regard to the user and apparatus profiles. That is to say, the application management block 187 determines the degree of matching for every recommended application program. The matching degrees found for the recommended application programs are used to set an order in which the recommended application programs are to be shown as a list in the right recommended-application list display area 153.

By the same token, the application management block 187 compares application programs included in the recommended-application program list generated by the application management block 187 itself with each other with regard to the user and apparatus profiles. That is to say, the application management block 187 determines the degree of matching for every recommended application program. The matching degrees found for the recommended application programs are used to set another order in which the recommended application programs are to be shown as another list in the left recommended-application list display area 152.

Then, at the next step S106, the application management block 187 shows the recommended application programs on the list in the recommended-application list display area on the display screen 150 in the order determined for the application programs as described above.

It is to be noted that, in the case of the typical display screen 150 shown in FIG. 2, the application management block 187 displays the recommended application programs already stored in the storage section 185 employed in the information processing apparatus 100 on the other list in the recommended-application list display area 152 in accordance with the other order determined for the application programs as described above. By the same token, the application management block 187 displays the recommended application programs, which have not stored yet in the storage section 185 employed in the information processing apparatus 100 and thus need to be downloaded, on the list in the recommended-application list display area 153 in accordance with the order determined for the application programs as described above.

Then, at the next step S107, the user selects a desired application program from the recommended application programs shown on the display screen 150 as an application program to be executed. To put it more concretely, the user selects the desired application program by clicking an icon displayed on a recommended-application list to serve as an icon that represents the application program.

When the user clicks the icon representing an application program, information on the application program specified by the user is supplied to the application management block 187. Then, first of all, at the next step S108, the application management block 187 updates the application management information. For example, an application linking state in the application relation information linking application modules as explained earlier by referring to FIG. 4 is changed to reflect the registration of the application program specified by the user as a pipe-connected application program.

Then, at the next step S109, a process to activate the application program selected by the user at the step S107 is carried out. This application program is referred to as the second application program. Then, at the next step S110, the application management block 187 provides the application execution block 186 with the context information which was received by the application management block 187 from the application execution block 186 at the step S101. As described above, the context information is a state of execution of the first application program. The state of execution includes processing parameters and data which were used by the first application program. Then, at the next step S111, the application execution block 186 starts the execution of the second application program.

It is to be noted that, if it is necessary to carry out a process to convert the formats of the processing parameters and the data which were used by the first application program into formats usable by the second application program, the application management block 187 performs this format conversion process. Information indicating whether or not it is necessary to carry out this format conversion process and the type of the process can be obtained from application information provided for the first and second application programs.

If the application program selected by the user at the step S107 is not an application program not stored yet in the storage section 185 employed in the information processing apparatus 100, the application management block 187 acquires a URL (uniform resource locator) from the application information for the selected application program as the URL pertaining to an application providing server from which the application program is to be downloaded. Then, the information processing apparatus 100 carries out a process to download the specified application program from the URL pertaining to one of the application providing servers 131 to 133 and store the application program in the storage section 185. In addition, the application management block 187 updates the application management information in order to reflect the completion of this application downloading and storing process.

As described above, in the processing sequence shown in FIG. 8, after the application execution block 186 has executed the first application program, the application execution block 186 starts the execution of the second application program. In this way, the application execution block 186 consecutively executes different application programs. In some cases, after the application execution block 186 has executed the second application program, the application execution block 186 executes a third application program to be followed by a fourth application program and so on.

The application management block 187 can also be configured to include a history in the application management information stored in the storage section 185. The history included in the application management information is a history of executions of application programs which have been executed by the application execution block 186. The application management block 187 retrieves the application history from the storage section 185 and displays the history on the display screen 150. For example, as shown in a diagram of FIG. 9, the display screen 150 includes an application execution history information display area 154 for displaying a history of executions of application programs which have been executed by the application execution block 186 in the information processing apparatus 100.

It is to be noted that display data such as an icon associated with an application program includes link information used in a process to invoke the application program. Thus, when the user clicks the icon, the application program represented by the icon can be activated.

(3): Typical Concrete Embodiments of the Processing to Recommend Application Programs The following description explains typical concrete embodiments of the processing to recommend application programs. As described earlier, in the information processing apparatus 100, the application management block 187 is typically monitoring the state of execution of an application program in the application execution block 186 in order to generate or update application management information. Then, the application management block 187 stores the generated or updated application management information in the storage section 185. In addition, if necessary, the application management block 187 supplies the application management information to the management server 120.

For example, in the information processing apparatus 100, the application management block 187 acquires information on a history of executions of application programs executed by the application execution block 186 and stores the information in the storage section 185. The information on such a history is also referred to as an application execution log. In addition, the application management block 187 makes use of the information on a history of executions of application programs in order to carry out a process to update the application management information. To put it more concretely, for example, the application management block 187 carries out processing such as a process to set an application linking state of application relation information explained before by referring to FIG. 4 in a pipe connection state represented by a solid-line arrow shown in the same figure. In addition, the application management block 187 also displays the information on a history of executions of application programs on the application execution history information display area 154 explained earlier by referring to FIG. 9.

As described above, in the information processing apparatus 100, the application management block 187 acquires information on a history (or a log) of executions of application programs executed by the application execution block 186 and generates or updates application management information.

In addition, the application management block 187 carries out a process to select application programs recommended for execution and display information on the application programs. In this process, the application management block 187 typically acquires application information such as a context from the application execution block 186 executing an application program and determines each of the recommended application programs as an application program recommended to be executed next on the basis of the application information. The recommended programs are displayed in the recommended-application list display areas 152 and 153 shown in FIGS. 2 and 9.

The processing to display information on the recommended application programs and execute an application program selected from the displayed information on the recommended application programs has been described earlier by referring to the processing sequence shown in FIG. 8. As described earlier, the processing sequence shown in FIG. 8 begins with a step S101 at which the application execution block 186 executing an application program transfers application information including context information to the application management block 187.

Then, at the next step S102 of the processing sequence shown in FIG. 8, the application management block 187 passes on the application information received from the application execution block 186 to the management server 120. Subsequently, at a step S103*a*, on the basis of the application information received from the application management block 186, the application management block 187 carries out an operation to search application programs already stored in the storage section 185 for candidates for recommended application programs relevant to the application program being executed. Then, the application management block 187 generates an application list including information on the recommended application programs found in the search operation.

It is to be noted that the recommended application programs on the generated list are application programs which have already been stored in the storage section 185. In the mean time, the management server 120 receives the application information including context information from the application management block 187 at the step S102 of the processing sequence shown in FIG. 8. Then, at a step S103*b*, on the basis of the application information received from the application management block 187, the management server 120 generates another list including information on recommended application programs which have not been stored yet in the storage section 185. Subsequently, at the next step S104, the management server 120 transmits the other list to the information processing apparatus 100 employing the application management block 187.

The following description explains a typical example of processing carried out by the application management block 187 and the management server 120 to recommend application programs to the user.

It is to be noted that, in an embodiment described below, application programs executed by the information processing apparatus 100 shown in FIG. 1 are 6 application programs (a) to (f) shown in FIG. 10. The six application programs are listed as follows:

(a): Media editor
(b): Media uploader
(c): Media converter
(d): Media manager
(e): Media database
(f): Media browser Application programs (a) to (f) listed above are described as follows.

(a): Media Editor

A media editor is an application program to be executed to carry out processing to edit and create a content.

(b): Media Uploader

A media uploader is an application program to be executed to carry out processing to upload a content to a server such as a Web Service Server.

(c): Media Converter

A media converter is an application program to be executed to carry out media conversion processing such as a process to rotate, enlarge or contract an image which serves as a content.

(d): Media Manager

A media manager is an application program to be executed to carry out processing to execute comprehensive management of content processes such as a process to browse a content and a process to save a content. The media manager has functions of a media database and a media browser.

(e): Media Database

A media database is an application program to be executed to carry out processing to execute database management such as a process to add a content to a database and a process to delete a content from a database.

(f): Media Browser

A media browser is an application program to be executed to carry out processing to browse a content.

The application execution block 186 employed in the information processing apparatus 100 executes at least one of application programs (a) to (f) listed above. In the information processing apparatus 100, when the information processing apparatus 100 executes any one of application programs (a) to (f) listed above, the application execution block 186 supplies application information including context information to the application management block 187 as explained earlier in the description of the step S101 of the processing sequence shown in FIG. 8.

Figure 9:
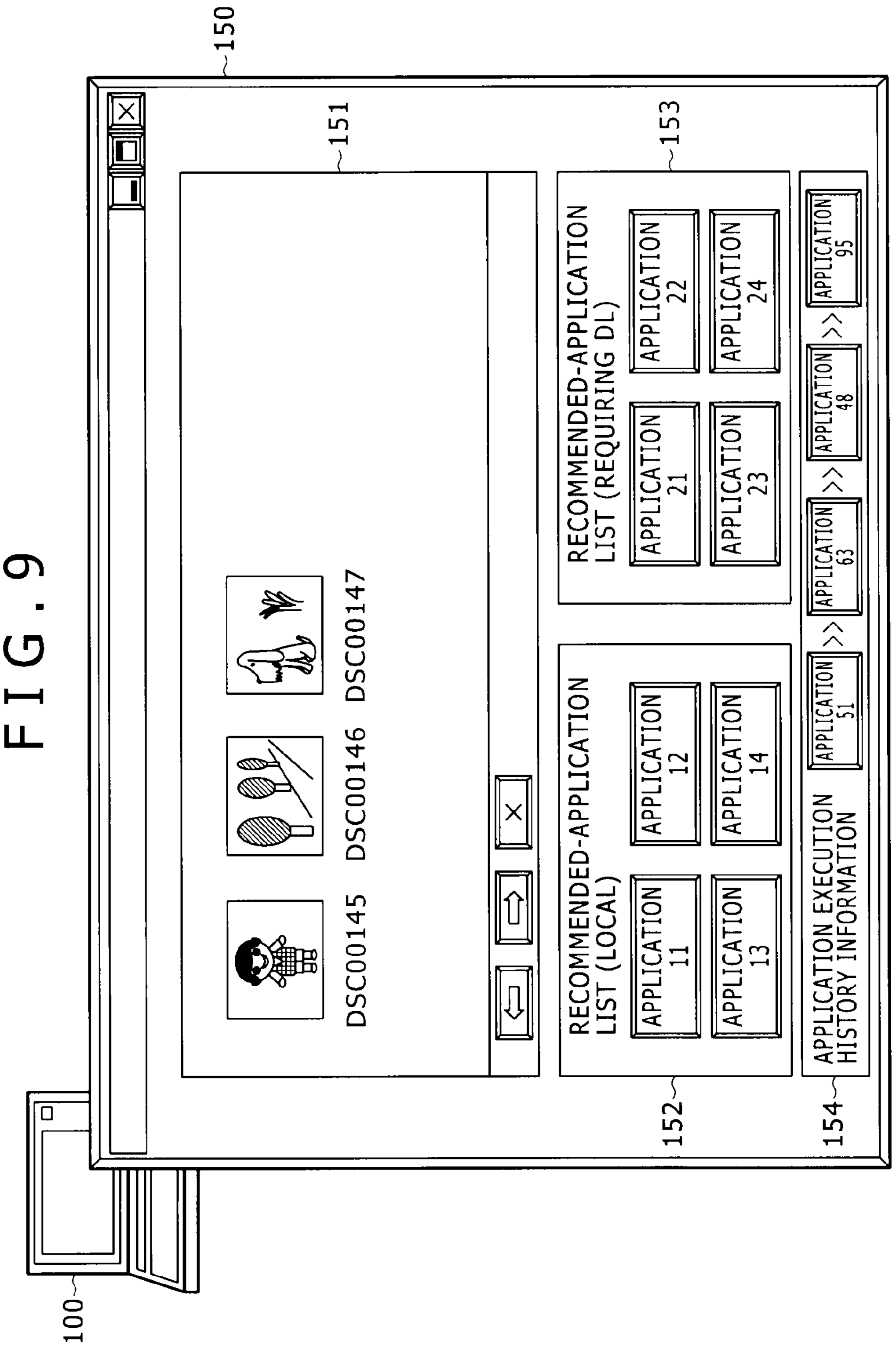
FIG. 9 is an explanatory diagram showing a display screen displayed by the information processing apparatus owned by the user showing a typical history of application executions.

Then, at the next step S102 of the processing sequence shown in FIG. 8, the application management block 187 passes on the application information to the management server 120. Subsequently, at a step S103*a* of the processing sequence shown in FIG. 8, on the basis of the application information received from the application management block 186, the application management block 187 carries out an operation to search application programs already stored in the storage section 185 for candidates for recommended application programs relevant to the application program being executed. Then, the application management block 187 generates an application list including information on the recommended application programs found in the search operation. Subsequently, at a step S103*b* of the processing sequence shown in FIG. 8, on the basis of the application information, the management server 120 generates another list including information on recommended application programs which have not been stored yet in the storage section 185 employed in the information processing apparatus 100. Then, at the next step S104, the management server 120 transmits the other list to the application management block 187. Subsequently, the application management block 187 carries out a process to output the list generated by the application management block 187 at the step S103*a* and the other list generated by the management server 120 at the step S103*b* to the output section 182 employed in the information processing apparatus 100 to serve as a display unit to be displayed respectively in the recommended-application list display areas 152 and 153 which are shown in FIGS. 2 and 9.

The following description explains a typical concrete example of the application information supplied by the application execution block 186 to the application management block 187 as well as a plurality of typical embodiments each implementing the processes to generate the lists of recommended application programs and display the lists.

First of all, the following description explains three typical concrete examples of the process to select recommended applications.

Typical Concrete Example 1

This typical process is carried out to select recommended application programs on the basis of context information.

Typical Concrete Examples 2

This typical process is carried out to select recommended application programs on the basis of information on the used content.

Typical Concrete Examples 3

This typical process is carried out to select recommended application programs on the basis of information on the type of the used application program. Typical concrete examples 1 of processing carried out to select recommended application programs on the basis of context information To begin with, the following description explains typical concrete examples of a process carried out to select recommended application programs on the basis of context information.

At the step S101 of the processing sequence shown in FIG. 10, the application execution block 186 executing an application program transfers application information including context information for the application program to the application management block 187. The context information includes information on the state of execution of the application program, information on a data format usable in the process of executing the application program and information on parameters used in the execution of the application program.

It is to be noted that, in an embodiment described below, it is assumed that the application execution block 186 provides the application management block 187 with context information shown in FIG. 11. As shown in FIG. 11, the context information includes the following pieces of information:

(P): Selected-content (material) state (Q): Enterable-content (material) state (R): Outputtable content (result) state Any of the three above pieces of information is generated by the application execution block 186 in accordance with the state of execution of the application program in the application execution block 186 and supplied to the application management block 187.

It is to be noted that, in the embodiment to be described below, the application execution block 186 is executing at least one of application programs (a) to (f) shown in FIG. 10 and, in the course of the execution of any one of the application programs, the application execution block 186 generates any of context information (P) to (R) shown in FIG. 11 as a context showing the state of the execution of the application program and supplies the generated context information to the application management block 187.

The pieces of context information (P) to (R) shown in FIG. 11 are described as follows.

(P): Selected-Content (Material) State

A selected-content (material) state is typically a context generated in the course of execution of an application program such as a media manager, a media browser or a media editor in the application execution block 186. For example, let a plurality of image contents be displayed on the display screen of the output section 182 employed in the information processing apparatus 100. In this case, a selected-content (material) state is a context indicating establishment of a state in which one of the specific image contents has been selected from the image contents displayed on the display screen of the output section 182.

(Q): Enterable-Content (Material) State

For example, a state allowing a specific application program to be executed in the application execution block 186 has been established. In this case, an enterable-content (material) state is a context indicating establishment of a state which allows an input such as an image content to be entered to serve as a subject of a process to be carried out by execution of the specific application program.

(R): Outputtable Content (Result) State

For example, the application execution block 186 has executed a specific application program in order to carry out data processing such as an editing process and has produced a data-processing result such as an image content to be output to an external apparatus or an external server or to be used as a processing subject of another application program scheduled for later execution in the information processing apparatus 100. In this case, an outputtable content (result) state is a context indicating establishment of a state in which the application execution block 186 has completed the data processing and is ready to output the result of the data processing. It is to be noted that the term "outputtable" is used not only to imply that the information processing apparatus 100 is capable of outputting the data-processing result such as an image content to an external apparatus or an external server, but also to imply that the application program being executed by the application execution block 186 is capable of transferring the data-processing result to another application program in a data-passing process. In the latter case, the data processing includes a process of outputting data to the other application program.

Next, by referring to FIGS. 12A to 14C, the following description explains typical concrete examples of the processing to select recommended application programs in accordance with various kinds of context information.

Typical Concrete Example 1-a

The application information supplied by the application execution block 186 to the application management block 187 includes the type of the application program being executed by the application execution block 186 and a selected-content (material) state. In this typical example, the type of the application program being executed by the application execution block 186 is the media manager. As described earlier, the selected-content (material) state is a sort of context information. On the assumption that the application information supplied by the application execution block 186 to the application management block 187 includes the type of the application program and a selected-content (material) state, the processing to select and display recommended application programs is explained by referring to FIGS. 12A to 12C as follows.

Figure 12A:
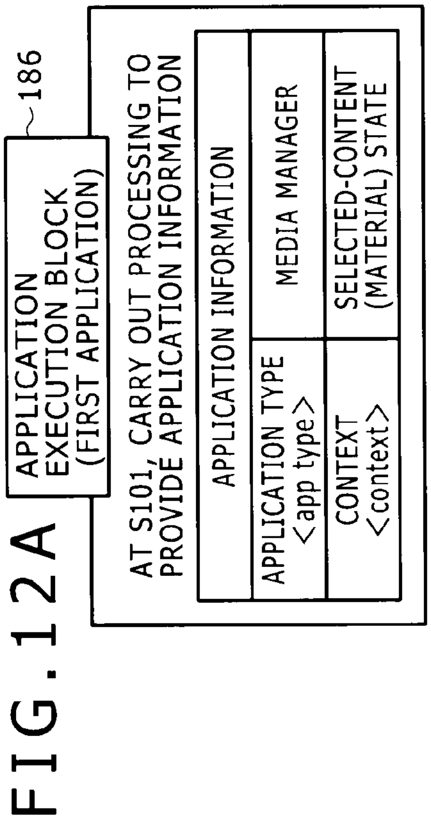
FIGS. 12A to 15C are a plurality of explanatory diagrams showing a typical concrete example of processing to recommend application programs.
Figure 12B:
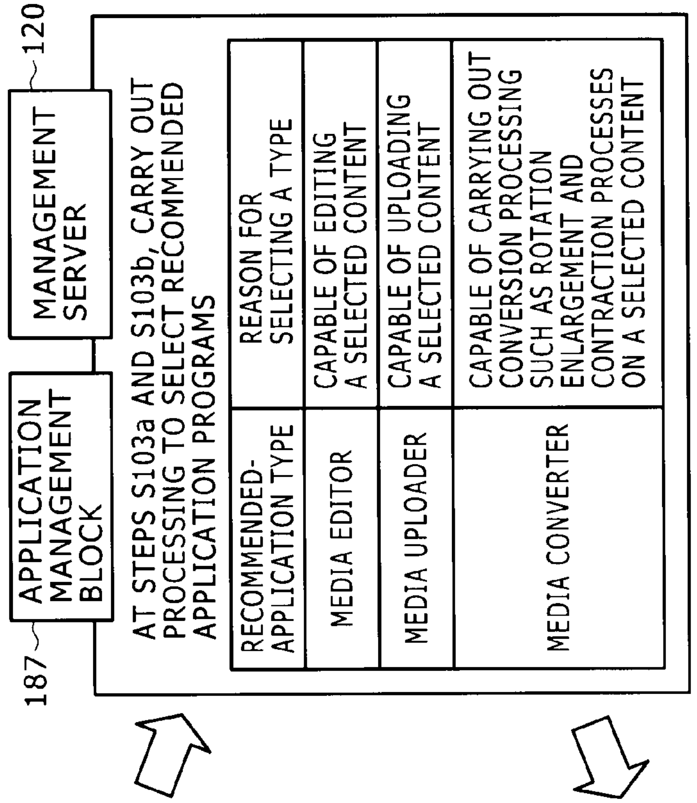
Figure 12C:
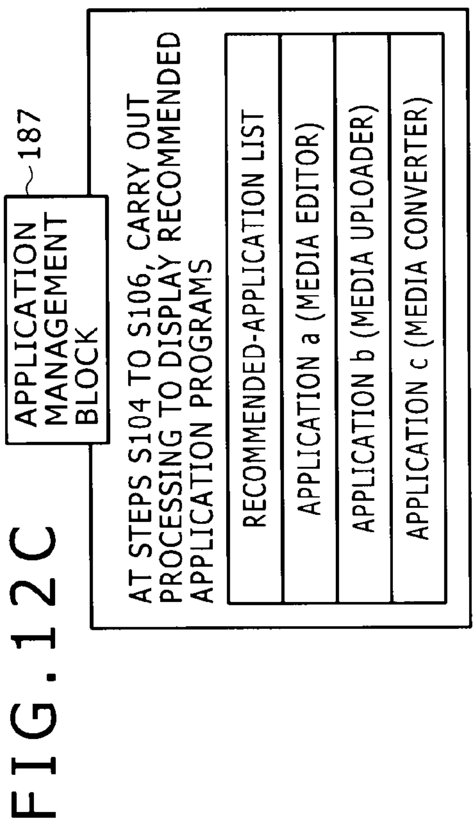

FIGS. 12A to 12C are a plurality of diagrams which show processes carried out by the application execution block 186, the application management block 187 and the management server 120 by associating the processes with the steps S101 to S of the processing sequence shown in FIG. 8. To be more specific, the processes carried out by the application execution block 186, the application management block 187 and the management server 120 are associated with the steps S101 to S106 as follows:

(A): FIG. 12A shows the process carried out by the application execution block 186 at the step S101 of the processing sequence shown in FIG. 8 to supply application information to the application management block 187.

(B): FIG. 12B shows the process carried out by the application management block 187 at the step S103*a* and S103*b* of the processing sequence shown in FIG. 8 to select recommended application programs.

(C): FIG. 12C shows the processes carried out by the application management block 187 at the steps S104 to S106 of the processing sequence shown in FIG. 8 to display the lists each showing recommended application programs.

The application execution block 186 shown in FIG. 12A is executing an application program. In the course of the application execution, the application execution block 186 supplies application information shown in FIG. 12A to the application management block 187. This process carried out by the application execution block 186 is the process performed at the step S101 shown in FIG. 8.

In the typical processing shown in FIGS. 12A to 12C, the application information supplied by the application execution block 186 to the application management block 187 includes the so-called media-manager type indicating the type of the application program being executed by the application execution block 186 and a selected-content (material) state serving as context information. The application execution block 186 supplies the application management block 187 with the media manager and the selected-content (material) state. It is to be noted that the application management block 187 passes on the application information to the management server 120.

As shown in FIG. 12B, the application management block 187 and the management server 120 selects recommended application programs on the basis of the application information received from the application execution block 186. The processes carried out by the application management block 187 and the management server 120 to select recommended application programs are performed at the steps S103*a* and S103*b* of the processing sequence shown in FIG. 8.

To put it in more detail, as described above, the application information supplied by the application execution block 186 to the application management block 187 and the management server 120 includes the media-manager type indicating the type of the application program being executed by the application execution block 186 and a selected-content (material) state serving as context information. On the basis of the media-manager type and the selected-content (material) state, the application management block 187 and the management server 120 select, determine and recommend application programs as proper application programs to be executed next by the application execution block 186.

The application management block 187 carries out the process to select the recommended application programs by referring to application information shown in FIG. 5 as information on application programs which have already been stored in the storage section 185. On the other hand, the management server 120 carries out the process to select the recommended application programs by referring to application information shown in FIG. 5 as information on application programs which have not been stored yet in the storage section 185 but can be downloaded to the information processing apparatus 100 from a variety of application providing servers such as the application providing servers 131 to 133.

As shown in FIG. 12B, the types of application programs that are selected by carrying out the process to select recommended application programs are enumerated as follows: the media editor, the media uploader and the media converter.

As described above, any of these application types are selected on the basis of application information originated by the application execution block 186 as information including the media-manager type indicating the type of the application program being executed by the application execution block 186 and a selected-content (material) state serving as context information.

The media editor, the media uploader and the media converter which are shown in FIG. 12B are selected in the selected-content (material) state as a recommended application program for reasons described as follows. The media editor is selected because this application program can be used for editing the selected content. The media uploader is selected because this application program can be used for uploading the selected content to a content providing server. The media converter is selected because this application program can be used for carrying out a data conversion process on the selected content. Typical examples of the data conversion process are a data rotation process and a data contraction process. Thus, each of the media editor, the media uploader and the media converter is selected as a recommended application program for the reasons described above.

A list of recommended application programs already stored in the storage section 185 and another list of recommended application programs not stored yet in the storage section 185 are created and displayed on the output section 182 employed in the information processing apparatus 100 to serve as a display unit. A typical format of the lists is shown in FIG. 12C. On the output section 182, the list of recommended application programs are displayed in the recommended-application list display areas 152 and 153 which are shown in FIGS. 2 and 9.

As shown in FIG. 12C, each of the list of recommended application programs already stored in the storage section 185 and the other list of recommended application programs not stored yet in the storage section 185 shows application programs in the following format:

Application program a (media editor)
Application program b (media uploader)
Application program c (media converter)

In the format shown above, each of application program a, application program b and application program c is the name of an actual application program. Each of the media editor, the media uploader and the media converter is the type of the application program to which the application type is appended in the format. The type of each application program is shown in the display as reference information.

The diagram of FIG. 12C shows only one list of recommended application programs. It is to be noted, however, that the list created by the application management block 187 as a list of recommended application programs already stored in the storage section 185 is actually displayed in the left recommended-application list display area 152 as shown in FIGS. 2 and 9 whereas the other list created by the management server 120 as a list of recommended application programs not stored yet in the storage section 185 is actually displayed in the right recommended-application list display area 153 as shown in FIGS. 2 and 9.

Typical Concrete Example 1-b

Typical concrete example 1-b is explained by referring to FIGS. 13A to 13C as follows.

In this typical example, the application information supplied by the application execution block 186 to the application management block 187 includes an enterable-content (material) state. On the assumption that the application information supplied by the application execution block 186 to the application management block 187 includes an enterable-content (material) state, the processing to select and display recommended application programs is explained by referring to FIGS. 13A to 13C as follows.

Much like FIGS. 12A to 12C, FIGS. 13A to 13C are a plurality of diagrams which show processes carried out by the application execution block 186, the application management block 187 and the management server 120 by associating the processes with the steps S101 to S106 of the processing sequence shown in FIG. 8. To be more specific, the processes carried out by the application execution block 186, the application management block 187 and the management server 120 are associated with the steps S101 to S106 as follows:

(A): FIG. 13A shows the process carried out by the application execution block 186 at the step S101 of the processing sequence shown in FIG. 8 to supply application information to the application management block 187.

(B): FIG. 13B shows the process carried out by the application management block 187 and the management server 120 at the steps S103*a* and S103*b* of the processing sequence shown in FIG. 8 to select recommended application programs.

(C): FIG. 13C shows the processes carried out by the application management block 187 at the steps S104 to S106 of the processing sequence shown in FIG. 8 to display the lists each showing recommended application programs.

Figure 13A:
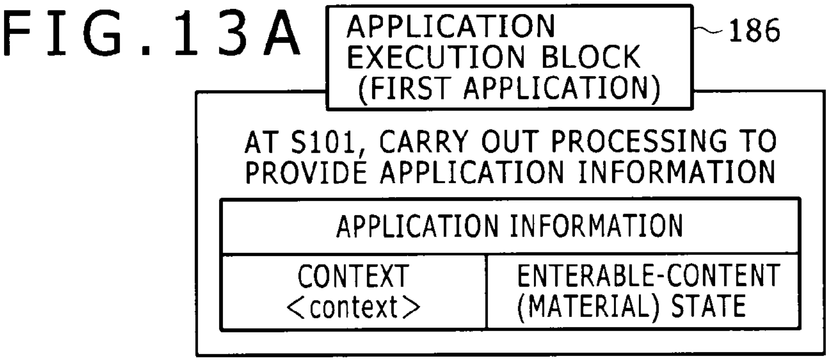

The application execution block 186 shown in FIG. 13A is executing an application program. In the course of the application execution, the application execution block 186 supplies application information shown in FIG. 13A to the application management block 187. This process is the process performed at the step S101 of the processing sequence shown in FIG. 8.

Figure 13B:
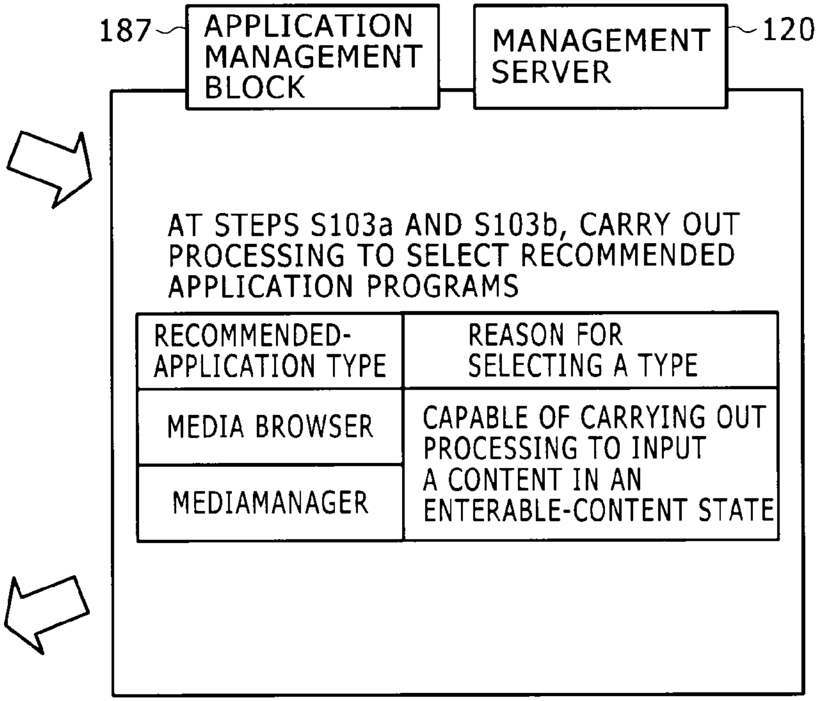
Figure 13C:
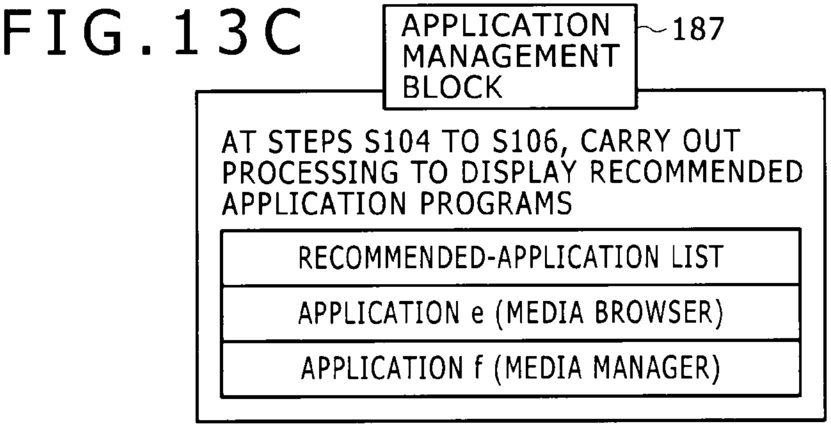

In the typical processing shown in FIGS. 13A to 13C, the application information supplied by the application execution block 186 to the application management block 187 includes an enterable-content (material) state serving as context information. The application execution block 186 supplies the application management block 187 with the enterable-content (material) state. It is to be noted that the application management block 187 passes on the application information to the management server 120.

As shown in FIG. 13B, the application management block 187 and the management server 120 select recommended application programs on the basis of the application information received from the application execution block 186. The processes carried out by the application management block 187 and the management server 120 to select recommended application programs are the processes performed at the steps S103*a* and S103*b* of the processing sequence shown in FIG. 8.

To put it in more detail, as described above, the application information supplied by the application execution block 186 to the application management block 187 and the management server 120 includes an enterable-content (material) state serving as context information. On the basis of the enterable-content (material) state, the application management block 187 and the management server 120 select, determine and recommend application programs as proper application programs to be executed next by the application execution block 186.

As shown in FIG. 13B, the types of application programs that are selected by carrying out the process to select recommended application programs are listed as follows: the media browser and the media manager.

As described above, any of these application types are selected on the basis of application information originated by the application execution block 186 as information including an enterable-content (material) state serving as context information.

Each of the media browser and the media manager which are shown in FIG. 13B is selected as a recommended application program for a reason described as follows. The media browser and the media manager are selected because these application programs can be used for inputting an entered content in the enterable-content (material) state. Thus, the media browser and the media manager are each selected as a recommended application program for the reason described above.

A list of recommended application programs already stored in the storage section 185 and another list of recommended application programs not stored yet in the storage section 185 are created and displayed on the output section 182 employed in the information processing apparatus 100 to serve as a display unit. A typical format of the lists is shown in FIG. 13C. On the output section 182, the list of recommended application programs are displayed in the recommended-application list display areas 152 and 153 which are shown in FIGS. 2 and 9.

As shown in FIG. 13C, each of the list of recommended application programs already stored in the storage section 185 and the other list of recommended application programs not stored yet in the storage section 185 shows application programs in the following format:

Application program e (media browser)

Application program f (media manager)

The diagram of FIG. 13C shows only one list of recommended application programs. It is to be noted, however, that the list created by the application management block 187 as a list of recommended application programs already stored in the storage section 185 is actually displayed in the left recommended-application list display area 152 as shown in FIGS. 2 and 9 whereas the other list created by the management server 120 as a list of recommended application programs not stored yet in the storage section 185 is actually displayed in the right recommended-application list display area 153 as shown in FIGS. 2 and 9.

Typical Concrete Example 1-c

Typical concrete example 1-c is explained by referring to FIGS. 14A to 14C as follows.

In this typical example, the application information supplied by the application execution block 186 to the application management block 187 includes an outputtable-content (result) state. On the assumption that the application information supplied by the application execution block 186 to the application management block 187 includes an outputtable-content (result) state, the processing to select and display recommended application programs is explained by referring to FIGS. 14A to 14C as follows.

Much like FIGS. 12A to 13C, FIGS. 14A to 14C are a plurality of diagrams which show processes carried out by the application execution block 186, the application management block 187 and the management server 120 by associating the processes with the steps S101 to S106 of the processing sequence shown in FIG. 8. To be more specific, the processes carried out by the application execution block 186, the application management block 187 and the management server 120 are associated with the steps S101 to S106 as follows:

(A): FIG. 14A shows the process carried out by the application execution block 186 at the step S101 of the processing sequence shown in FIG. 8 to supply application information to the application management block 187.

(B): FIG. 14B shows the process carried out by the application management block 187 and the management server 120 at the steps S103*a* and S103*b* of the processing sequence shown in FIG. 8 to select recommended application programs.

(C): FIG. 14C shows the processes carried out by the application management block 187 at the steps S104 to S106 of the processing sequence shown in FIG. 8 to display the lists each showing recommended application programs.

Figure 14A:
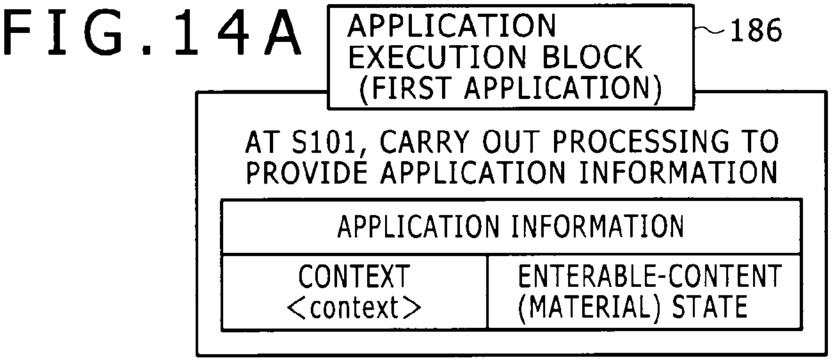

The application execution block 186 shown in FIG. 14A is executing an application program. In the course of the application execution, the application execution block 186 supplies application information shown in FIG. 14A to the application management block 187. This process carried out by the application execution block 186 is the process performed at the step S101 shown in FIG. 8.

Figure 14B:
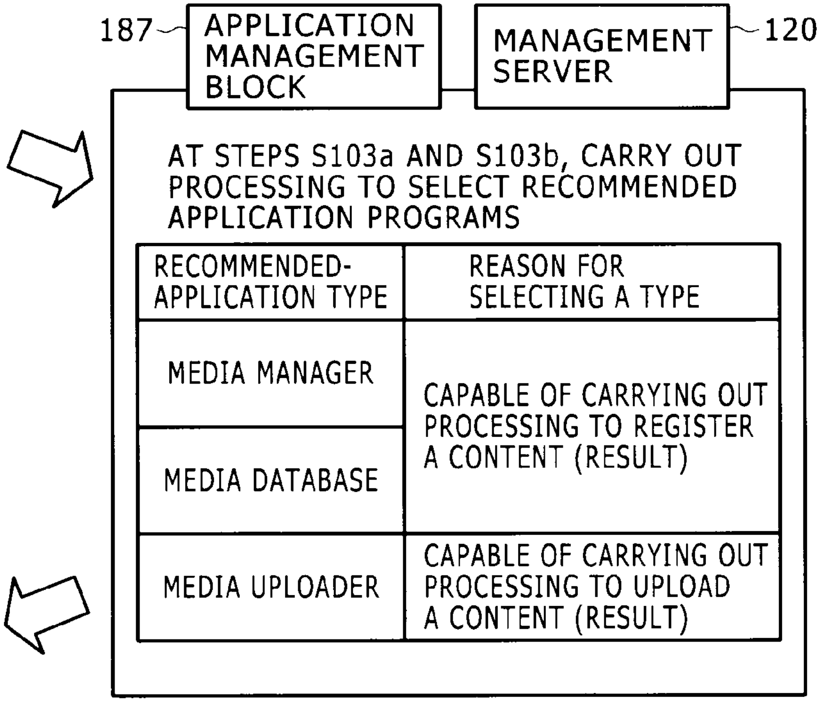
Figure 14C:
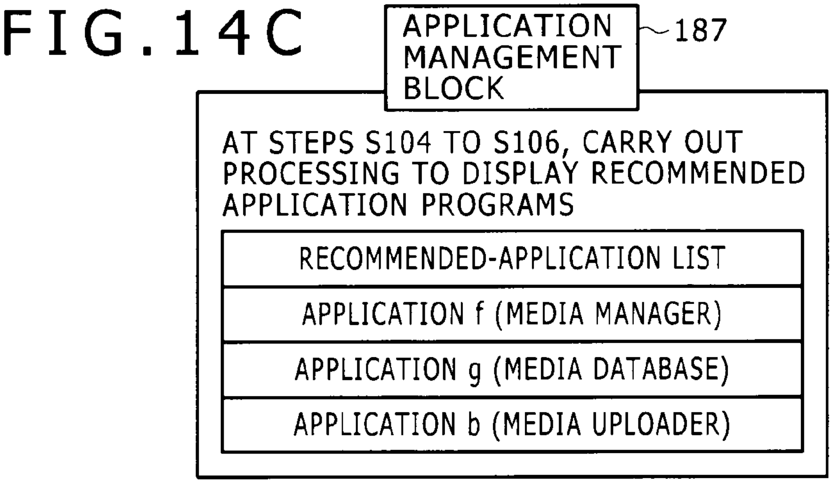

In the typical processing shown in FIGS. 14A to 14C, the application information supplied by the application execution block 186 to the application management block 187 includes an outputtable-content (result) state serving as context information. The application execution block 186 supplies the application management block 187 with the outputtable-content (result) state. It is to be noted that the application management block 187 passes on the application information to the management server 120.

As shown in FIG. 14B, the application management block 187 and the management server 120 select recommended application programs on the basis of the application information received from the application execution block 186. The processes carried out by the application management block 187 and the management server 120 to select recommended application programs are the processes performed at the steps S103*a* and S103*b* of the processing sequence shown in FIG. 8.

To put it in more detail, as described above, the application information supplied by the application execution block 186 to the application management block 187 and the management server 120 includes an outputtable-content (result) state serving as context information. On the basis of the outputtable-content (result) state, the application management block 187 and the management server 120 select, determine and recommend application programs as proper application programs to be executed next by the application execution block 186.

As shown in FIG. 14B, the types of application programs that are selected by carrying out the process to select recommended application programs are listed as follows: the media manager, the media database and the media uploader.

As described above, any of these application types are selected on the basis of application information originated by the application execution block 186 as information including an outputtable-content (result) state serving as context information.

The media manager, the media database and the media uploader which are shown in FIG. 14B are selected as a recommended application program for reasons described as follows. The media manager and the media database are selected because these application programs can be used in a process of registering an output content in the outputtable-content (result) state. The process of registering an output content (result) includes a process of storing the content (result) in the storage section 185. On the other hand, the media uploader is selected because this application program can be used to carry out a process of uploading the output content (the result) to a content providing server in the outputtable-content (result) state. Thus, each of the media manager, the media database and the media uploader is selected as a recommended application program for the reasons described above.

A list of recommended application programs already stored in the storage section 185 and another list of recommended application programs not stored yet in the storage section 185 are created and displayed on the output section 182 employed in the information processing apparatus 100 to serve as a display unit. A typical format of the lists is shown in FIG. 14C. On the output section 182, the list of recommended application programs are displayed in the recommended-application list display areas 152 and 153 which are shown in FIGS. 2 and 9.

As shown in FIG. 14C, each of the list of recommended application programs already stored in the storage section 185 and the other list of recommended application programs not stored yet in the storage section 185 shows application programs in the following format:

Application program f (media manager)

Application program g (media database)

Application program b (media manager)

The diagram of FIG. 14C shows only one list of recommended application programs. It is to be noted, however, that the list created by the application management block 187 as a list of recommended application programs already stored in the storage section 185 is actually displayed in the left recommended-application list display area 152 as shown in FIGS. 2 and 9 whereas the other list created by the management server 120 as a list of recommended application programs not stored yet in the storage section 185 is actually displayed in the right recommended-application list display area 153 as shown in FIGS. 2 and 9. Typical concrete example 2 of processing carried out to select recommended application programs on the basis of used-content information Next, the following description explains a typical concrete example of a process carried out to select recommended application programs on the basis of used-content information serving as application information which is supplied by the application execution block 186 to the application management block 187 and passed on by the application management block 187 to the management server 120. The used-content information is information on a content used by an application program currently being executed by the application execution block 186. To put it more concretely, the used-content information is the format of data processed by the application currently being executed by the application execution block 186. Typical processing to select recommended application programs and display information on the programs is explained by referring to FIGS. 15A to 16 as follows.

Figure 15A:
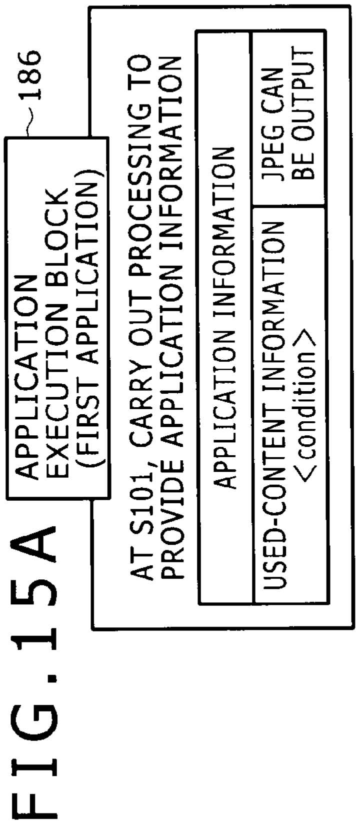

Much like FIGS. 12A to 14C, FIGS. 15A to 15C are a plurality of diagrams which show processes carried out by the application execution block 186, the application management block 187 and the management server 120 by associating the processes with the steps S101 to S106 of the processing sequence shown in FIG. 8. To be more specific, the processes carried out by the application execution block 186, the application management block 187 and the management server 120 are associated with the steps S101 to S106 as follows:

(A): FIG. 15A shows the process carried out by the application execution block 186 at the step S101 shown in FIG. 8 to supply application information to the application management block 187.

Figure 15B:
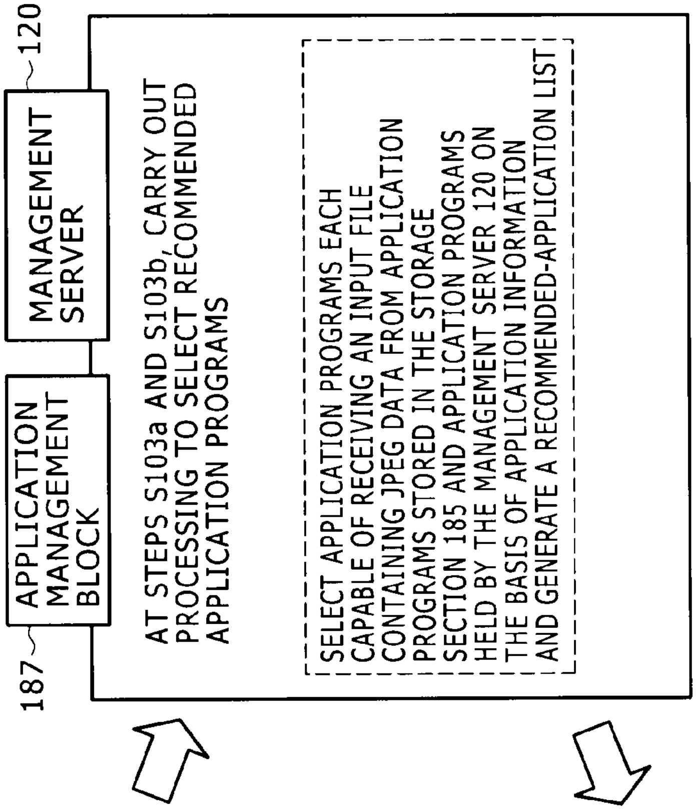

(B): FIG. 15B shows the processes carried out by the application management block 187 and the management server 120 at the steps S103*a* and S103*b* of the processing sequence shown in FIG. 8 to select recommended application programs.

Figure 15C:
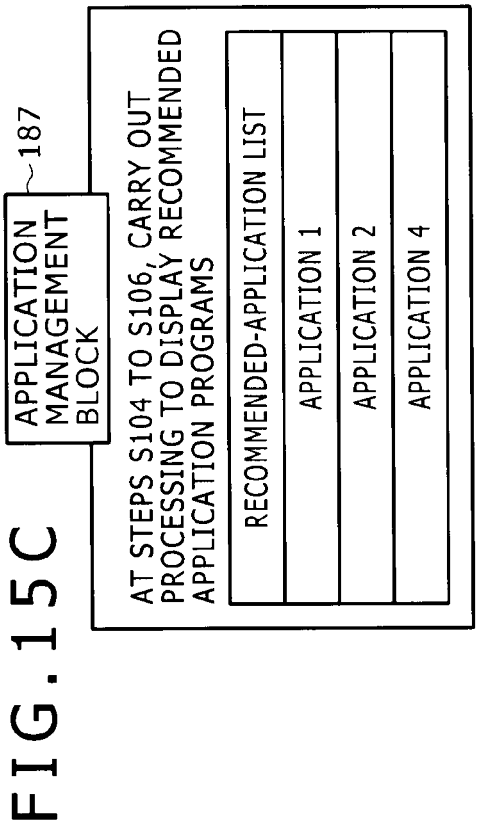

(C): FIG. 15C shows the processes carried out by the application management block 187 at the steps S104 to S106 of the processing sequence shown in FIG. 8 to display the lists each showing recommended application programs.

The application execution block 186 shown in FIG. 15A is executing an application program. In the course of the application execution, the application execution block 186 supplies application information shown in FIG. 15A to the application management block 187. This process is the process performed at the step S101 of the processing sequence shown in FIG. 8.

In the typical processing shown in FIGS. 15A to 15C, the application information supplied by the application execution block 186 to the application management block 187 includes used-content information indicating that Jpeg data is output. The application execution block 186 supplies the application management block 187 with application information including this used-content information. It is to be noted that the application management block 187 passes on the application information to the management server 120.

As described above, the used-content information included in the application information indicates that Jpeg data is output. That is to say, the used-content information indicates that Jpeg data is generated by the application execution block 186 as a result of executing an application program currently being executed by the application execution block 186 and the application execution block 186 is in a state of being capable of outputting the Jpeg data.

To put it more concretely, for example, the used-content information means that an image data file containing a static image has been generated.

As shown in FIG. 15B, the application management block 187 and the management server 120 select recommended application programs on the basis of the application information received from the application execution block 186. The processes carried out by the application management block 187 and the management server 120 to select recommended application programs are the processes performed at the steps S103*a* and S103*b* shown in FIG. 8.

As described above, the application information originated by the application execution block 186 includes the used-content information which indicates that Jpeg data is output. On the basis of the used-content information, the application management block 187 and the management server 120 select, determine and recommend application programs as proper application programs to be executed next by the application execution block 186.

To put it in more detail, in the process shown in FIG. 15B, the application management block 187 and the management server 120 extract application programs each capable of receiving an input file containing Jpeg data from application programs on the basis of the application information and generates a recommended-application list like one shown in FIG. 15C as a list of extracted application programs.

That is to say, in this case, an application program to be executed next by the application execution block 186 is required to be capable of receiving an input file containing data having a format conforming to the Jpeg compression method. Thus, the application management block 187 and the management server 120 select application programs each capable of processing an input file containing data with a format conforming to the Jpeg compression method.

For example, information on application programs stored in the storage section 185 or a storage section employed in the management server 120 is shown in the form of a data structure shown in FIG. 16. FIG. 16 is a diagram showing pieces of application information explained earlier by referring to FIG. 5 in a table format.

If the information on application programs stored in the storage section 185 or the storage section employed in the management server 120 is organized into a data structure shown in FIG. 16, on the basis of the application information generated by the application execution block 186, the application management block 187 or the management server 120 is able to select application programs each capable of receiving an input file containing data having a format conforming to the Jpeg compression method from the table. In the case of the table shown in FIG. 16, application 1, application 2 and application 4 are application programs selected by the application management block 187 or the management server 120 as application programs each capable of receiving an input file containing data having a format conforming to the Jpeg compression method.

Then, each of the application management block 187 and the management server 120 generates a list of recommended application programs which are each an application program capable of receiving an input file containing data having a format conforming to the Jpeg compression method. The diagram of FIG. 15C shows only one list of recommended application programs. It is to be noted, however, that the list created by the application management block 187 as a list of recommended application programs already stored in the storage section 185 is actually displayed in the left recommended-application list display area 152 as shown in FIGS. 2 and 9 whereas the other list created by the management server 120 as a list of recommended application programs not stored yet in the storage section 185 is actually displayed in the right recommended-application list display area 153 as shown in FIGS. 2 and 9.

Figures 17A, 17B, 17C:
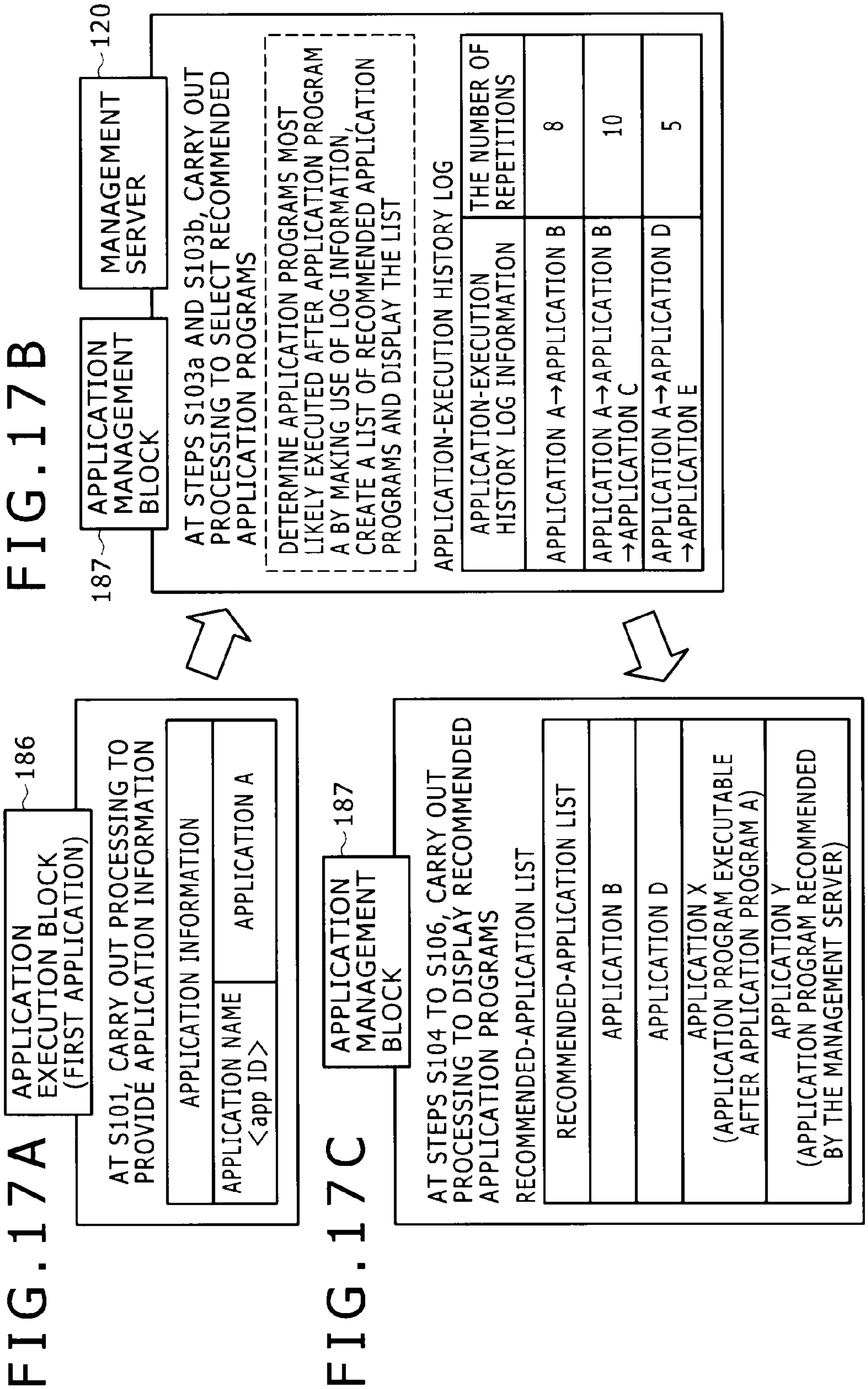

Typical concrete examples 3 of processing carried out to select recommended application programs on the basis of an application type Next, by referring to FIGS. 17A to 17C and subsequent figures, the following description explains typical concrete examples of processing carried out to select recommended application programs on the basis of the title (or the ID) of an application program being executed by the application execution block 186 and display the selected recommended application programs. In this case, the title (or the ID) of an application program being executed is used as application information which is supplied by the application execution block 186 to the application management block 187 and passed on by the application management block 187 to the management server 120.

Typical Concrete Example 3-a

Much like the diagrams of FIGS. 12A to 15C, FIGS. 17A to 17C is a plurality of diagrams which show processes carried out by the application execution block 186, the application management block 187 and the management server 120 by associating the processes with the steps S101 to S106 of the processing sequence shown in FIG. 8. To be more specific, the processes carried out by the application execution block 186, the application management block 187 and the management server 120 are associated with the steps S101 to S106 as follows:

(A): FIG. 17A shows the process carried out by the application execution block 186 at the step S101 shown in FIG. 8 to supply application information to the application management block 187.

(B): FIG. 17B shows the processes carried out by the application management block 187 and the management server 120 at the steps S103*a* and S103*b* shown in FIG. 8 to select recommended application programs.

(C): FIG. 17C shows the processes carried out by the application management block 187 at the steps S104 to S106 of the processing sequence shown in FIG. 8 to display the lists each showing recommended application programs.

The application execution block 186 shown in FIG. 17A is executing an application program. In the course of the application execution, the application execution block 186 supplies application information shown in FIG. 17A to the application management block 187. This process carried out by the application execution block 186 to supply the application information to the application management block 187 is the process performed at the step S101 of the processing sequence shown in FIG. 8.

In the typical processing shown in FIGS. 17A to 17C, the application information supplied by the application execution block 186 to the application management block 187 includes application A which is the title of the application program being executed. The application execution block 186 supplies the application management block 187 with application information including the title of the application program being executed by the application execution block 186. It is to be noted that the application management block 187 passes on the application information to the management server 120.

As described above, the application information supplied by the application execution block 186 to the application management block 187 includes application A which is the title of the application program being executed by the application execution block 186.

As shown in FIG. 17B, the application management block 187 and the management server 120 select recommended application programs on the basis of the application information received from the application execution block 186. The processes carried out by the application management block 187 and the management server 120 to select recommended application programs are the processes performed at the steps S103*a* and S103*b* of the processing sequence shown in FIG. 8.

As described above, the application information originated by the application execution block 186 includes application A which is the title of the application program being executed. On the basis of application A which is the title of the application program being executed by the application execution block 186, the application management block 187 and the management server 120 select, determine and recommend application programs as proper application programs to be executed next by the application execution block 186.

Each of the application management block 187 and the management server 120 determines application programs that are most likely to be executed after the execution of application A on the basis of an application-execution history log like one shown in FIG. 17B. Then, a recommended-application list is created as a list showing the application programs determined on the basis of the application-execution history log.

In the case of the application management block 187, the application-execution history log like the one shown in FIG. 17B is a log showing a history of application executions by the application execution block 186. The application-execution history log has been stored in the storage section 185 also employed in the information processing apparatus 100.

In the case of the management server 120, on the other hand, the application-execution history log like the one shown in FIG. 17B is a log showing a history of application executions by an application execution section employed in an information processing apparatus other than the information processing apparatus 100. The application-execution history log has been stored in a storage section employed in the management server 120.

The log showing a history of application executions is generated on the basis of application information created by the application execution block 186.

As shown in FIG. 17B, each entry of the application-execution history log is data including a sequence of application executions in the application execution section and a sequence count indicating the number of times the sequence has occurred so far. In the case of the application-execution history log shown in FIG. 17B for example, the sequence of application executions in the top entry is an order of execution indicated by application program A→application program B whereas the number of times the sequence has occurred so far is eight. The sequence of application executions in the middle entry is an order of execution indicated by application program A→application program B→application program C whereas the number of times the sequence has occurred so far is ten. The sequence of application executions in the bottom entry is an order of execution indicated by application program A→application program D→application program E whereas the number of times the sequence has occurred so far is five.

Each of the application management block 187 and the management server 120 carries out a process to sequentially select application programs that are most likely to be executed after the execution of application A on the basis of an application-execution history log like the one shown in FIG. 17B. Then, each of the application management block 187 and the management server 120 carries out a process to create a recommended-application list as a list showing the application programs selected sequentially on the basis of the application-execution history log as described above.

As a result, a recommended-application list like one shown in FIG. 17C is displayed. As shown in the figure, the recommended-application list shows application programs listed as follows:

Application B
Application D
Application X
Application Y

Each of the above application programs is an application program included on the recommended-application list.

It is to be noted that application A and application D are application programs which have been selected on the basis of the application-execution history log shown in FIG. 17B. In FIG. 17C, application X right below application D and application Y right below application X are application programs which have been selected without referring to the application-execution history log. To be more specific, application X is an application program determined as an application program that is most likely to be executed after the execution of application A on the basis of a consideration other than the application-execution history log. On the other hand, application Y is an application program recommended by the management server 120. In the case of the recommended-application list shown in FIG. 17C, it is assumed that application programs selected by the application management block 187 as recommended application programs from application programs already stored in the storage section 185 at the step S103*a* of the processing sequence shown in FIG. 8 and application programs selected by the management server 120 as recommended application programs from application programs not stored yet in the storage section 185 at the step S103*b* of the processing sequence shown in FIG. 8 are collected into a single recommended-application list.

Typical Concrete Example 3-b

Typical concrete example 3-b is explained by referring to FIGS. 18A to 18C. Much like the diagrams of FIGS. 12A to 15C and 17A to 17C, FIGS. 18A to 18C are a plurality of diagrams which show processes carried out by the application execution block 186, the application management block 187 and the management server 120 by associating the processes with the steps S101 to S106 of the processing sequence shown in FIG. 8.

The application execution block 186 shown in FIG. 18A is executing an application program called application B. In the typical processing shown in FIGS. 18A to 18C, the application information supplied by the application execution block 186 to the application management block 187 includes application B which is the title of the application program being executed by the application execution block 186. The application execution block 186 supplies the application management block 187 with application information including the title of the application program being executed by the application execution block 186.

As described above, the application information supplied by the application execution block 186 to the application management block 187 includes application B which is the title of the application program being executed by the application execution block 186.

As shown in FIG. 18B, the application management block 187 and the management server 120 select recommended application programs on the basis of the application information received from the application execution block 186. The processes carried out by the application management block 187 and the management server 120 to select recommended application programs are the processes performed at the steps S103*a* and S103*b* of the processing sequence shown in FIG. 8.

As described above, the application information originated by the application execution block 186 includes application B which is the title of the application program being executed. On the basis of application B which is the title of the application program being executed, the application management block 187 and the management server 120 select, determine and recommend application programs as proper application programs to be executed next by the application execution block 186.

Each of the application management block 187 and the management server 120 determines application programs that are most likely to be executed after the execution of application B on the basis of an application-execution history log like one shown in FIG. 18B. Then, a recommended-application list is created as a list showing the application programs determined on the basis of the application-execution history log.

As a result, a recommended-application list like one shown in FIG. 18C is displayed. As shown in the figure, the recommended-application list shows application programs listed as follows:

Application C
Application XX
Application YY

Each of the above application programs is an application program included on the recommended-application list.

It is to be noted that application C is an application program which has been selected on the basis of the application-execution history log shown in FIG. 18B. Application XX right below application C and application YY right below application XX are application programs which have been selected without referring to the application-execution history log. To be more specific, application XX is an application program determined as an application program that is most likely to be executed after the execution of application B on the basis of a consideration other than the application-execution history log. On the other hand, application YY is an application program recommended by the management server 120. In the case of the recommended-application list shown in FIG. 18C, it is assumed that application programs selected by the application management block 187 as recommended application programs from application programs already stored in the storage section 185 at the step S103*a* of the processing sequence shown in FIG. 8 and application programs selected by the management server 120 as recommended application programs from application programs not stored yet in the storage section 185 at the step S103*b* of the processing sequence shown in FIG. 8 are collected into a single recommended-application list.

In the typical processing examples explained by referring to the diagrams of FIGS. 17A to 18C, the application-execution history log shown in FIGS. 17B and 18B shows an application title for every application program as an identification used for uniquely identifying the application program. It is to be noted, however, that the type (or the category) of each application program can be registered on the application-execution history log in place of the title unique to the application program or the identification peculiar to the application program. That is to say, the application-execution history log can also be configured to form a list of application types (or application categories).

For example, each of the application management block 187 and the management server 120 may hold a list of pairs each including the title of an application program and the type (or the category) of the application program as shown in a diagram of FIG. 19A.

On the basis of the application information originated by the application execution block 186, each of the application management block 187 and the management server 120 generates an application-execution history log like one shown in a diagram of FIG. 19B. The format of the application-execution history log shown in FIG. 19B is identical with the ones shown in FIGS. 17B and 18B. Each of these application-execution histories shown in FIG. 19B includes an application title for every application program. Then, by making use of the data table associating a title with a category as shown in FIG. 19A, the application-execution histories shown in FIG. 19B are converted into an application-execution history shown in a diagram of FIG. 19C. The application-execution history shown in FIG. 19C is a sequence of application executions which are each generalized into an application type (or an application category).

Each of the application management block 187 and the management server 120 holds information on the sequence of application executions which are each generalized into an application type (or an application category) as shown in FIG. 19C. Thus, from the category of a specific application program being executed by the application execution block 186, each of the application management block 187 and the management server 120 is capable of determining the category of an application program most likely to be executed next by the application execution block 186 after the execution of the specific application program is completed. In addition, by making use of the data table associating a title with a category as shown in FIG. 19A, each of the application management block 187 and the management server 120 is capable of selecting an application program for the determined category and creating a list including the selected application program as a recommended application program in an entry of the list.

It is to be noted that the application management block 187 employed in the information processing apparatus 100 can also be configured to hold an application-execution history log showing unique application names or unique application identifications as shown in FIG. 19B whereas the management server 120 is configured to hold data representing a sequence of application executions which are each generalized into an application type (or an application category) as shown in FIG. 19C or vice versa.

Some embodiments each implementing the processing to recommend application programs have been described so far. Typically, each processing program to be executed for implementing the processing to recommend application programs is configured as a program stored in advance in the information processing apparatus 100 or configured as a part of an application program executed by the application execution block 186 employed in the information processing apparatus 100.

It is also possible to provide a typical configuration in which each processing program to be executed for implementing the processing to recommend application programs is a part of an application program executed by the application execution block 186 and it is a program management section that executes the processing program. The processing programs are executed typically to transfer data, create a list of recommended application programs and display the list in the same way as the procedure explained earlier by referring to the processing sequence shown in FIG. 8.

(4): Processing to Share Applications by Users and Application Recommendation Processing The following description explains processing to share application programs by users and application recommendation processing. As described before, for example, the application management block 187 employed in the information processing apparatus 100 updates the application management information to reflect the end of execution of an application program in the application execution block 186 also employed in the information processing apparatus 100.

To put it more concretely, for example, the application management block 187 carries out processing such as a process to set an application linking state of application relation information explained before by referring to FIG. 4 in a pipe connection state represented by a solid-line arrow shown in the same figure. In addition, the application management block 187 manages a history of executions of application programs executed by the application execution block 186 by including the history in the application management information as explained earlier by referring to FIG. 9.

In this way, the application management block 187 monitors and manages the state of execution of every application program. The state of execution of every application program is stored in the storage section 185 as application management information. The application management block 187 carries out processing to construct information on relations among a plurality of application programs as shown in a diagram of FIG. 20.

Figure 20:
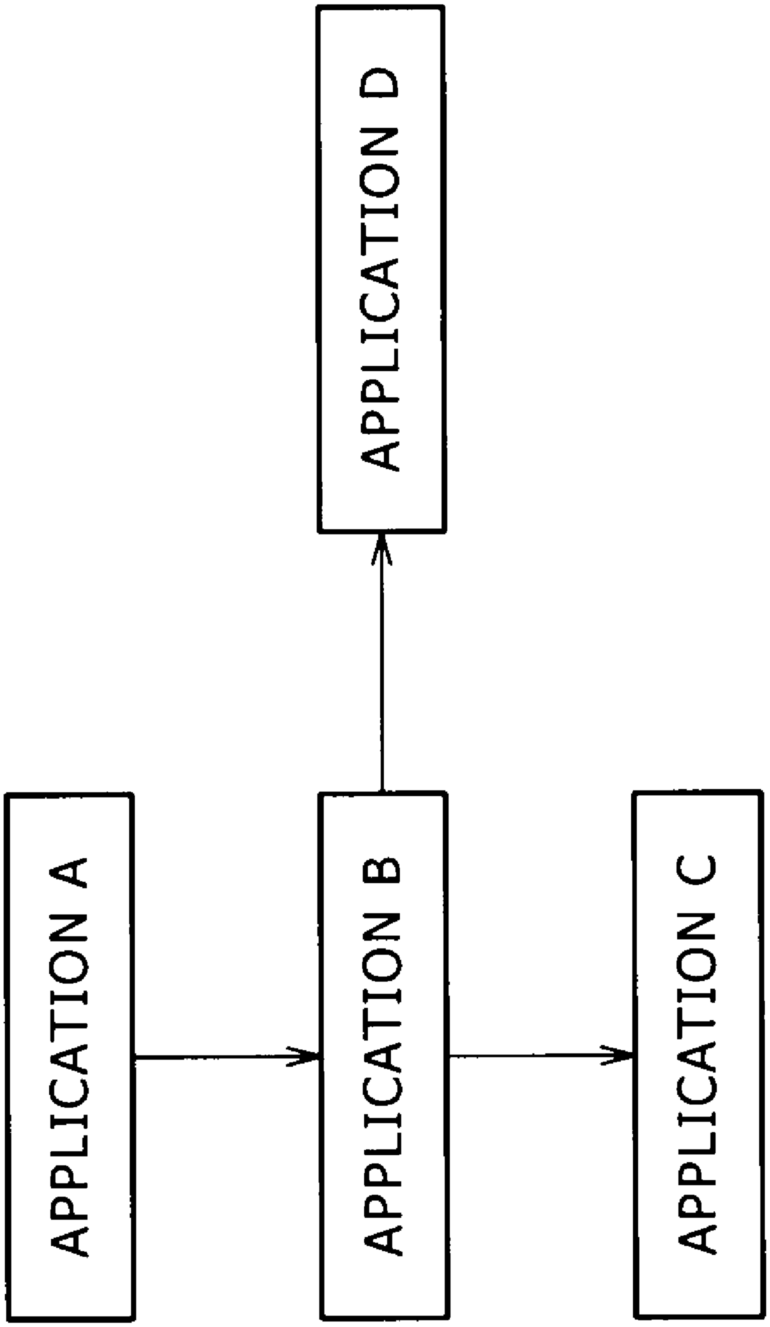
FIG. 20 is an explanatory diagram showing typical application relation information created as a result of processing carried out by the application management block.

Every arrow shown in FIG. 20 has the same meaning as a solid-line arrow shown in FIG. 4. That is to say, as shown in FIG. 20, after the execution of application program A, application program B is started and executed. In the same way, after the execution of application program B, application program C is started and executed. As an alternative, after the execution of application program B, application program D is started and executed. The application execution sequence shown in FIG. 20 is information constructed on the basis of a history of actual executions of application programs invoked by the user of the information processing apparatus 100.

Application programs A to D shown in FIG. 20 are basically application programs different from each other. From the fact that the user of the information processing apparatus 100 has made requests to execute application programs A to D, however, these application programs can be inferred to have close relationships to each other. That is to say, it is quite within the bounds of possibility that the executions of these four application programs are requested successively by the user during some data processing. The state of executions of the application programs is inferred to be applicable not only to the user of the information processing apparatus 100, but also to a number of other users.

A group of application programs A to D shown in FIG. 20 forms a package including application programs A to D. It is quite within the bounds of possibility that the package including application programs A to D is information on a combination of application programs which are useful to a number of other users. In many cases, however, these other users are not aware of the fact that the combination of application programs useful to the other users exists.

If a number of users can share the information on the combination of such application programs, the application programs can be used by the users with a high degree of efficiency. That is to say, if a specific user can make use of the same application combination as an application package created by another user, the specific user who did not know the configuration of the application package so far becomes capable of carrying out efficient data processing. That is to say, it is possible to increase the efficiency of the data processing which is carried out by a number of users.

A packaged combination of application programs can be disclosed to the public and information on the packaged combination or the packaged combination itself can be downloaded. Thus, a number of users can make use of the information on the packaged combination of application programs effectively. The following description explains a configuration that allows such processing to be carried out.

Figure 21:
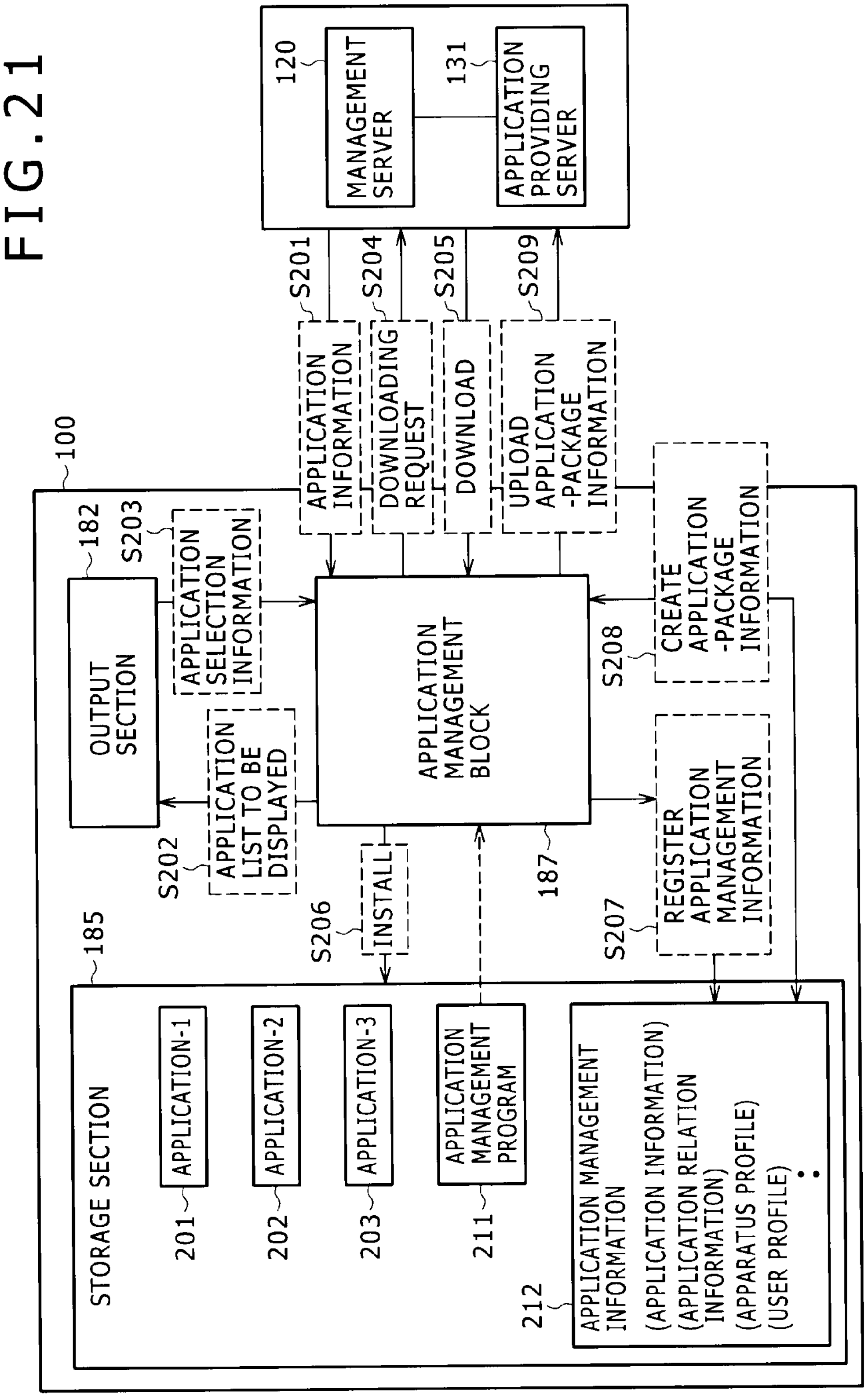
FIG. 21 is an explanatory diagram showing a sequence of processes carried out to upload application relation information to the management server as application package information and disclose the information to a number of other users.

FIG. 21 is an explanatory diagram showing a sequence of processes to upload application relation information from the information processing apparatus 100 to the management server 120 as application package information and disclose the information to a number of other users. A typical application relation information is shown in FIG. 20. The application relation information has been generated by the information processing apparatus 100 after executing a plurality of application programs. In a word, the information processing apparatus 100 uploads the application relation information generated thereby to the management server 120 which then discloses the information to a number of users.

FIG. 21 shows both the management server 120 and the application providing server 131. It is to be noted, however, that either of the management server 120 and the application providing server 131 is a server that can be used for receiving the application package information uploaded from the information processing apparatus 100 and disclosing the information to other users. In the following description, it is assumed that the management server 120 is used as a server for receiving the application package information uploaded from the information processing apparatus 100 and disclosing the information to other users.

The sequence shown in FIG. 21 includes steps S201 to S209. Processes of these steps are carried out by the application management block 187 employed in the information processing apparatus 100 to acquire information on application programs from the management server 120, select some of the application programs on the basis of the information on the application programs, generate an application package including the outputtable application programs and upload the application package to the management server 120.

The sequence begins with the step S201 at which the application management block 187 employed in the information processing apparatus 100 acquires information on application programs from the management server 120. The information on application programs is information on application programs to be provided by the application providing server 131. The information explained before by referring to FIG. 5 is typical information on an application program.

Receiving the information on application programs from the management server 120, the application management block 187 employed in the information processing apparatus 100 generates a list of application programs on the basis of the information and displays the list on the output section 182 at the next step S202. The process carried out at the step S202 corresponds to the process to display recommended-application lists in the recommended-application list display areas 152 and 153 as explained earlier by referring to FIG. 2.

The user selects an application program to be executed from the recommended-application lists shown in the recommended-application list display areas 152 and 153. Then, at the next step S203, information on the application program selected by the user is supplied to the application management block 187.

Subsequently, at the next step S204, the application management block 187 requests the application providing server 131 to download the application program selected by the user. Then, at the next step S205, the application providing server 131 downloads the application program outputtable by the user to the information processing apparatus 100.

Subsequently, at the next step S206, the application management block 187 installs the application program downloaded from the application providing server 131. Then, at the next step S207, the application management block 187 updates the application management information 212 stored in the storage section 185 in accordance with the process of downloading the application program outputtable by the user. To put it more concretely, the application management block 187 carries out a process to link pieces of relation information by making use of a pipe. Associated with application programs, the pipe-linked pieces of relation information is part of the application relation information shown in FIG. 4. By carrying out this process, it is possible to create an application package like the one described before by referring to FIG. 20.

Subsequently, at the next step S208, the application management block 187 extracts information on the application package from the application relation information included in the application management information 212 stored in the storage section 185. To put it more concretely, the information on the application package is typically information on a combination of application programs which have been actually executed and linked to each other by making use of pipes. A typical example of the information on the application package is shown in FIG. 20.

It is to be noted that the information on a package of application programs can have one of a variety of formats. For example, typical formats of the application package information based on the application relation information shown in FIG. 20 are listed as follows.

(1): The information on a package of application programs is information including a combination of identifiers (ID) each used for identifying one of the application programs as follows:

Application A
Application B
Application C
Application D (2): Other typical information on a package of application programs is referred to as typical application package information 1 which including a sequence of application executions given as follows:

Application A→Application B→Application C or

Application A→Application B→Application D (3): Further information on a package of application programs is referred to as typical application package information 2 which including a sequence of application executions given as follows:

Application *A*→Application *B*→(Application *C*/Application Application *D*)

Then, at the next step S209, the application management block 187 uploads the application package information created on the basis of the application relation information included in the application management information 212 stored in the storage section 185 to the management server 120. The application package information uploaded to the management server 120 is useful to a number of other users.

Figures 22A, 22B:
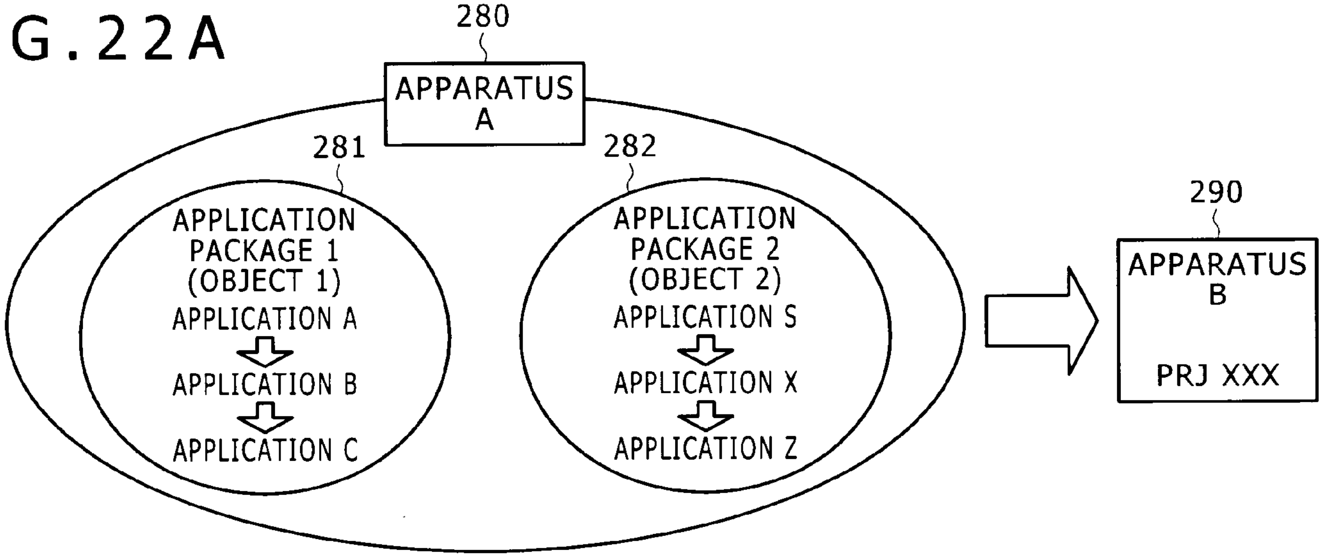
FIGS. 22A and 22B are a plurality of explanatory diagrams to be referred to in explanation of typical concrete use of the application package information received by the management server from the information processing apparatus.

FIGS. 22A and 22B are a plurality of diagrams referred to in explanation of typical concrete use of the application package information. In the figure, apparatus A denoted by reference numeral 280 is a typical apparatus which serves as the information processing apparatus 100 owned by a user. Apparatus A denoted by reference numeral 280 executes a variety of application programs and generates application relation information including information on sequence of application executions. Typical application relation information is shown in FIG. 4. An application management section employed in apparatus A denoted by reference numeral 280 creates application package information on the basis of the application relation information. For example, the application management section employed in apparatus A denoted by reference numeral 280 creates first application package information 281 and second application package information 282 which are shown in FIG. 22A.

To be more specific, FIG. 22A is an explanatory diagram showing application packages 281 and 282 generated by information processing apparatus A denoted by reference numeral 280 to be eventually transferred to information processing apparatus B denoted by reference numeral 290. As shown in FIG. 22A, the first application package information 281 is the following information: Application A→Application B→Application C. On the other hand, the second application package information 282 is the following information: Application S→Application X→Application Z.

The application management section employed in apparatus A denoted by reference numeral 280 transmits the first application package information 281 and the second application package information 282 to the management server 120 in processing referred to an information uploading process. The management server 120 stores the first application package information 281 and the second application package information 282 which have been received from apparatus A denoted by reference numeral 280 in a storage section employed in the management server 120 and manage them as pieces of application package information. FIG. 22B shows typical pieces of application package information stored in the storage section employed in the management server 120.

As shown in FIG. 22B, each information on a package of application programs is a data pair including a package identifier ID and package contents. The package identifier ID identifies the information on a package of application programs whereas the package contents are a combination of the application programs composing the package. The package contents can also be a sequence of executions of application programs composing the package.

As described above, in addition to apparatus A denoted by reference numeral 280, the diagram of FIG. 22A also shows apparatus B denoted by reference numeral 290. Apparatus B denoted by reference numeral 290 is capable of acquiring application package information from the management server 120. Apparatus B denoted by reference numeral 290 is also capable of storing the application package information received from the management server 120 in a storage section 185 of apparatus B as a portion of application management information and making use of the application package information which is also referred to as the aforementioned information on a package of application programs.

As described above, information on a package of application programs can be shared by users as information common to the users. Thus, without making use of a history of application executions requested by a specific user itself, that is, by making use of a history of application executions requested by another user, the specific user is capable of knowing information on a combination of application programs that are worth executing in order to carry out efficient data processing and capable of making use of the information on a combination of such application programs effectively.

It is to be noted that an application management section employed in apparatus B processes application package information received by apparatus B from the management server 120 in order to include the application package information in the application management information, which has been stored in a storage section of apparatus B, as a portion of the application management information. The application management information has been described earlier by referring to FIG. 4.

Let apparatus B be currently executing application program A included in the first application package information 281 shown in FIG. 22A. In this case, as a result of the process to transfer the first application package information 281 to apparatus B, a recommended-application list display area of the display screen 150 shown in FIG. 2 as the display screen 150 of apparatus B displays information which recommends application programs B and C. The information recommending application programs B and C notifies the user of apparatus B that application programs B and C are useful application programs relevant to application program A which is currently being executed by apparatus B. The user of apparatus B can then carry out an operation to immediately download application programs B and C from the application providing server 131 to be executed after the execution of application program A has been completed.

Figure 23:
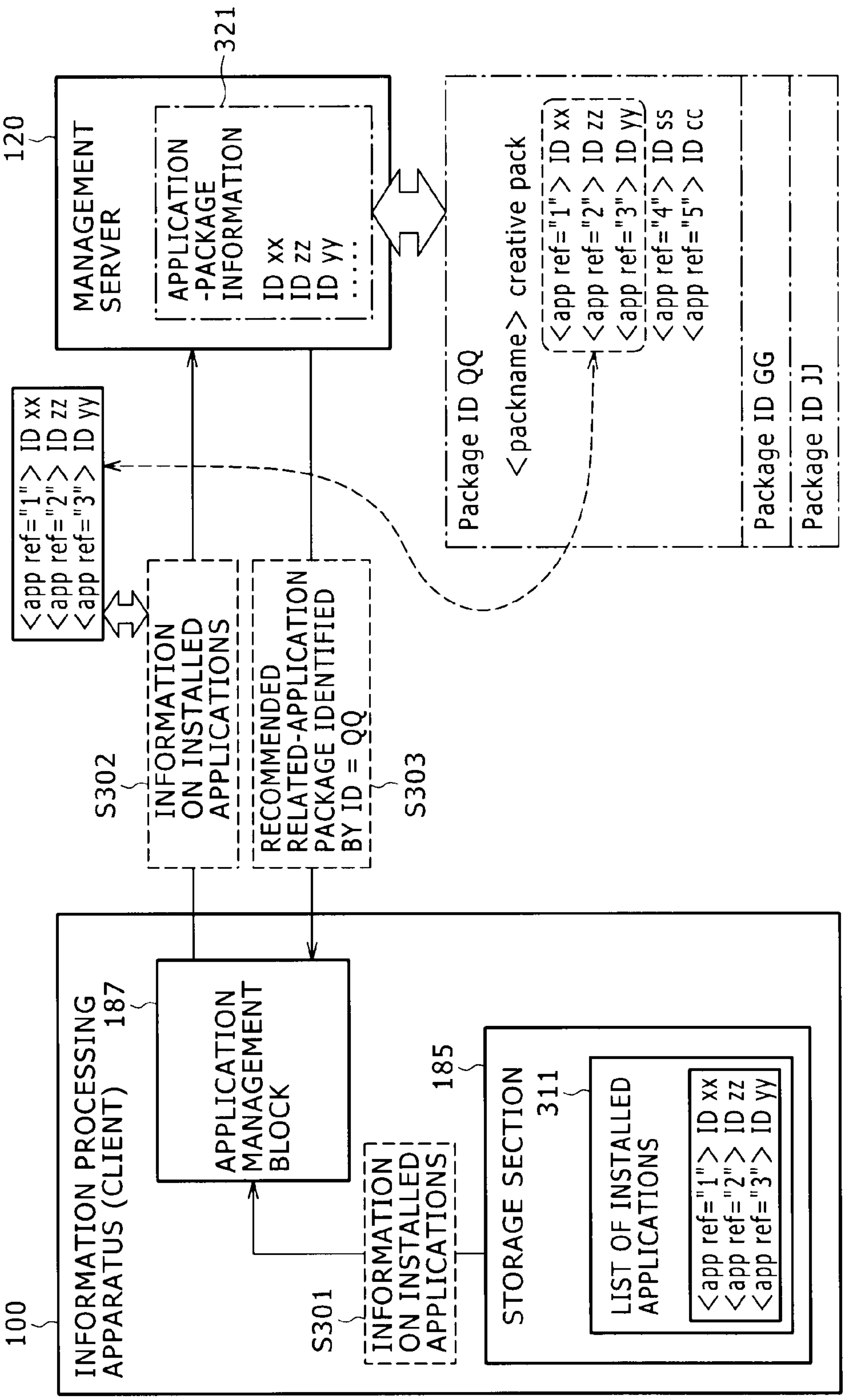
FIG. 23 is an explanatory diagram showing a sequence of processes carried out to actually utilize application package information received by the management server from the information processing apparatus owned by the user.

Next, by referring to a diagram of FIG. 23, the following description explains typical use of information on a package of application programs. The management server 120 receives many pieces of application package information from a number of information processing apparatus 100 which are each utilized by a user and manages the pieces of application package information by storing them in a storage section. To put it in detail, the management server 120 manages the pieces of application package information by typically assigning a package ID to each of the pieces of application package information as shown in FIG. 22B.

The number of application packages managed by the management server 120 is expected to increase substantially so that it is difficult for the user to search the packages for a specific one that is proper for the user itself. The typical processing shown in FIG. 23 is an example of a countermeasure taken in order to eliminate the difficulties encountered in searching packages for a specific one that is proper for the user itself. In the typical processing shown in FIG. 23, the management server 120 receives information on application programs already stored in the storage section 185 utilized by the user from the information processing apparatus 100, extracts application package information proper for the user on the basis of the information received from the information processing apparatus 100 and presents the extracted application package information to the user.

For example, in many cases, a user carrying out much data processing on musical contents makes use of a number of application programs executed to perform the data processing for the musical contents. By the same token, in general, a user carrying out much data processing on image contents makes use of a number of application programs executed to perform the data processing for the image contents.

In many cases, however, application programs owned by a user just starting data processing of image contents are typically basic application programs. In general, such a user does not have application programs to be executed for carrying out special and/or advanced data processing. On the other hand, in many cases, application programs used by a user skilled in processing of image contents include application programs to be executed for carrying out the special and/or advanced data processing.

If information on packages each including application programs to be used by a user skilled in processing of image contents has been stored in the management server 120, it is desirable to provide the management server 120 with functions for retrieving information on one outputtable from such application packages to serve as an application package proper for a beginner just starting data processing of including contents and providing the beginner with the information on the outputtable application package. The typical processing shown in FIG. 23 is an example of the processing to provide the beginner just starting data processing of image contents with the information on an outputtable application package proper for the beginner.

In the typical processing shown in FIG. 23, the information processing apparatus 100 owned by a user uploads information on application programs already installed in the information processing apparatus 100 by storing the programs in the storage section 185 employed in the information processing apparatus 100 to the management server 120 and, on the basis of the uploaded information, the management server 120 extracts information on application programs proper for the user and supplies the extracted information to the user who is operating the information processing apparatus 100.

A plurality of application programs have already been installed in the storage section 185 employed in the information processing apparatus 100. In addition, the information processing apparatus 100 also has a list of the installed application programs as a portion of application management information.

The list of the installed application programs is information which includes identifiers (IDs) each assigned to one of the installed application programs. An installed-application list 311 shown in FIG. 23 is a typical example of the list of installed application programs. As shown in the figure, the installed-application list 311 stored in the storage section 185 is information which includes identifiers (IDs) as follows:

<app ref="1"> ID xx

<app ref="2"> ID zz

<app ref="3"> ID yy

First of all, at a step S301 shown in FIG. 23, the application management block 187 employed in the information processing apparatus 100 retrieves the installed-application list 311 from the storage section 185. As described above, the installed-application list 311 is a list of identifiers (IDs) each assigned to one of application programs which have been installed in the storage section 185 employed in the information processing apparatus 100. Thus, the installed-application list 311 is information on application programs which have been installed in the storage section 185.

Then, at the next step S302, the application management block 187 uploads the installed-application information retrieved from the storage section 185 to the management server 120. The management server 120 has received a large number of pieces of application package information from various information processing apparatus 100 owned by a variety of users and stored the pieces of application package information in a storage section employed in the management server 120 for the purpose of managing the pieces of application package information. FIG. 23 shows application package information 321 stored in the management server 120.

As explained earlier by referring to FIG. 22B, application package information 321 shown in FIG. 23 is a data pair including a package identifier ID and package contents.

The management server 120 carries out a collation process of collating the application IDs recorded in the installed-application information received from the information processing apparatus 100 with application IDs of application programs included in each application package recorded in the application package information 321 stored in the storage section employed in the management server 120.

As a result of the collation process, the management server 120 extracts an application package including more application IDs than those recorded in the installed-application information received from the information processing apparatus 100. That is to say, in the collation process, the management server 120 determines an application package including many application IDs matching those recorded in the installed-application information received from the information processing apparatus 100 in addition to other application IDs to be an application package optimum for the user operating the information processing apparatus 100, selects the optimum application package and extracts the outputtable package.

In the typical processing shown in FIG. 23, details of the optimum application package identified by a package ID of QQ are shown beneath the management server 120 on the right side of the figure. As indicated by the details of the optimum application package identified by the package ID of QQ, the optimum application package includes the application IDs (that is, ID xx, ID zz and ID yy) recorded in the installed-application information, which has been received from the information processing apparatus 100, in addition to other application IDs (that is, ID ss and ID cc). In other words, as described earlier, the application IDs recorded in the installed-application information received from the information processing apparatus 100 includes identifiers (IDs) listed follows:

<app ref="1"> ID xx

<app ref="2"> ID zz

<app ref="3"> ID yy

In addition, the optimum application package identified by the package ID of QQ includes the application IDs listed above besides application IDs of ID ss and ID cc.

It is assumed that, in addition to the optimum application package identified by the package ID of QQ, the management server 120 has also stored two other application packages identified by package IDs of GG and JJ respectively. However, these two other packages each including application programs do not include the application IDs recorded in the installed-application information received from the information processing apparatus 100.

In such a case, as described above, the management server 120 determines an application package, which is identified by the package ID of QQ as a package including many application IDs matching those recorded in the installed-application information received from the information processing apparatus 100 in addition to the other application IDs, to be an application package optimum for the user operating the information processing apparatus 100. Then, at the next step S303, the management server 120 provides the information processing apparatus 100 with information on a recommended application package determined to be the optimum application package which is identified by the package ID of QQ.

Subsequently, the application management block 187 employed in the information processing apparatus 100 stores the application package information received from the management server 120 in the storage section 185 as a portion of the application management information to be used later. The application management block 187 carries out a process to include the information on application programs in application relation information included in the application management information stored in the storage section 185.

As a result of the processes described above, if an application program identified by an application ID of xx is being executed for example, not only does the left recommended-application list display area 152 shown in FIG. 2 display application IDs of zz and yy each identifying an already installed application program, but the right recommended-application list display area 153 also displays application IDs of ss and cc, which have been included in the application package received from the management server 120. Thus, the user is notified that each of these recommended application programs is a useful application program that is relevant to the application program identified by the application ID of xx as an application program currently being executed. As a result, it is possible to immediately carry out a process of downloading an application program specified by the user.

(5): Processing to Construct an Environment to be Used for Executing Contents Common to a Plurality of Different Apparatus Next, the following description explains processing to construct an environment to be used by contents common to a plurality of different apparatus. Typical examples of the information processing apparatus utilized by the user include a PC, a portable phone functioning as a portable terminal and a portable music player.

In an environment allowing the user to utilize a plurality of information processing apparatus, for example, a process to browse a content processed by making use of a PC in the home of the user itself is frequently carried out by utilizing a portable terminal. A typical example of the content processed by making use of a PC is an image content. In order to carry out a process on the same content by making use of a variety of information processing apparatus in this way, it is necessary to install an application program in each of the information processing apparatus to serve as an application program to be executed for performing the process in the information processing in which the application program has been installed.

So far, as a general procedure, the user needs to install such an application program in each of the information processing apparatus by itself. To the user, however, such a procedure is cumbersome as well as burdensome. The following description explains a configuration for providing each of the information processing apparatus owned by the user with an application program adapted to the apparatus in order to reduce the burden which is borne by the user.

Figure 24:
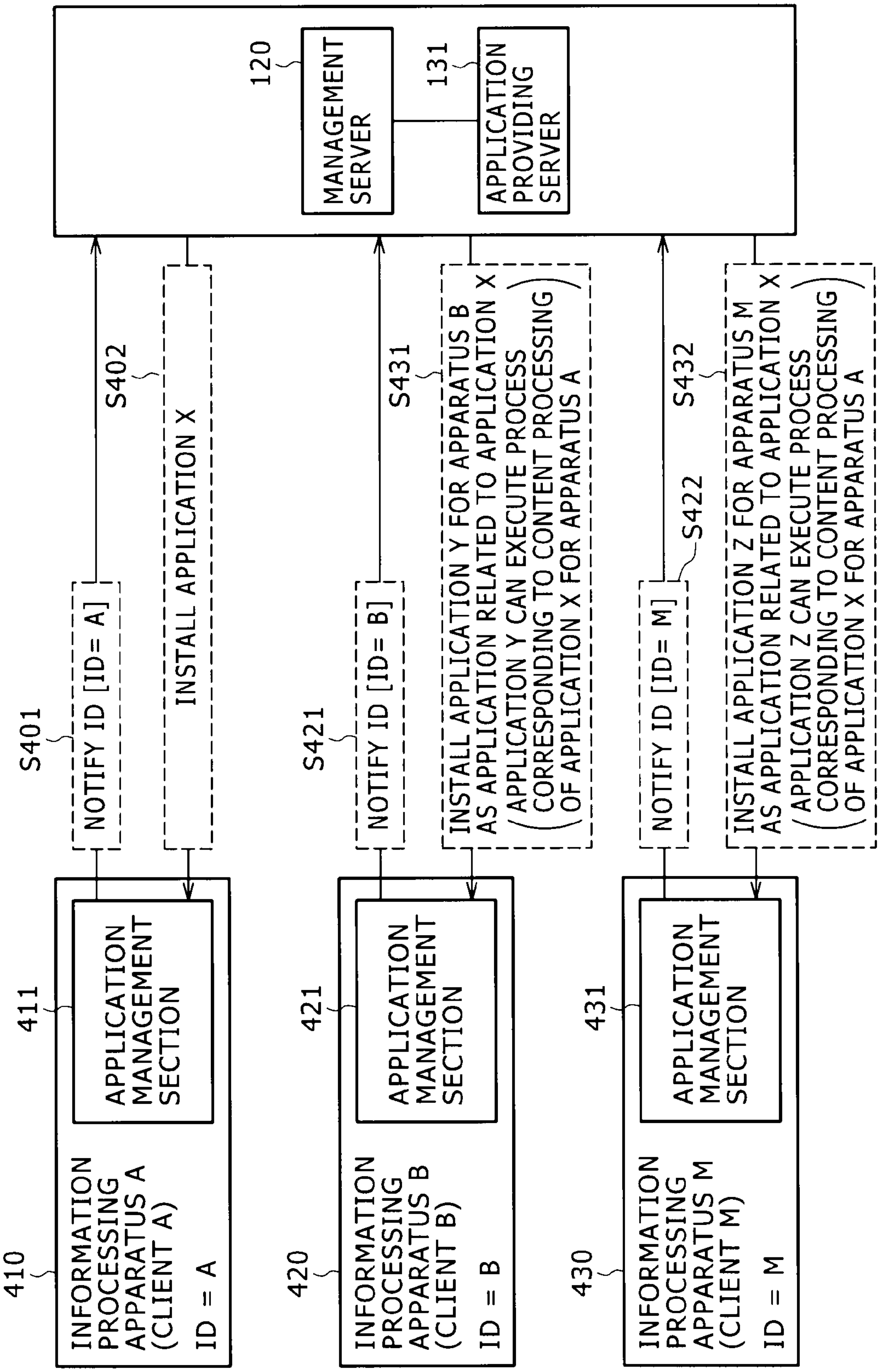
FIG. 24 is an explanatory diagram to be referred to in description of typical processing carried out to provide each of information processing apparatus owned by the same user with an application program proper for the apparatus.

FIG. 24 is an explanatory diagram referred to in description of typical processing carried out to provide each of information processing apparatus owned by the same user with an application program proper for the apparatus. In FIG. 24, a plurality of information processing apparatus owned by the same user are information processing apparatus A, B and M which are denoted by reference numerals 410, 420 and 430 respectively. In addition, the diagram of FIG. 24 also shows the management server 120 and the application providing server 131.

For example, let information processing apparatus A, B and M which are denoted by reference numerals 410, 420 and 430 respectively be a PC, a portable terminal and a portable music player respectively. As described above, information processing apparatus A, B and M which are denoted by reference numerals 410, 420 and 430 respectively are utilized by the same user. Each of information processing apparatus A, B and M which are denoted by reference numerals 410, 420 and 430 respectively has the basic configuration explained earlier by referring to the block diagram of FIG. 3. The application management block 187 of the basic configuration carries out management of application programs.

First of all, at steps S401 and S402 of the processing, the user operates information processing apparatus A denoted by reference numeral 410 in order to download application program X from the application providing server 131 to the apparatus 410 and install the application program in the apparatus 410.

To put it in detail, at the step S401, in accordance with an operation carried out by the user on information processing apparatus A denoted by reference numeral 410, an application management section 411 employed in the information processing apparatus 410 transmits an ID [ID=A] assigned to the apparatus 410 along with a request to download application program X to the management server 120 or the application providing server 131. It is to be noted that, in this case, the management server 120 and the application providing server 131 are configured to share the same operation unit and/or the same information.

The ID [ID=A] transmitted from information processing apparatus A denoted by reference numeral 410 to the management server 120 or the application providing server 131 as the ID of the apparatus 410 is data that can be used for identifying the type or model number of the apparatus. On the basis of the ID, it is possible to identify an application program that can be executed by information processing apparatus A denoted by reference numeral 410 or identify a version of the application program.

Then, at the next step S402, the application providing server 131 selects application program X as an application program that can be executed by information processing apparatus A denoted by reference numeral 410 or identify a version of the application program, and downloads application program X or a version thereof to the information processing apparatus A denoted by reference numeral 410.

Then, information processing apparatus A denoted by reference numeral 410 installs application program X downloaded from the application providing server 131 and makes up an environment for executing application program X.

In addition, at a step S421, in accordance with an operation carried out by the user on information processing apparatus B denoted by reference numeral 420, an application management section 421 employed in the information processing apparatus transmits an ID [ID=B] assigned to the information processing apparatus to the management server 120. It is to be noted that the process to transmit an ID assigned to an information processing apparatus from the information processing apparatus to the management server 120 can be carried out with any arbitrary timing such as the timing to purchase the apparatus. In addition, in the process to transmit an ID assigned to an information processing apparatus from the apparatus to the management server 120, other user information such as an ID assigned to the user can also be transmitted to the management server 120. In this way, it is possible to notify the management server 120 that the user of information processing apparatus B denoted by reference numeral 420 is the same user who owns information processing apparatus A identified by an apparatus ID of A (ID=A) and denoted by reference numeral 410.

In addition, at a step S422, in accordance with an operation carried out by the user on information processing apparatus M denoted by reference numeral 430, an application management section 431 employed in the information processing apparatus transmits an ID [ID=M] assigned to the information processing apparatus to the management server 120. It is to be noted that the process to transmit ID [ID=M] assigned to information processing apparatus M denoted by reference numeral 430 from the information processing apparatus to the management server 120 can be carried out with any arbitrary timing such as the timing to purchase the apparatus. In addition, in the process to transmit the ID [ID=M] assigned to information processing apparatus M denoted by reference numeral 430 from the information processing apparatus to the management server 120, other user information such as an ID assigned to the user can also be transmitted to the management server 120. In this way, it is possible to notify the management server 120 that the user of information processing apparatus M denoted by reference numeral 430 is the same user who owns information processing apparatus A identified by an apparatus ID of A (ID=A) and denoted by reference numeral 410.

The management server 120 manages information processing apparatus owned by users. As shown in a diagram of FIG. 25, for example, an ID assigned to each user is associated with IDs each assigned to one of the information processing apparatus owned by the user. In addition, an ID assigned to every information processing apparatus is associated with IDs each assigned to one of application programs presented to the information processing apparatus. The management server 120 manages the user, apparatus and application IDs by registering the IDs in a table associating the IDs with each other as shown in FIG. 25.

After the application providing server 131 downloads an application program X to information processing apparatus A denoted by reference numeral 410, the application providing server 131 notifies the management server 120 that the application providing server 131 has downloaded application program X to the information processing apparatus. On the basis of the notification received from the application providing server 131, the management server 120 searches management information shown in FIG. 25 for information on other information processing apparatus owned by the user who owns information processing apparatus A denoted by reference numeral 410.

As an example, the first user identified by a user ID of UO12345 in the management-information table shown in FIG. 25 is explained. This first user owns information processing apparatus A identified by an ID (ID=A). As a result of the operation carried out by the management server 120 to examine the management information shown in FIG. 25, the management server 120 recognizes that the user also owns information processing apparatus B and M identified by IDs (ID=B) and (ID=M) respectively, and identifies application programs for information processing apparatus B and M. As described above, the IDs (ID=B) and (ID=M) have been received from information processing apparatus B and M at the steps S421 and S422 respectively. Then, for information processing apparatus B and M, the management server 120 extracts application IDs of the identified application programs, which each make use of data processed by execution of application program X loaded into information processing apparatus A, from the management information.

To put it more concretely, the application program that can be executed by information processing apparatus B denoted by reference numeral 420 is application program Y whereas the application program that can be executed by information processing apparatus M denoted by reference numeral 430 is application program.

The management server 120 transmits information on application programs Y and Z to the application providing server 131. In accordance with this information received from the management server 120, the application providing server 131 transmits information recommending application program Y to the first user to information processing apparatus B which is owned by the first user, denoted by reference numeral 420 and identified by an ID (ID=B). The application providing server 131 also transmits information recommending application program Z to the first user to information processing apparatus M which is owned by the first user, denoted by reference numeral 430 and identified by an ID (ID=M).

The application management section 421 employed in information processing apparatus B denoted by reference numeral 420 shows the information recommending application program Y on a display screen of the apparatus. By the same token, the application management section 431 employed in information processing apparatus M denoted by reference numeral 430 shows the information recommending application program Z on a display screen of the apparatus. In accordance with the information shown on the display screens as information recommending application programs Y and Z, the user requests the application providing server 131 to download application programs Y and Z to information processing apparatus B and M respectively. At the request made by the user, the application providing server 131 downloads desired application programs Y and Z to information processing apparatus B and M respectively.

In a process carried out at a step S431 shown in FIG. 24, the application management section 421 employed in information processing apparatus B denoted by reference numeral 420 installs application program Y downloaded from the application providing server 131. By the same token, in a process carried out at a step S432 shown in FIG. 24, the application management section 431 employed in information processing apparatus M denoted by reference numeral 430 installs application program Z downloaded from the application providing server 131.

By carrying out the processes described above, each of the information processing apparatus owned by the first user is given an installed application program provided for the apparatus to serve as an application program to be executed to carry out a process on the same content.

By carrying out the processes described above, it is possible to construct a processing environment for the same content in each of a variety of information processing apparatus owned by a user without the need for the user to carry out a process to select an application program for each of the apparatus by itself. Thus, the processing burden borne by the user can be reduced.

As described above by referring to FIGS. 18A to 18C, the management server 120 and the application providing server 131 are provided separately from each other. It is to be noted, however, that processing of the management server 120 and processing of the application providing server 131 can also be carried out by a single server. That is to say, the management server 120 itself is also capable of playing the role as the application providing server 131 or the application providing server 131 itself is also capable of carrying out the functions of the management server 120.

(6): Typical Processing Carried out by a Plurality of Collaborative Application Management Sections Connected to a Network The following description explains an embodiment in which typical processing is carried out in a collaborative manner by a plurality of application management sections connected to a network.

Figure 26:
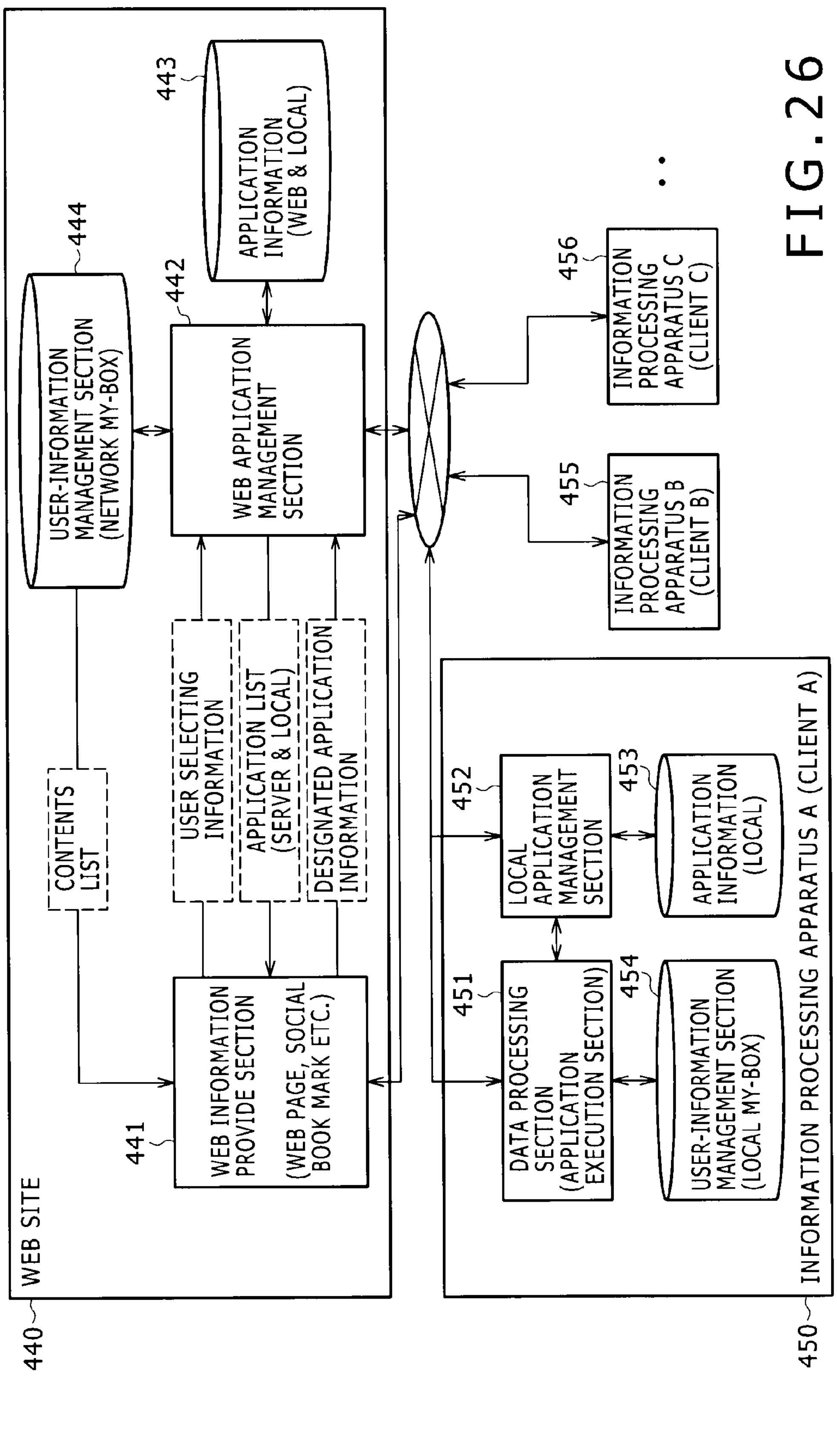
FIGS. 26 to 28 are explanatory block diagrams showing a typical configuration of an embodiment in which a plurality of local application management sections carry out processing in collaboration with a web site.

FIG. 26 shows a typical configuration of an embodiment in which a plurality of local application management sections carry out processing in collaboration with a web site 440 employing a web application management section 442. In the embodiment shown in FIG. 26, the three local application management sections are respectively a local application management section 452 employed in information processing apparatus A denoted by reference numeral 450 to serve as client apparatus A, a local application management section employed in information processing apparatus B denoted by reference numeral 455 to serve as client apparatus B and a local application management section employed in information processing apparatus C denoted by reference numeral 456 to serve as client apparatus C. The web site 440, the information processing apparatus 450, the information processing apparatus 455 and the information processing apparatus 456 are connected to each other to a network and are capable of communicating with each other. The web site 440 connected to the network can be any of a variety of service providing servers and a variety of management servers. The web site 440 is a service providing platform connected to the network to serve as a server for providing services to client apparatus at requests made by the client apparatus.

Each of information processing apparatus A denoted by reference numeral 450, information processing apparatus B denoted by reference numeral 455 and information processing apparatus C denoted by reference numeral 456 employs the same application management section and the same application execution as the embodiment described previously. Information processing apparatus A denoted by reference numeral 450 in FIG. 26 to serve as client apparatus A is explained as the representative of information processing apparatus A, B and C as follows. As shown in FIG. 26, information processing apparatus A denoted by reference numeral 450 employs a data processing section 451, the local application management section 452 mentioned above, an local application-information storage section 453 and a local user-information management section 454. The data processing section 451 is the application execution section explained earlier. As described before, the local application management section 452 is a section for carrying out various kinds of processing including a process to display recommended application programs. The local application-information storage section 453 is a memory used for storing application information such as application programs and application attributes. The local user-information management section 454 also referred to as a local my-box is a memory used for storing information on the user. In addition to information processing apparatus A denoted by reference numeral 450, the embodiment shown in FIG. 26 also employs other information processing apparatus, that is, information processing apparatus B denoted by reference numeral 455 and information processing apparatus C denoted by reference numeral 456. Each of these other information processing apparatus has the same configuration as information processing apparatus A denoted by reference numeral 450.

The web site 440 provides a variety of services to the client apparatus 450, 455 and 456. One of the services is a service to provide application programs to the client apparatus 450, 455 and 456. The web site 440 employs a web information providing section 441, a web application management section 442, an application-information storage section 443 and a user-information management section 444 which is also referred to as a network my-box.

The web information providing section 441 is a section for providing the client apparatus 450, 455 and 456 with an information providing service which typically makes use of a web page and/or a social bookmark. By making use of the web page and/or the social bookmark which are received from the web information providing section 441, the client apparatus is capable of obtaining various kinds of information such as information on a new application program.

For example, when a client who is a user making use of a client apparatus enters an input selecting a content of interest to the client to the client apparatus through a web page displayed by the client apparatus receiving the web page from the web information providing section 441, the input selecting a content is transmitted to the web application management section 442.

On the basis of the input entered by the client as an input selecting a content of interest to the client, the web application management section 442 selects application programs useful effectively to the content and supplies a list of the selected application programs to the web information providing section 441. Then, the web information providing section 441 transmits a web page to the information processing apparatus 450 at a request made by the client operating the information processing apparatus 450. The client can view the list of the selected application programs typically through the web page. Then, when the client enters an input specifying a desired one of the selected application programs put on the list to the web information providing section 441, the web information providing section 441 passes on the input to the web application management section 442. Typically, on the basis of the input specifying a desired application program, the web application management section 442 transmits information on the application program useful to the content as recommended-application information to the local application management section 452 employed in the client apparatus 450. By carrying out this processing, a new application program can be added to the recommended-application list to be displayed on the display screen of the client apparatus 450.

It is to be noted that the web application management section 442 communicates with the local application management section 452 employed in the information processing apparatus 450 in order to obtain various kinds of data such as information on application programs stored in the local application-information storage section 453 of the information processing apparatus 450 and a frequency at which each of the application programs has been executed by the data processing section 451 employed in the information processing apparatus 450. In addition, the web application management section 442 is also capable of acquiring information on users from the user-information management section 444 (also referred to as the network my-box) employed in the web site 440. Thus, the web application management section 442 is also capable of analyzing the state of utilization of every application program by a user.

The application-information storage section 443 is a memory used for storing application programs held by the information processing apparatus 450, 455 and 456 as well as information on the application programs. Accordingly, the web application management section 442 is also capable of acquiring a variety of application programs and various kinds of application information from the application-information storage section 443.

The web application management section 442 communicates with not only the information processing apparatus 450, 455 and 456 connected to the network, but also servers providing application programs to the information processing apparatus 450, 455 and 456. Thus, the web application management section 442 has a configuration for managing data such as the information on usable application programs and the information on utilizations of application programs by a variety of users each serving as a client in an integrated fashion. Accordingly, for a variety of clients, the web application management section 442 is capable of carrying out various kinds of processing such as an analysis on favorites with every client, a process of selecting application programs optimum for every client and a process of providing the local user-information management section 454 employed in every information processing apparatus with a list of recommended application programs suitable for the client owning the information processing apparatus.

Figure 27:
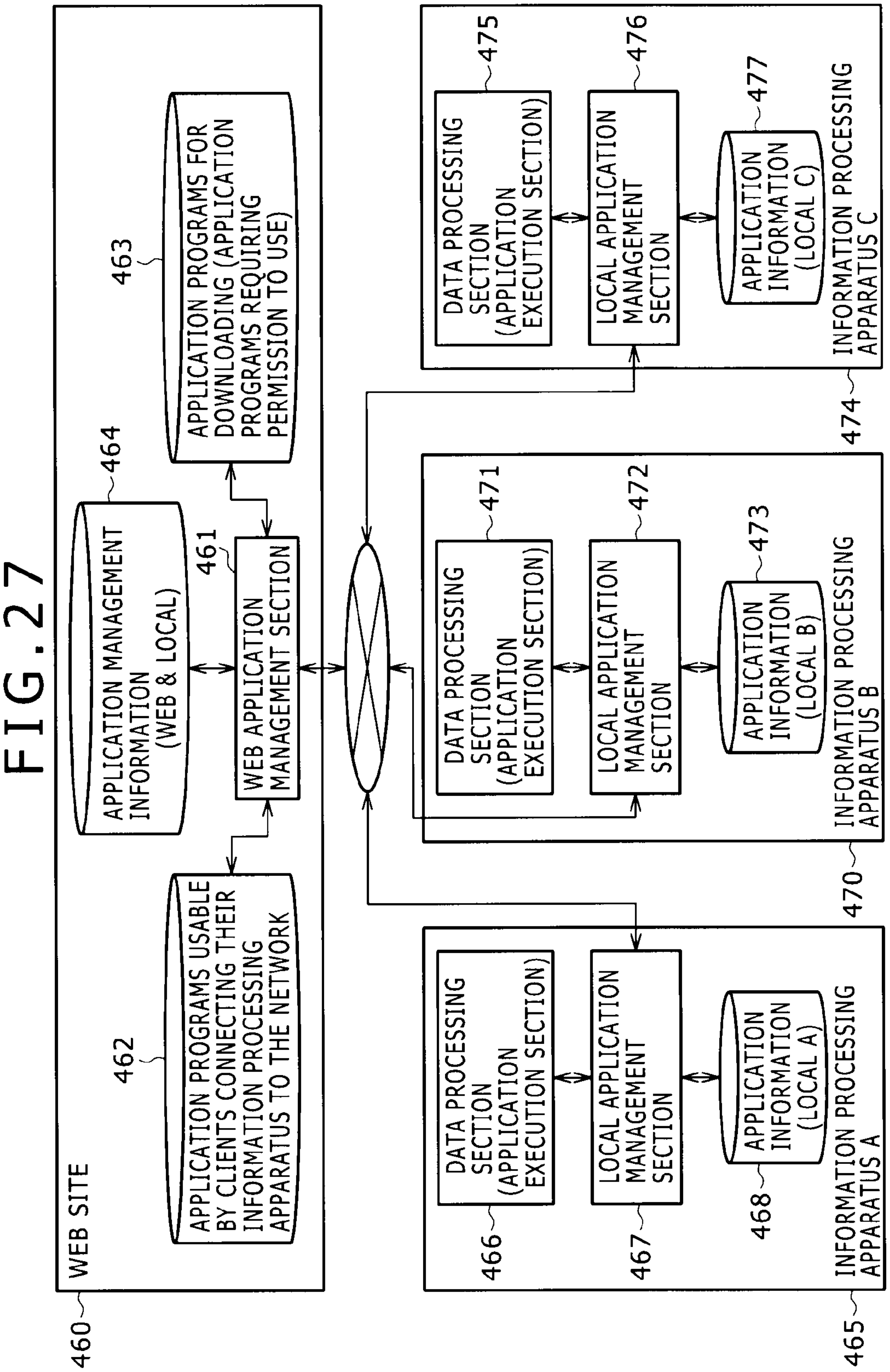

FIG. 27 is a block diagram showing a typical configuration of an embodiment in which a plurality of local application management sections employed in different information processing apparatus 465, 470 and 474 owned by the same user carry out processing in collaboration with a web site 460 employing a web application management section 461. In the embodiment shown in FIG. 27, the three local application management sections are respectively a local application management section 467 employed in information processing apparatus A denoted by reference numeral 465, a local application management section 472 employed in information processing apparatus B denoted by reference numeral 470 and a local application management section 476 employed in information processing apparatus C denoted by reference numeral 474. As described above, information processing apparatuses 465, 470 and 474 are owned by the same user functioning as a client of the web site 460. For example, information processing apparatuses 465, 470 and 474 are respectively a PC installed at the home of the user, a portable PC such as a notebook PC and a cellular phone.

The user selects information processing apparatus A denoted by reference numeral 465, information processing apparatus B denoted by reference numeral 470 or information processing apparatus C denoted by reference numeral 474 in accordance with an application desired by the user. As shown in FIG. 27, in addition to the local application management sections 467, 472 and 476, the information processing apparatuses 465, 470 and 474 also employ data processing sections 466, 471 and 475 respectively as well as local application-information storage sections 468, 473 and 477 respectively. Used for storing information such as application programs and attributes of the application programs, the local application-information storage sections 468, 473 and 477 serve as local application-information storage sections A, B and C respectively.

A web application management section 461 employed in the web site 460 communicates with each local application management section such as the local application management section 467 employed in the information processing apparatus 465 owned by the client in order to acquire information on application programs held by the client and information on utilization of each of the application programs. In addition, the web application management section 461 also acquires web application programs held by the web site 460 and local application programs held by the information processing apparatus 465, 470 and 474 as well as information on the application programs from the application information management storage section 464 also employed in the web site 460.

On the basis of the information acquired from the local application management section 467 as well as the information acquired from the application information management storage section 464, the web application management section 461 provides the information processing apparatus 465 with a list of recommended application programs proper and optimum for the information processing apparatus 465 as well as the recommended application programs themselves. By the same token, on the basis of the information acquired from the local application management section 472 as well as the information acquired from the application information management storage section 464, the web application management section 461 also provides the information processing apparatus 470 with a list of recommended application programs proper and optimum for the information processing apparatus 470 as well as the recommended application programs themselves. In the same way, on the basis of the information acquired from the local application management section 476 as well as the information acquired from the application information management storage section 464, the web application management section 461 provides the information processing apparatus 474 with a list of recommended application programs proper and optimum for the information processing apparatus 474 as well as the recommended application programs themselves.

A network-usable application storage section 462 employed in the web site 460 is a memory used for storing a variety of application programs that can be used by clients connecting their information processing apparatus to the network. That is to say, a user owning an information processing apparatus can freely make use of an application program stored in the network-usable application storage section 462 by connecting the information processing apparatus to the network. For example, the user can make use of an optimum application program which has been recommended by the web application management section 461. Let us assume for example that the web application management section 461 has recommended information processing apparatus A denoted by reference numeral 465, information processing apparatus B denoted by reference numeral 470 and information processing apparatus C denoted by reference numeral 474 to make use of an application program common to the information processing apparatus 465, 470 and 474. In this case, the user owning information processing apparatus A denoted by reference numeral 465, information processing apparatus B denoted by reference numeral 470 and information processing apparatus C can make use of the recommended application program. Thus, even if the user changes the information processing apparatus operated by the user to utilize the recommended common application program from one to a next one, the user can continuously make use of the common application program by operating the next information processing apparatus.

A downloadable-application storage section 463 is a memory used for storing a variety of application programs that can be used by any user who wants to download a desired one of the application programs. That is to say, before the user can make use of a desired application program, the user has to download the application program by carrying out a required procedure such as a purchasing procedure. Also in this case, the web application management section 461 is capable of providing a list of recommended application programs to typically a user owning a plurality of information processing apparatus to serve as a list recommending the use of application programs common to the information processing apparatus. Thus, the user can select one of the recommended application programs from the list and carry out the procedure for downloading the desired application program without any hesitation.

Figure 28:
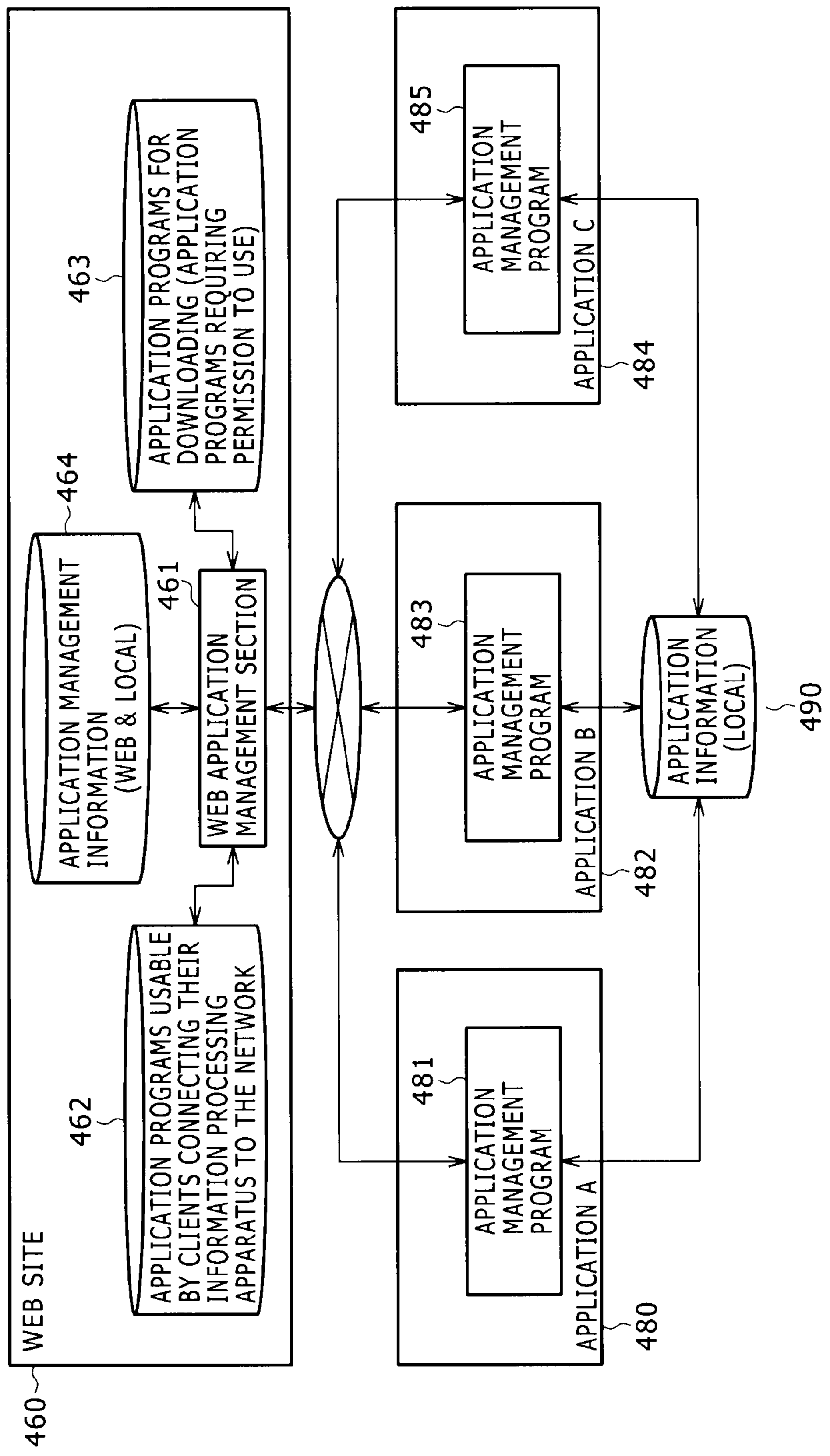

FIG. 28 is a diagram similar to FIG. 27 except that information processing apparatus A, B and C shown in FIG. 27 are replaced with respectively application program A denoted by reference numeral 480, application program B denoted by reference numeral 482 and application program C denoted by reference numeral 483 in FIG. 28. FIG. 28 shows a typical example in which the application programs 480, 482 and 484 include application management programs 481, 483 and 485 respectively. In order to execute application program A, B or C in an information processing apparatus owned by a user, the application management program of the application program to be executed is started. The application management program then carries out processing such as a process of displaying a list of recommended programs. In this case, information on application programs is stored in a local application-information storage section 490 which can be used by the information processing apparatus owned by the user.

Processing which can be carried out collaboratively by the web application management section 461 and the application management programs 481, 483 and 485 included in the application programs 480, 482 and 484 respectively is the same as that explained earlier by referring to FIG. 27. That is to say, a client currently executing an application program is capable of obtaining typically information on other optimum application programs relevant to the application program being executed through the web application management section 461.

(7): Typical Hardware Configuration of a Variety of Apparatus

Figure 29:
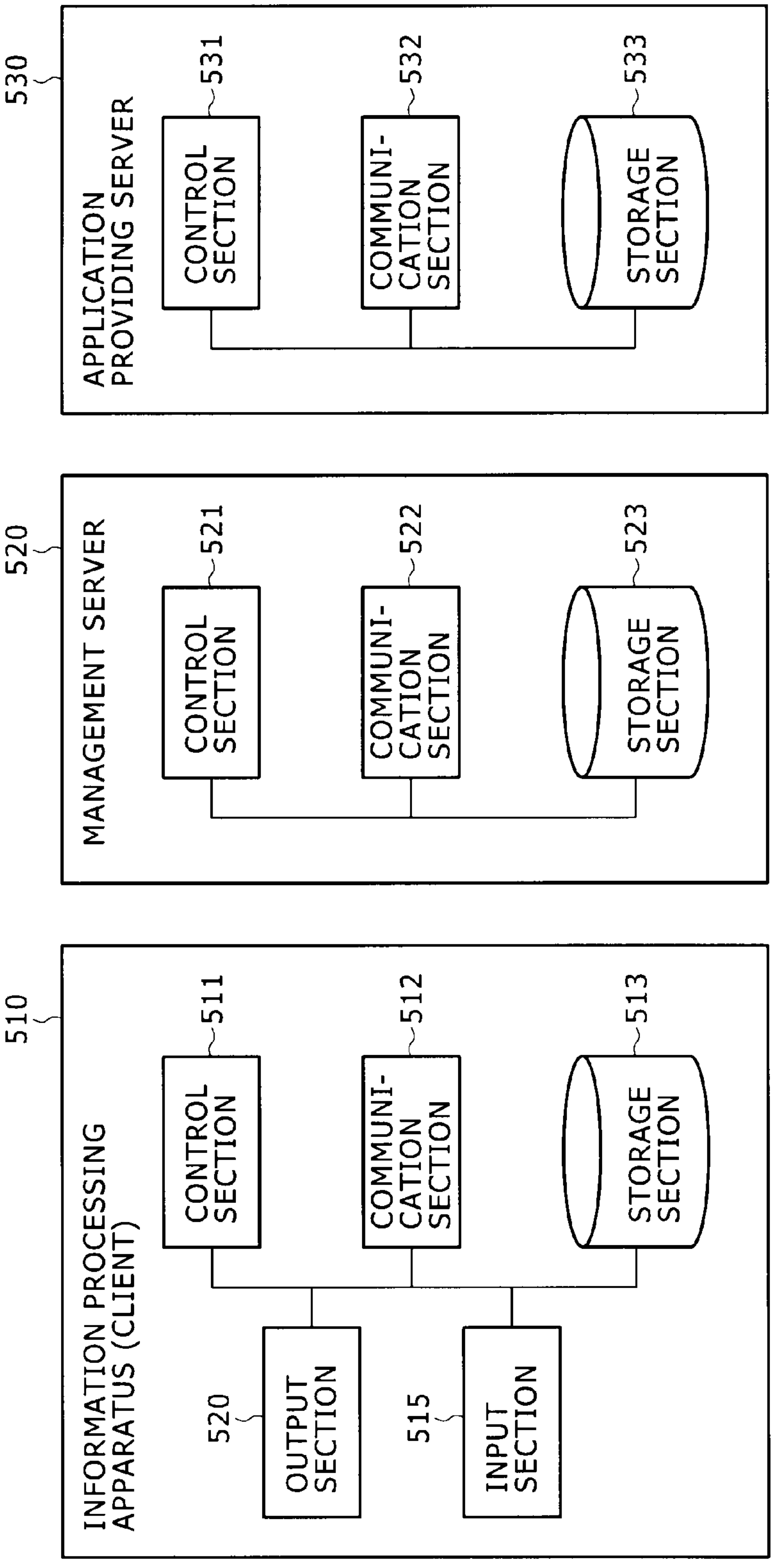
FIG. 29 is an explanatory diagram showing typical hardware configurations of an information processing apparatus owned by the user, a management server and an application providing server.

Finally, by referring to a block diagram of FIG. 29, the following description explains typical hardware configurations of an information processing apparatus 510 owned by the user to serve as a client apparatus, a management server 520 and an application providing server 530.

As shown in FIG. 29, the information processing apparatus 510 owned by the user to serve as a client apparatus employs a control section 511, a communication section 512, a storage section 513, an output section 514 and an input section 515. The control section 511 is a section for carrying out data processing by execution of programs including a variety of application programs. The communication section 512 is a section for carrying communications with external apparatus through a network. The storage section 513 is a memory used for storing programs such as application programs, data, parameters, etc. The output section 514 is typically configured to include a display section and a speaker. The input section 515 is a section for receiving an input entered by the user. It is to be noted that the output section 514 and the input section 515 can be integrated to form a single section which is capable of receiving an input entered through a UI (User Interface) such as a touch-panel UI.

The control section 511 employed in the information processing apparatus 510 serving as a client apparatus employs an application execution section for executing a variety of application programs and an application management section for managing application programs as described earlier by referring to the block diagram of FIG. 3. The application management section acquires, generates and updates application management information. The application management section stores the application management information in the storage section 513. In addition, the application management section generates recommended-application lists described earlier by referring to FIG. 2 and displays the lists on a display screen.

For example, while an application execution section employed in the control section 511 is executing a specific application program, the control section 511 carries out a process of determining other recommended application programs relevant to the specific application program. The memory serving as the storage section 513 is used for storing application-related information applicable to the process which is carried out to determine other recommended application programs relevant to the specific application program while the application execution section is executing the specific application program.

The application-related information includes first application-related information and second application-related information. The first application-related information is information used for selecting the recommended application programs relevant to the specific application program being executed by the application execution section. The first application-related information used for selecting a recommended application program is typically the number of times the recommended application program has been selected so far as an application program to be executed next by the application execution section after the execution of the specific application program. The second application-related information is the number of times a category has been selected so far as the category of a recommended application program to be executed by the application execution section after the execution of the specific application program.

On the basis of the first application-related information related to the specific application program being executed by the application execution section, the control section 511 selects first recommended application programs from those already stored in the memory serving as the storage section 513. The control section 511 also acquires information on second recommended application programs selected on the basis of the second application-related information related to the specific application program being executed by the application execution section from the management server 520 through the communication section 512. Then, the control section 511 carries out a process to output information on the first recommended application programs and information on the second recommended application programs to the output section 514.

The output section 514 shows the information on the first recommended application programs and information on the second recommended application programs on a display screen common to both the information on the first recommended application programs and information on the second recommended application programs. When the user enters an input specifying one of the first recommended application programs, the control section 511 carries out processing including a process to retrieve the specified first recommended application program from the memory serving as the storage section 513 and drive the application execution section to execute the retrieved first recommended application program after the execution of the specific application program has been completed. When the user enters an input specifying one of the second recommended application programs, on the other hand, the control section 511 carries out processing including a process to acquire the specified second recommended application program from the application providing server 530 through the communication section 512 and drive the application execution section to execute the acquired second recommended application program after the execution of the specific application program has been completed.

In addition, when the output section 514 shows the information on the first recommended application programs and information on the second recommended application programs on the common display screen, for each of the first and second recommended application programs, the output section 514 is also controlled by the control section 511 to show storage information on the same display screen to distinguish a storage location used for storing the first recommended application programs from a location used for storing the second recommended application programs. On top of that, if the number of aforementioned first recommended application programs and/or the number of aforementioned second recommended application programs are greater than one, the output section 514 is also controlled by the control section 511 to show storage information on the same display screen to indicate that all the first recommended application programs have been stored at a storage location common to all the first recommended application programs and/or all the second recommended application programs have been stored at another storage location common to all the second recommended application programs.

For example, the storage information "local" and the storage information "requiring DL" which are shown in FIGS. 2 and 9 distinguish a storage location used for storing the first recommended application programs from a storage location used for storing the second recommended application programs.

As shown in FIG. 29, the management server 520 employs a control section 521, a communication section 522 and a storage section 523. The control section 521 is a section for carrying out data processing by executing a variety of programs. The communication section 522 is a section for carrying communications with external apparatus through a network. The storage section 523 is a memory used for storing data such as application information and user management information.

The management server 520 provides information on application programs to the information processing apparatus 510 owned by the user to serve as a client apparatus. In addition, the management server 520 also registers information on an information processing apparatus owned by every user and manages the information.

As shown in FIG. 29, the application providing server 530 employs a control section 531, a communication section 532 and a storage section 533. The control section 531 is a section for carrying out data processing by executing a variety of programs. The communication section 532 is a section for carrying communications with external apparatus through a network. The storage section 533 is a memory used for storing application programs and information on the application programs among others.

The application providing server 530 downloads an application program to the information processing apparatus 510 owned by the user to serve as a client apparatus at a request made by the user.

In the above descriptions, the present invention is explained in detail by enlightening preferred embodiments. It is obvious, however, that a person skilled in the art is capable of changing the embodiments and replacing the embodiments with modified versions without departing from a range of essentials of the present invention. That is to say, the preferred embodiments are used for exemplifying the present invention and, thus, are not to be interpreted as imitations imposed on the present invention. In order to recognize an essential of the present invention, the reader is suggested to refer to claims appended to this invention specification.

Each series of processes described in the invention specification can be carried out by hardware, execution of software or a compound configuration composed of both hardware and software. If each series of processes described above is carried out by execution of software, programs composing the software can be installed into a memory employed in a computer embedded in dedicated hardware, a memory employed in a general-purpose computer or the like from typically a network or a removable recording medium for later executions. In this case, the computer serves as the control section described above. A general-purpose computer is a computer, which can be made capable of carrying out a variety of functions by installing a variety of programs into the computer. That is to say, the programs recorded in advance in the removable recording medium are installed in the memory employed in such a computer. Instead of installing the programs from the removable recording medium into the memory, the programs can be installed into the memory from an application providing server described so far. In this case, the programs are downloaded from the application providing server by way of a network such as a LAN (Local Area Network) or the Internet. Then, the downloaded programs are installed into the memory such as a hard disc embedded in the computer.

It is to be noted that, in this invention specification, processes at steps of each of the processing sequences described above can be carried out not only in a pre-prescribed order along the time axis, but also in accordance with the processing power of the information processing apparatus executing the processes and, if necessary, concurrently or individually. It is also worth noting that the technical term "system" used in this specification implies the configuration of a logical confluence having a plurality of apparatus which do not have to be included in one case.

As described above, in accordance with the configuration of an embodiment of the present invention, the application management section employed in the information processing apparatus owned by the user generates a list of application programs recommended for a first application program being executed by the information processing apparatus and displays the list on a display screen to the user. The application program management section selects the recommended application programs by analyzing information on application programs other than the first application program and considering apparatus and user profiles. The recommended application programs outputtable by the application program management section are application programs optimum for the user and the information processing apparatus owned by the user. By virtue of this configuration, the user can acquire an optimum application program with ease without carrying out processing such as an operation to search other application programs for the optimum one.

The present application contains subject matter related to that disclosed in Japanese Priority Patent Application JP 2009-218736 filed in the Japan Patent Office on Sep. 24, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus, comprising:

a communication section configured to acquire application programs from an external apparatus;

a memory that stores at least an application program and information relevant to said application program;

an application execution section, controlled by said external apparatus via said communication section, configured to execute said application program stored in said memory; and a control section configured to determine other application programs to be recommended during execution of said application program in said application execution section, wherein said information relevant to said application program stored in said memory includes first relevant information and second relevant information which are used for determining said other application programs to be recommended during execution of said application program in said application execution section, and said control section selects first recommended application programs, from said memory, based on said first relevant information, which is related to said application program being executed by said application execution section;

acquires information on second recommended application programs based on said second relevant information, which is related to said application program being executed by said application execution section; and outputs information on said first recommended application programs and said second recommended application programs as application-program recommending information, which is based on context information of said application program being executed by said application execution section, said context information including at least one of: an indication of a selected-content state of said application program, an indication of an enterable-content state of said application program, and an indication of an outputtable content state of said application program.

2. The information processing apparatus according to claim 1, wherein said first relevant information includes application selection information on each of a plurality of application programs selected and executed by said application execution section, said plurality of application programs including said application program stored in said memory.

3. The information processing apparatus according to claim 2, wherein said application selection information includes an application selection count representing the number of times each of said plurality of application programs selected and executed by said application execution section have been selected by said application execution section.

4. The information processing apparatus according to claim 1, wherein application selection information on said plurality of application programs selected and executed by said application execution section is categorized as executed-application category information, which includes application categories representing each type of said plurality of application programs selected and executed by said application execution section, and said second relevant information includes said executed-application category information.

5. The information processing apparatus according to claim 4, wherein said executed-application category information includes application selection counts for each of said application categories, which is the number of times an application category of said application categories corresponds to a categorization of each one of said plurality of application programs selected and executed by said application execution section.

6. The information processing apparatus according to claim 1, wherein said control section:

displays said information on said first recommended application programs and said information on said second recommended application programs on the same screen;

selects one of said first recommended application programs based on an application specifying input entered for said information on said first recommended application programs and loads said selected first recommended application program from said memory;

selects one of said second recommended application programs based on an application specifying input entered for said information on said second recommended application programs and downloads said selected second recommended application program from said external apparatus via said communication section; and supplies at least one of said first recommended application program and said second recommended application program to said application execution section for execution.

7. The information processing apparatus according to claim 6, wherein said control section displays said information on said first recommended application programs and said information on said second recommended application programs such that a storage location of said first recommended application programs is distinguishable from a storage location of said second recommended application programs.

8. The information processing apparatus according to claim 6, wherein said control section displays said information on said first recommended application programs and said information on said second recommended application programs so as to indicate at least one of that all of said first recommended application programs are stored in the same storage location and said second recommended application programs are stored in another storage location common to all of said second recommended application programs.

9. The information processing apparatus according to claim 1, wherein said control section determines said application-program recommending information based on at least one of an apparatus profile of said information processing apparatus and a user profile of a user that operates said information processing apparatus.

10. The information processing apparatus according to claim 1, wherein said control section determines said application-program recommending information based on application-type information indicating a type of said application program being executed by said application execution section.

11. The information processing apparatus according to claim 1, wherein the positional information is obtained from a global positioning system (GPS) accessible by said application program being executed.

12. The information processing apparatus according to claim 1, wherein the application execution section switches to execute a different application program based on the context information, an apparatus profile, a user profile, and condition information.

13. The information processing apparatus according to claim 1, wherein said context information includes positional information utilized by said application program.

14. The information processing apparatus according to claim 1, wherein said context information includes time information utilized by said application program.

15. An information processing method to be adopted by an information processing apparatus including:

acquiring, by a communication section of the information processing apparatus, application programs from an external apparatus that is external to the information processing apparatus;

storing, by a memory of the information processing apparatus, at least an application program and information relevant to said application program;

executing, by an application execution section of the information processing apparatus, said application program stored in said memory; and determining, by a control section of the information processing apparatus, other application programs to be recommended during execution of said application program in said application execution section, wherein said information relevant to said application program includes first relevant information and second relevant information which are used for determining said other application programs to be recommended during execution of said application program in said application execution section, and said information processing method carried out to drive said control section comprises the steps of:

selecting first recommended application programs, from said memory, based on said first relevant information, which is related to said application program being executed by said application execution section;

acquiring information on second recommended application programs based on said second relevant information, which is related to said application program being executed by said application execution section; and outputting information on said first recommended application programs and said second recommended application programs as application-program recommending information, which is based on context information of said application program being executed by said application execution section, said context information including at least one of: an indication of a selected-content state of said application program, an indication of an enterable-content state of said application program, and an indication of an outputtable content state of said application program.

16. The information processing method according to claim 15, wherein said first relevant information includes application selection information on each of a plurality of application programs selected and executed by said application execution section, said plurality of application programs including said application program stored in said memory.

17. The information processing method according to claim 16, wherein said application selection information includes an application selection count representing the number of times each of said plurality of application programs selected and executed by said application execution section have been selected by said application execution section.

18. The information processing method according to claim 15, wherein application selection information on said plurality of application programs selected and executed by said application execution section is categorized as executed-application category information, which includes application categories representing each type of said plurality of application programs selected and executed by said application execution section, and said second relevant information includes said executed-application category information.

* * * * *

UNITED STATES PATENT AND TRADEMARK OFFICE

CERTIFICATE OF CORRECTION

PATENT NO. : 8,392,282 B2
APPLICATION NO. : 12/631106
DATED : March 5, 2013
INVENTOR(S) : Hideo Nagasaka et al.

It is certified that error appears in the above-identified patent and that said Letters Patent is hereby corrected as shown below:

On the title page, Item (30), the 1st Foreign Application Priority Data is incorrect, Item (30) should read:

--(30) Foreign Application Priority Data

Dec. 5, 2008 (JP)...............................2008-311489
Sep. 24, 2009 (JP)...............................2009-218736--

Signed and Sealed this
Seventh Day of May, 2013

Teresa Stanek Rea
*Acting Director of the United States Patent and Trademark Office*